(12) United States Patent
Shokouhi

(10) Patent No.: US 8,454,088 B2
(45) Date of Patent: Jun. 4, 2013

(54) MODULAR STACKABLE FURNITURE SYSTEMS

(75) Inventor: Behshad Shokouhi, Sherman Oaks, CA (US)

(73) Assignee: Chameleon Chairs LLC, Torrance, CA (US)

( * ) Notice: Subject to any disclaimer, the term of this patent is extended or adjusted under 35 U.S.C. 154(b) by 0 days.

(21) Appl. No.: 13/406,386

(22) Filed: Feb. 27, 2012

(65) Prior Publication Data

US 2012/0153588 A1    Jun. 21, 2012

Related U.S. Application Data

(63) Continuation-in-part of application No. 13/274,174, filed on Oct. 14, 2011, which is a continuation-in-part of application No. 11/556,617, filed on Nov. 3, 2006, now Pat. No. 8,047,607, said application No. 13/274,174 is a continuation-in-part of application No. 11/149,038, filed on Jun. 8, 2005, now abandoned.

(60) Provisional application No. 60/733,957, filed on Nov. 4, 2005, provisional application No. 60/777,889, filed on Feb. 28, 2006, provisional application No. 60/578,187, filed on Jun. 8, 2004, provisional application No. 60/656,771, filed on Feb. 25, 2005.

(51) Int. Cl.
*A47C 3/04* (2006.01)

(52) U.S. Cl.
USPC ............... 297/239; 297/451.8; 297/283.2

(58) Field of Classification Search
USPC ........... 297/239, 440.1, 440.14, 451.8, 283.2, 297/283.1, 283.3, DIG. 6, 228.12, 225, 440.22; 211/27; 206/326
See application file for complete search history.

(56) References Cited

U.S. PATENT DOCUMENTS

| | | | |
|---|---|---|---|
| 2,184,470 | A | 12/1939 | Primavera |
| 2,628,668 | A | 2/1953 | Basile |
| 2,843,435 | A | 7/1958 | Hoven et al. |
| 2,940,597 | A | 6/1960 | Machielse et al. |
| 2,961,037 | A | 11/1960 | Keefer |
| 3,057,661 | A | 10/1962 | Moxley |
| 3,407,001 | A | 10/1968 | Minsker |
| 3,756,062 | A | 9/1973 | Merola |
| 3,847,433 | A | 11/1974 | Acton et al. |
| 4,254,992 | A | 3/1981 | Orosa |
| 4,304,436 | A | 12/1981 | Rowland |
| 4,456,296 | A | 6/1984 | Rowland |
| 4,974,906 | A | 12/1990 | Hines |
| 5,174,548 | A | 12/1992 | Mueller |
| 5,626,394 | A | 5/1997 | Perry |
| 5,632,524 | A | 5/1997 | Ikeda et al. |
| 5,690,380 | A | 11/1997 | Waters |
| 5,762,396 | A | 6/1998 | Barile |

(Continued)

FOREIGN PATENT DOCUMENTS

FR    2586916 A3    10/2011

*Primary Examiner* — Anthony D Barfield
(74) *Attorney, Agent, or Firm* — Stoneman Law Patent Group; Martin L. Stoneman

(57) ABSTRACT

Modular stackable furniture systems comprising chairs with modular removable seats, chair-leg covers, and/or chair-back covers. The chair frames are stackable and are structurally reinforced for heavy rental use, with specially reinforced frame, legs, and front feet. Methods of doing event-furniture rental and related business based on the space-saving and modular nature of the furniture are disclosed.

30 Claims, 54 Drawing Sheets

U.S. PATENT DOCUMENTS

| | | |
|---|---|---|
| 5,775,778 A | 7/1998 | Riley et al. |
| 5,779,317 A | 7/1998 | Neal |
| 5,957,528 A | 9/1999 | Campbell |
| 6,089,522 A | 7/2000 | Haslem et al. |
| 6,135,562 A | 10/2000 | Infanti |
| 6,428,098 B1 | 8/2002 | Allbaugh |
| 6,637,823 B1 | 10/2003 | Ursini et al. |
| 6,669,281 B1 | 12/2003 | Huang |
| 6,837,542 B2 | 1/2005 | Barile, Jr. et al. |
| 6,899,396 B2 | 5/2005 | Bales |
| 7,011,367 B2 | 3/2006 | Riley |
| 7,118,175 B2 | 10/2006 | Crue |
| 7,147,286 B2 | 12/2006 | Cesaroni et al. |
| 7,240,964 B2 | 7/2007 | Riley |
| 7,469,962 B2 | 12/2008 | Paulin |
| 2001/0005070 A1 | 6/2001 | Kemnitzer |
| 2003/0090137 A1 | 5/2003 | Piretti |
| 2003/0164602 A1 | 9/2003 | Kuhlman |
| 2003/0164639 A1 | 9/2003 | Infanti |
| 2003/0209925 A1 | 11/2003 | Bosman et al. |
| 2011/0278889 A1* | 11/2011 | Sienkowski et al. .......... 297/239 |

* cited by examiner

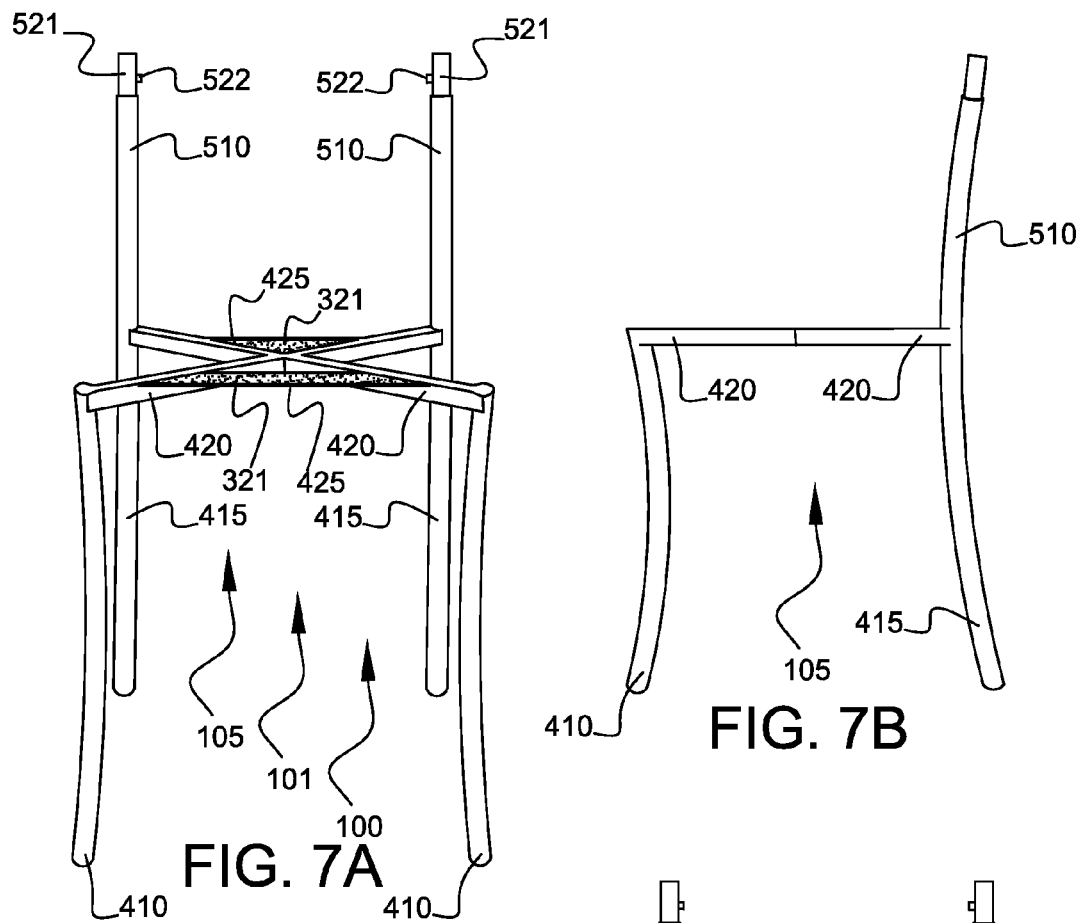
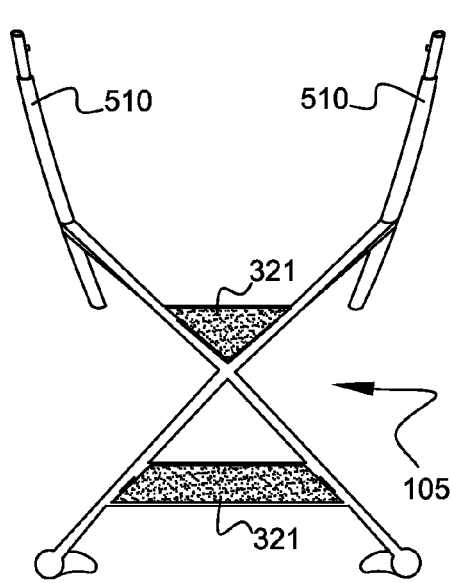
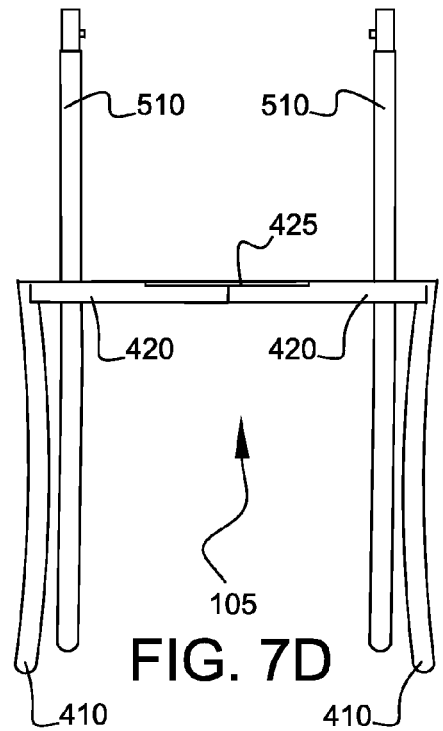

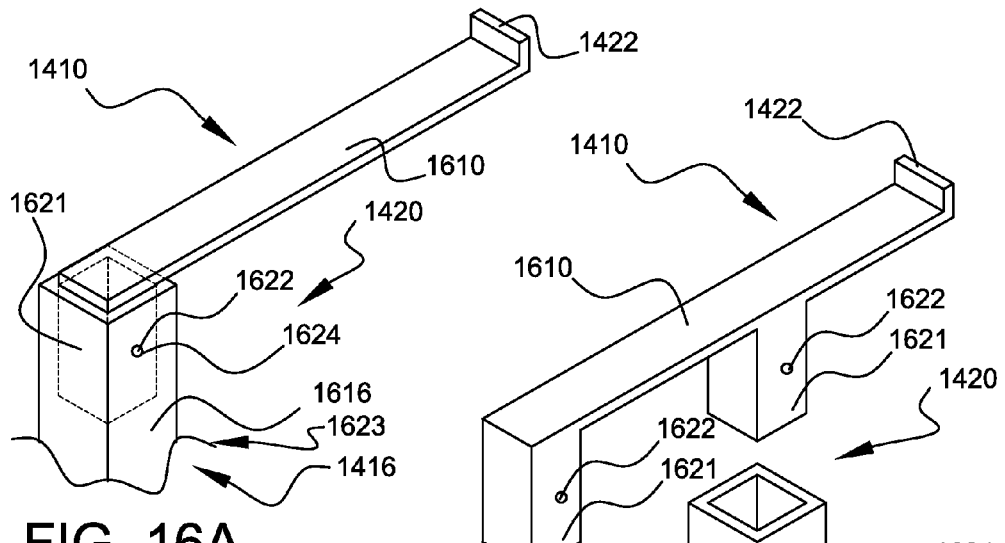
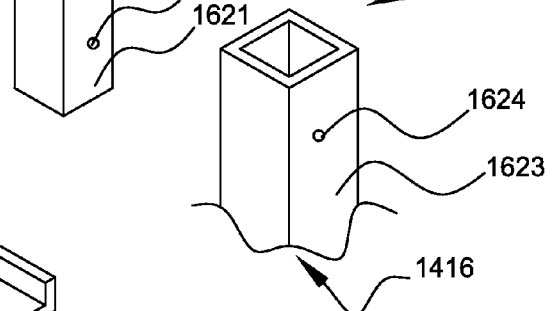
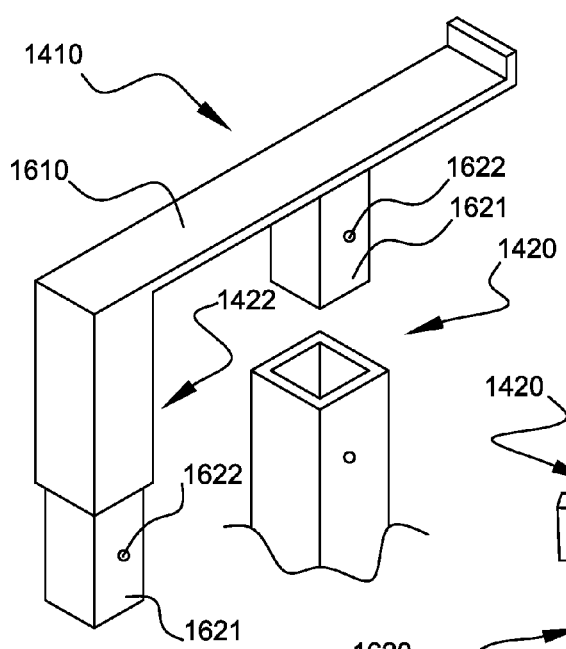
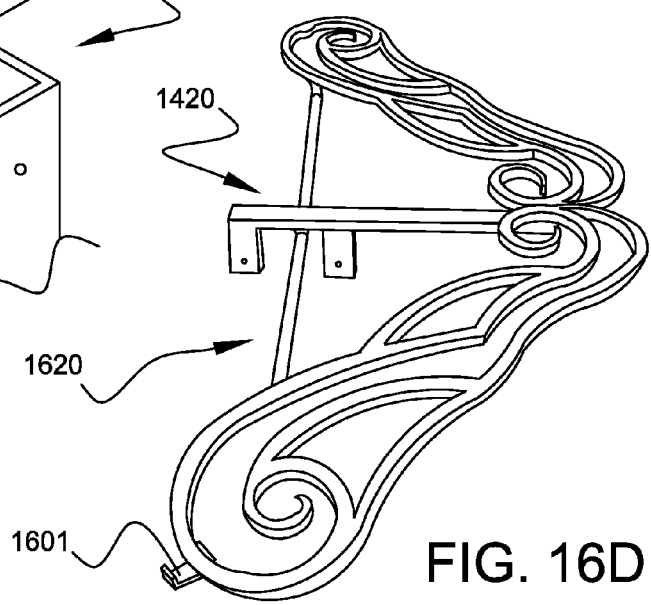
FIG. 16A
FIG. 16B
FIG. 16C
FIG. 16D

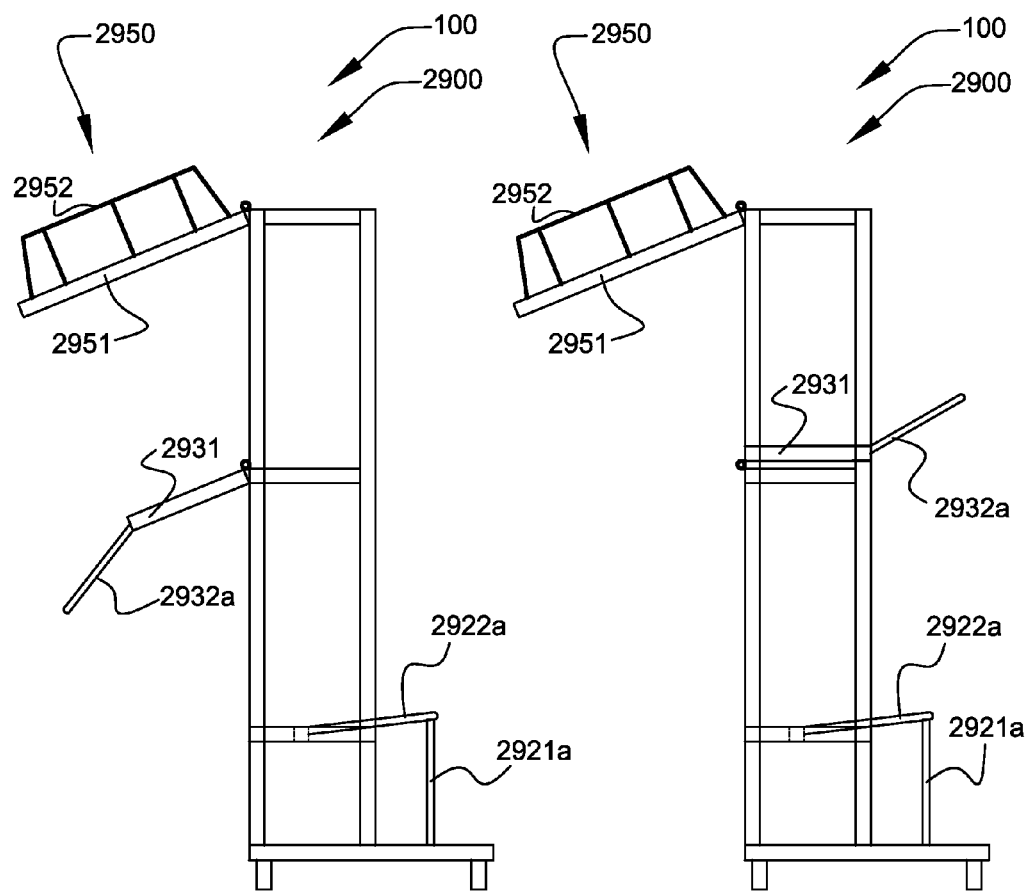

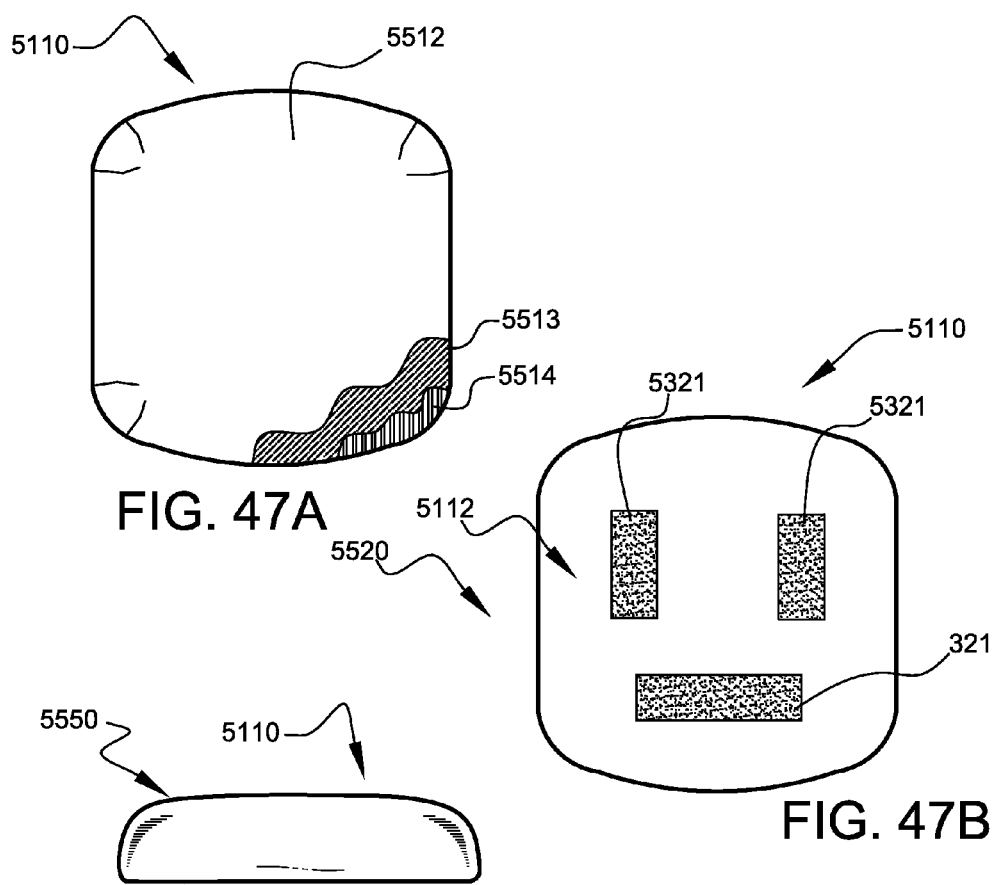
FIG. 47A
FIG. 47B
FIG. 47C
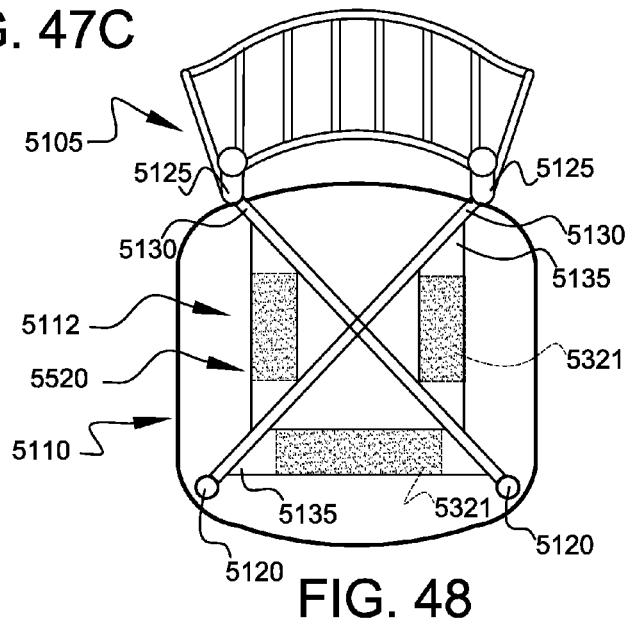
FIG. 48

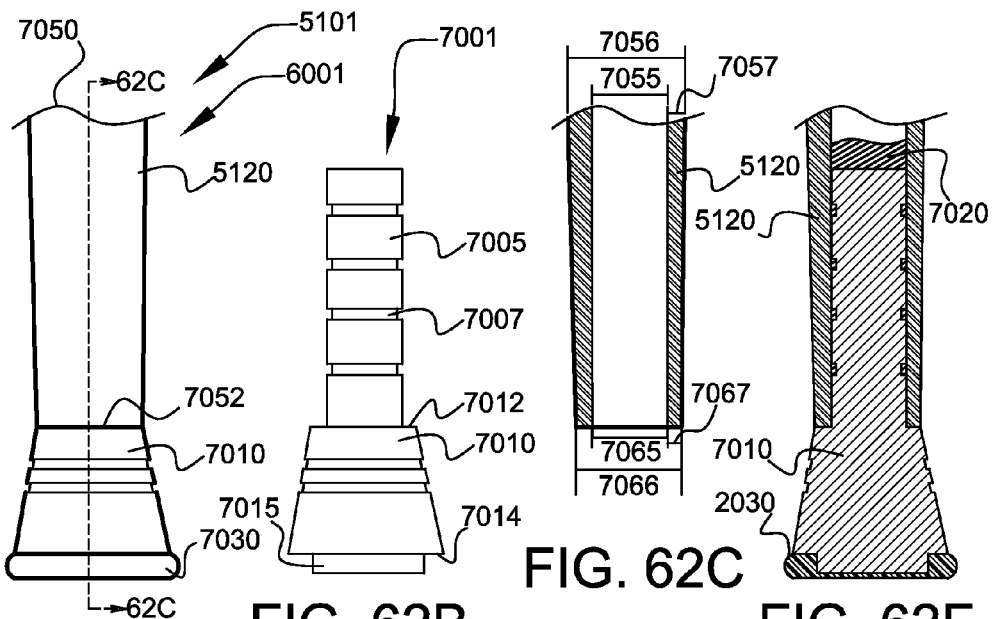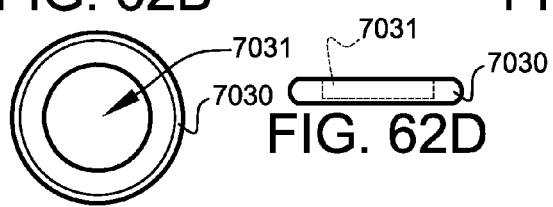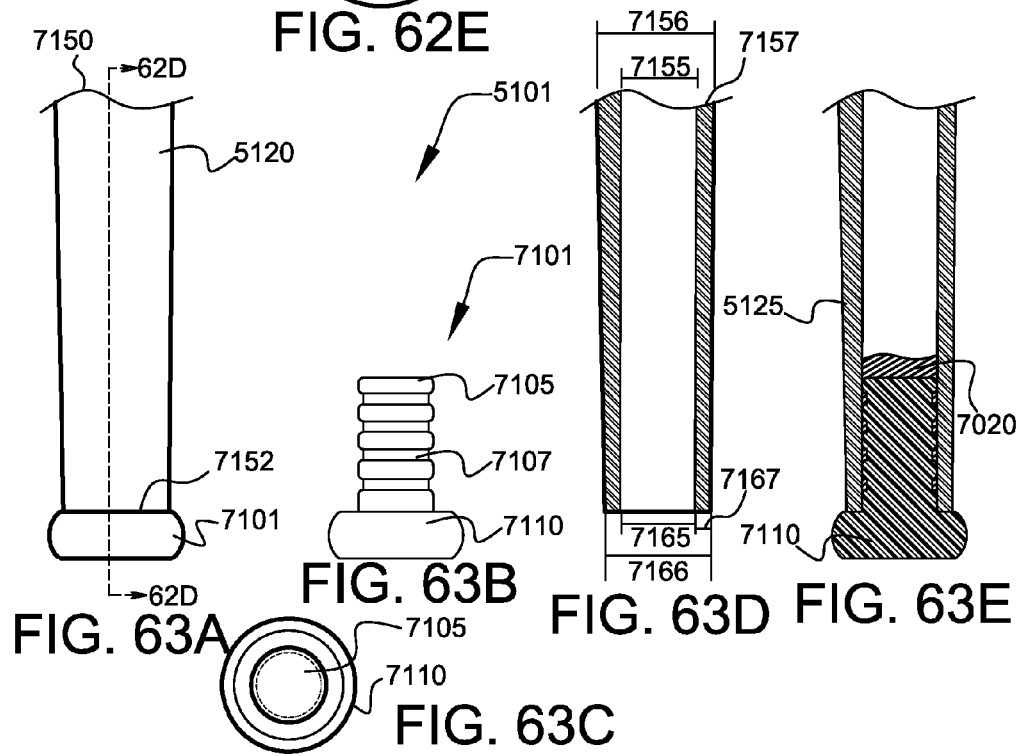

MODULAR STACKABLE FURNITURE SYSTEMS

CROSS-REFERENCE TO RELATED APPLICATIONS

The present application is a continuation-in-part of and is related to and claims priority from application Ser. No. 13/274,174, filed Oct. 14, 2011, entitled "MODULAR STACKABLE FURNITURE SYSTEMS", which application is a continuation-in-part of and is related to and claims priority from prior non-provisional application Ser. No. 11/556,617, U.S. Pat. No. 8,047,607 filed Nov. 3, 2006, entitled "MODULAR STACKABLE FURNITURE SYSTEMS", which application is related to and claims priority from prior provisional application Ser. No. 60/733,957, filed Nov. 4, 2005, entitled "MODULAR STACKABLE FURNITURE SYSTEMS", and which application is related to and claims priority from prior provisional application Ser. No. 60/777,889, filed Feb. 28, 2006, entitled "MODULAR STACKABLE FURNITURE SYSTEMS", the contents of all of which are incorporated herein by this reference and are not admitted to be prior art with respect to the present invention by the mention in this cross-reference section.

Further, application Ser. No. 13/274,174 is a continuation-in-part of and is related to and claims priority from application Ser. No. 11/149,038, filed Jun. 8, 2005, entitled "MODULAR STACKABLE FURNITURE SYSTEMS", now abandoned which application is related to and claims priority from prior provisional application Ser. No. 60/578,187, filed Jun. 8, 2004, entitled "MODULAR STACKABLE FURNITURE SYSTEMS", and which application is related to and claims priority from prior provisional application Ser. No. 60/656,771, filed Feb. 25, 2005, entitled "MODULAR STACKABLE FURNITURE SYSTEMS", the contents of all of which are incorporated herein by this reference and are not admitted to be prior art with respect to the present invention by the mention in this cross-reference section.

BACKGROUND

This invention relates to providing improved modular stackable furniture systems. More particularly, this invention relates to providing stackable fixed-back chairs with modular seats. Even more particularly, this invention relates to providing stackable fixed-back chairs with interchangeable back covers and/or leg covers.

No system exists that permits furniture renters to fill diverse customer orders from a small stock of modular chair components and chair covers. No commercial rental chairs and chair covers exist that can be easily, inexpensively, and modularly repaired, updated, stored, and transported. No system exists that provides structurally reinforced stackable modular chairs for the rental industry. No system exists that provides a method of franchising stackable modular chair rental services.

Therefore, a need exists for a modular stackable furniture system that permits furniture renters to fill diverse customer orders from a small stock of modular chair components and chair covers. Further, a need exists for commercial rental chairs and chair covers that can be easily, inexpensively, and modularly repaired, updated, stored, and transported. Also, a need exists for a system that provides structurally reinforced stackable modular chairs for the rental industry. In addition, a need exists for a system that provides a method of franchising stackable modular chair rental services.

OBJECTS AND FEATURES OF THE INVENTION

A primary object and feature of the present invention is to overcome the above-stated problems and fill the above-stated needs. Another primary object and feature of the present invention is to provide modular stackable furniture systems.

It is a further object and feature of the present invention to provide such a system that permits a renter to provide many aesthetic furniture designs to customers from a small stock of modular components, and to provide many designs, sizes, shapes, and colors of event furniture from a limited set of compactly stored interchangeable components. It is a further object and feature of the present invention to provide such a system that includes apparatuses for storage and transportation of the modular furniture components.

It is a further object and feature of this invention to provide stackable chairs having replaceable seats, back-covers, and/or leg-covers. It is a further object and feature of this invention to provide stackable modular chairs strengthened and structured and arranged to withstand rental use. It is a further object and feature of this invention to provide a method of franchising stackable modular chair rental services. It is a further object and feature of this invention to provide reinforcing chair feet.

Another primary object and feature of the present invention is to provide stackable chairs to provide stackable modular seating system capable of rapid assembly and disassembly. A further object and feature is to provide such a system with changeable seats, back-covers and leg covers. Another object and feature is to provide such a system capable of rental use.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a modular furniture system, relating to object-supporting furniture having modular portions, comprising: at least one chair frame comprising at least one back support, at least one seat support, at least four legs comprising at least two front legs and at least two rear legs; wherein such at least one seat support comprises at least four longitudinal projections extending from at least one hub portion, and at least one plate attached to at least two of such at least four longitudinal projections; and at least one chair seat; and at least one attachment system structured and arranged to assist attachment and detachment of such at least one chair seat to and from such at least one seat support; wherein detachment of such at least one chair seat from such at least one seat support is effected by lifting such at least one chair seat away from such at least one seat support; wherein such at least one chair frame is structured and arranged to nest in a stack with at least one other substantially identical chair frame, when such at least one chair seat is detached from each such at least one seat support; wherein such at least one seat support further comprises openings structured and arranged to receive such at least two rear legs of at least one other substantially identical chair frame during stacking of multiple units of such chair frames; and wherein such at least one chair seat occludes such openings, preventing such stacking of multiple units of such chair frames, when attached to such at least one chair frame.

Moreover, it provides such a modular furniture system wherein such at least one attachment system comprises at least one first portion associated with such at least one chair seat and at least one second portion associated with such at least one plate. Additionally, it provides such a modular furniture system further comprising at least one back-support cover. Also, it provides such a modular furniture system, wherein such at least one back-support cover comprises at least one closure mechanism to secure such at least one back-support cover to such at least one back support. In addition, it provides such a modular furniture system wherein such at least one back-support cover comprises at least one fabric.

And, it provides such a modular furniture system further comprising at least one chair-leg cover. Further, it provides such a modular furniture system further comprising at least one back-support cover. Even further, it provides such a modular furniture system wherein such at least one seat support comprises at least two of such at least one plate. Moreover, it provides such a modular furniture system wherein such at least one seat support comprises at least three of such at least one plate. Additionally, it provides such a modular furniture system wherein all of such at least four longitudinal projections are attached to at least one plate of such at least three plates.

Also, it provides such a modular furniture system wherein two adjacent longitudinal projections of such at least one seat support are not connected by at least one plate of such at least three plates. In addition, it provides such a modular furniture system wherein such at least one back support extends upward from such at least one seat support and such at least four legs extend downward from such at least one seat support. And, it provides such a modular furniture system wherein such at least one seat support provides the substantially exclusive structural connection between such at least four legs. Further, it provides such a modular furniture system further comprising at least one chair-foot connected with each of such at least four legs. Even further, it provides such a modular furniture system wherein such at least one chair-foot increases stability of such at least one chair frame.

Moreover, it provides such a modular furniture system wherein such at least one chair-foot is weighted. Additionally, it provides such a modular furniture system wherein such at least one chair-foot is weighted to counterbalance such at least one chair frame against weight of such at least one back support to enhance ground stability of such at least one chair frame. Also, it provides such a modular furniture system further comprising at least one transporter adapted to transport a plurality of such at least one chair frame in at least one nested-stacked configuration. In addition, it provides such a modular furniture system wherein such at least one transporter is wheeled. And, it provides such a modular furniture system wherein such at least one transporter comprises at least one forklift guide structured and arranged to guide fork-alignment with such at least one transporter by at least one forklift. Further, it provides such a modular furniture system wherein such at least one transporter comprises at least one chair frame holder adapted to hold at least two of such at least one chair frame which are stacked in a nesting configuration; at least one chair seat holder adapted to hold at least two of such at least one chair seat detached from each such at least one chair frame; and at least three wheels.

Even further, it provides such a modular furniture system wherein such at least one transporter comprises at least one transporter frame comprising at least one upper portion and at least one lower portion; at least one first chair frame holder connected with such at least one transporter frame; and at least one second chair frame holder connected with such at least one transporter frame; wherein such at least one first chair frame holder and such at least one second chair frame holder are positioned between such at least one upper portion of such at least one transporter frame and such at least one lower portion of such at least one transporter frame; and at least one basket connected with an upper portion of such at least one transporter frame; at least two forklift guides associated with a lower portion of such at least one transporter frame; and wheels.

In accordance with another preferred embodiment hereof, this invention provides a modular furniture system, relating to object-supporting furniture having modular portions, comprising: horizontal support means for providing an essentially-horizontal surface able to support objects; raised-support means for supporting such horizontal support means at least one distance above a floor; and positional stabilizer means for assisting positional stability of such horizontal support means when supported by such raised-support means; wherein such positional stabilizer means comprises releasable attacher means for releasably pressure-activating such positional stabilizer means.

Further, it provides the modular furniture system, further comprising: back-contour support means for supporting at least one contour of at least one human back, wherein such back-contour support means is substantially perpendicular to such horizontal support means; raised frame means for providing an essentially raised frame to support such back contour support means above such horizontal support means; and releasable locking attacher means for releasably attaching such back-contour support means to such raised frame means. Moreover, it provides such a modular furniture system, wherein such releasable locking attacher means comprises locking tube means for concentric tube locking such back-contour support means and such raised frame means together. Additionally, it provides such a modular furniture system, further comprising end-cap means for end-capping such releasable locking attacher means.

Also, it provides such a modular furniture system, wherein such positional stabilizer means comprises intermediate support means for supporting such horizontal support means above such raised-support means. In addition, it provides such a modular furniture system, wherein such intermediate support means comprises edge-holder means for holding at least one edge of such horizontal support means. And, it provides such a modular furniture system, wherein such intermediate support means comprises height adjuster means for adjusting the height of such intermediate support means. Further, it provides such a modular furniture system, wherein such intermediate support means comprises edge connector means for connecting the edges of a plurality of such intermediate support means.

Further, it provides the modular furniture system, further comprising: a plurality of such raised-support means; and nesting-stacker means for providing stackable nesting of such plurality of such raised-support means upon release of attachment of such releasable pressure-activated attacher means.

Even further, it provides such a modular furniture system, wherein such nesting-stacker means comprises raised-support means comprising: frame support means for directly releasably supporting such horizontal support means; and a plurality of thin raised leg-bars supporting such frame support means wherein such frame support means comprises horizontal-plane aperture means for providing apertures for such plurality of thin raised leg-bars; and wherein at least one lower frame-support means may stackably support at least one upper frame-support means.

Moreover, it provides such a modular furniture system, wherein such nesting-stacker means comprises spirally-nesting-stacker means for spirally nesting stacking such plurality of such raised-support means. Additionally, it provides such a modular furniture system, wherein such nesting-stacker means comprises spacer means for spacing such plurality of such raised-supports apart from each other in at least one stacked configuration.

Also, it provides such a modular furniture system, further comprising transporter means for transporting at least one nested stack of such plurality of such raised-support means. In addition, it provides such a modular furniture system, wherein such transporter means comprises vertical support means for supporting such at least one nested stack of such plurality of such raised-support means in an approximately vertical position. And, it provides such a modular furniture system, wherein such vertical support means comprises at least one adjustable angle of support.

Further, it provides such a modular furniture system, wherein such raised frame means comprises at least one chair frame, and wherein such horizontal support means comprises at least one chair seat. Even further, it provides such a modular furniture system, wherein such raised frame means comprises at least one table frame, and wherein such horizontal support means comprises at least one table top.

In accordance with another preferred embodiment hereof, this invention provides a modular furniture system, relating to object-supporting furniture having modular portions, comprising: horizontal support means for providing an essentially-horizontal surface able to support objects; raised-support means for supporting such horizontal support means at least one distance above a floor; and first releasable attacher means for releasably attaching such horizontal support means to such raised-support means.

Even further, it provides such a modular furniture system, further comprising: back-contour support means for supporting at least one contour of at least one human back, wherein such back-contour support means is substantially perpendicular to such horizontal support means; raised frame means for providing an essentially raised frame to support such back contour support means above such horizontal support means; and second releasable attacher means for releasably attaching such back-contour support means to such raised frame means. Even further, it provides such a modular furniture system, wherein such first releasable attacher means comprises intermediate support means for supporting such horizontal support means above such raised-support means.

Even further, it provides such a modular furniture system, further comprising: a plurality of such raised-support means; and nesting-stacker means for providing stackable nesting of such plurality of such raised-support means upon release of attachment of such first releasable attacher means. Even further, it provides such a modular furniture system, wherein such nesting-stacker means comprises spirally-nesting-stacker means for spirally nesting stacking such plurality of such raised-support means.

In accordance with a preferred embodiment hereof, this invention provides a modular furniture system, relating to object-supporting furniture having modular portions, comprising: at least one chair frame adapted to frame at least one chair; at least one modular chair seat adapted to be removed from and placed on such at least one chair frame; and at least one releasable attacher adapted to releasably attach such at least one modular chair seat to such at least one chair frame. Moreover, it provides such a modular furniture system, further comprising: at least one back support adapted to support the back of at least one seated user; at least one raised frame adapted to support such at least one back support above such at least one chair frame; and at least one releasable back support attacher adapted to releasably attach such at least one back support to such at least one raised frame. Additionally, it provides such a modular furniture system, further comprising at least one back-support cover adapted to substantially cover such at least one back support. Additionally, it provides such a modular furniture system, wherein such at least one chair frame is nesting-stackable. Also, it provides such a modular furniture system, wherein such at least one chair frame is spirally nesting-stackable.

In accordance with another preferred embodiment hereof, this invention provides a modular furniture system, relating to object-supporting furniture having modular portions, comprising: at least one table frame adapted to frame at least one table; at least one modular table top adapted to be removed from and placed on such at least one table frame; and at least one releasable attacher adapted to releasably attach such at least one modular table top to such at least one table frame. In addition, it provides such a modular furniture system, further comprising: at least one intermediate support adapted to provide intermediate support between such at least one table frame and such at least one modular table top; and at least one releasable intermediate support attacher adapted to releasably attach such at least one intermediate support to such at least one table frame. And, it provides such a modular furniture system, wherein such at least one table frame is nesting-stackable. Further, it provides such a modular furniture system, wherein such at least one table frame is spirally nesting-stackable.

In accordance with another preferred embodiment hereof, this invention provides a modular furniture system, relating to object-supporting furniture having modular portions, comprising: at least one horizontal support adapted to provide at least one essentially-horizontal surface able to support objects; at least one raised-support adapted to support such at least one horizontal support at least one distance above a floor; and at least one positional stabilizer adapted to assist positional stability of such at least one horizontal support when supported by such at least one raised-support wherein such at least one positional stabilizer comprises at least one releasable attacher adapted to releasably pressure-activate such at least one positional stabilizer.

Even further, it provides such a modular furniture system, further comprising: at least one back-contour support adapted to support at least one contour of at least one human wherein such at least one back-contour support is substantially perpendicular to such at least one horizontal support; at least one raised frame adapted to provide at least one essentially raised frame to support such at least one back-contour support above such at least one horizontal support; and at least one releasable attacher adapted to releasably attach such at least one back-contour support to such at least one raised frame.

Moreover, it provides such a modular furniture system, wherein such at least one releasable attacher comprises at least one locking tube adapted to lock such at least one back-contour support and such at least one raised frame together. Additionally, it provides such a modular furniture system, further comprising at least one cap adapted to cap such at least one releasable attacher. Also, it provides such a modular furniture system, further comprising at least one connector adapted to connect such at least one back-contour support to such at least one releasable attacher. In addition, it provides such a modular furniture system, wherein such at least one releasable attacher comprises at least one friction locking tube adapted to frictionally lock such at least one back-contour support and such at least one connector together.

And, it provides such a modular furniture system, wherein such at least one positional stabilizer comprises at least one intermediate support adapted to support such at least one horizontal support above such at least one raised-support. Further, it provides such a modular furniture system, wherein such at least one intermediate support comprises at least one edge-holder adapted to hold at least one edge of such at least one horizontal support. Even further, it provides such a modular furniture system, wherein such at least one intermediate support comprises at least one height adjuster adapted to adjust the height of such at least one intermediate support. Moreover, it provides such a modular furniture system, wherein such at least one intermediate support comprises at least one edge connector adapted to connect the edges of such at least one intermediate support. Additionally, it provides such a modular furniture system, wherein such at least one positional stabilizer comprises at least one hook and loop fastener.

Also, it provides such a modular furniture system, further comprising: a plurality of such at least one raised-supports; and at least one nesting-stacker adapted to provide stackable nesting of such at least one plurality of such at least one raised-supports upon release of attachment of such at least one first releasable attacher. In addition, it provides such a modular furniture system, wherein such at least one nesting-stackable means comprises at least one raised-support comprising: at least one frame support adapted to directly releasably support such at least one horizontal support; and a plurality of thin raised leg-bars supporting such at least one frame support; wherein such at least one frame support comprises at least one horizontal-plane aperture adapted to provide apertures for such at least one plurality of thin raised leg-bars; and wherein at least one lower frame-support may stackably support at least one upper frame-support. And, it provides such a modular furniture system, wherein such at least one nesting-stacker comprises at least one spirally-nesting-stacker adapted to spirally nesting stack such plurality of such at least one raised-supports.

Further, it provides such a modular furniture system, wherein such at least one nesting-stacker comprises at least one spacer adapted to space such plurality of such at least one raised-supports apart from each other in at least one nested-stacked configuration. Even further, it provides such a modular furniture system, further comprising at least one transporter adapted to transport such plurality of such at least one raised-supports in at least one nested-stacked configuration. Moreover, it provides such a modular furniture system, wherein such at least one transporter comprises at least one vertical support adapted to support such plurality of such at least one raised-supports in at least one nested-stacked configuration in an approximately vertical position. Additionally, it provides such a modular furniture system, wherein such at least one vertical support has at least one adjustable angle of support.

Also, it provides such a modular furniture system, further comprising at least one back-contour support cover adapted to substantially cover such at least one back-contour support. And, it provides such a modular furniture system, further comprising at least one openable closure adapted to open and close such at least one back-contour support cover wherein such at least one back-contour support cover is installable over, and removable from, such at least one back-contour support. In addition, it provides such a modular furniture system, wherein such at least one raised frame comprises at least one chair frame, and wherein such at least one horizontal support comprises at least one chair seat. And, it provides such a modular furniture system, wherein such at least one raised frame comprises at least one table frame, and wherein such at least one horizontal support comprises at least one table top.

Moreover, it provides such a modular furniture system, further comprising: at least one transporter adapted to transport at least two of such at least one raised-supports and at least two of such at least one horizontal supports; wherein such at least one transporter comprises at least one raised-support holder adapted to hold such at least two of such at least one raised-supports; wherein such at least one transporter comprises at least one horizontal-support holder adapted to hold such at least two of such at least one horizontal supports; and wherein such at least one transporter comprises at least two wheels.

In accordance with another preferred embodiment hereof, this invention provides a modular furniture system, relating to object-supporting furniture having modular portions, comprising at least one spiral stack of at least one plurality of raised-supports.

In accordance with another preferred embodiment hereof, this invention provides a modular furniture system, relating to stackable furniture having removable modular horizontal support portions, comprising the steps of: providing stackable furniture with removable horizontal supports; removing such horizontal supports; nesting-stacking such stackable furniture; and separately storing such horizontal supports. Further, it provides such a modular furniture system, further comprising the steps of: removing back-contour supports from such stackable furniture; and separately storing such back-contour supports. Also, it provides such a modular furniture system, further comprising the steps of: removing back-support covers from such stackable furniture; and separately storing such back-support covers. Even further, it provides such a modular furniture system, further comprising the steps of: removing intermediate supports from such stackable furniture; and separately storing such intermediate supports. Moreover, it provides such a modular furniture system, wherein the step of nesting-stacking further comprises the step of spirally-nesting-stacking such stackable furniture.

In accordance with another preferred embodiment hereof, this invention provides a modular furniture system, relating to transporting at least two stacked chair frames and at least two chair seats removably attachable to such at least two stacked chair frames, comprising: transporter means for transporting such at least two stacked chair frames and such at least two chair seats; wherein such transporter means comprises chair holder means for holding such at least two stacked chair frames; wherein such transporter means comprises seat holder means for holding such at least two chair seats; and wherein such transporter means comprises at least two wheels.

In accordance with another preferred embodiment hereof, this invention provides a modular furniture system, relating to stackable furniture having removable modular horizontal support portions, comprising the steps of: stocking a plurality of modular furniture components wherein such plurality of modular furniture components comprises a plurality of raised-supports having at least one aesthetic design, and a plurality of horizontal support portions having at least one aesthetic design; stacking at least one portion of such plurality of modular furniture components to conserve warehouse space; and offering such plurality of modular furniture components for rental. Additionally, it provides such a modular furniture system, wherein such plurality of modular furniture components further comprises a plurality of back-contours having at least one aesthetic design. Even further, it provides such a modular furniture system, wherein such plurality of modular furniture components further comprises a plurality of back-contour covers having at least one aesthetic design. Also, it provides such a modular furniture system, wherein such plurality of modular furniture components further comprises a plurality of intermediate supports having at least one aesthetic design. In addition, it provides such a modular furniture system, further comprising the step of offering custom indicia on such modular furniture components. And, it provides such a modular furniture system, further comprising the step of constructing multiple designs of modular furniture by mixing such modular furniture components. In addition, it provides such a modular furniture system, further comprising the step of transporting such plurality of modular furniture components in exactly one dolly.

In accordance with another preferred embodiment hereof, this invention provides a modular furniture system, relating to stackable furniture having modular components, comprising the steps of: receiving at least one customer's selection of at least one raised-support; receiving such customer's selection of at least one horizontal support; receiving such customer's selection of at least one back-contour; receiving such customer's selection of at least one end-cap; and offering to rent to such customer furniture having the selected components.

In accordance with another preferred embodiment hereof, this invention provides a modular furniture system, relating to stackable furniture having modular components, comprising the steps of: receiving at least one customer's selection of at least one raised-support; receiving such customer's selection of at least one intermediate support; receiving such customer's selection of at least one horizontal support; and offering to rent to such customer furniture having the selected components. And, it provides such a modular furniture system, further comprising the step of receiving such customer's selection of at least one back-contour cover.

In accordance with another preferred embodiment hereof, this invention provides a modular furniture system, relating to stackable furniture having modular components, comprising the steps of: minimizing the use of rental-warehouse storage space per assembled furniture piece by storing separately-stacked modular furniture components; and increasing the number of furniture designs storable in such rental-warehouse storage space by storing separately-stacked modular furniture components having various aesthetic designs.

In accordance with another preferred embodiment hereof, this invention provides a modular furniture system, relating to stackable furniture having modular components, comprising the steps of: minimizing the use of rental-furniture delivery vehicle space per furniture piece by transporting separately-stacked modular furniture components; and increasing the efficiency of rental-furniture delivery by transporting separate stacks of furniture components having the customer's desired aesthetic design to the customer for assembly at the customer's site.

In accordance with another preferred embodiment hereof, this invention provides a modular furniture system, relating to stackable furniture having modular components, comprising the steps of: receiving at least one customer's order for at least two chairs having customer-selected chair frames, chair backs, and chair seats; assembling such customer-selected chair frames and such customer-selected chair backs into at least two seatless chairs; stacking such at least two seatless chairs together into at least one stack; loading such at least one stack onto at least one dolly; loading such customer-selected chair seats onto such at least one dolly; and delivering such at least one dolly to such at least one customer. Further, it provides such a modular furniture system, further comprising the steps of: receiving at least one customer's order for at least two chairs having customer-selected chair frames, chair backs, chair-back covers, and chair seats; and installing such chair-back covers on such seatless chairs.

In accordance with a preferred embodiment hereof, this invention provides a modular furniture system, relating to object-supporting furniture having modular portions, comprising: at least one chair frame adapted to frame at least one chair; at least one modular chair seat adapted to be removed from and placed on such at least one chair frame; and at least one releasable attacher adapted to releasably attach such at least one modular chair seat to such at least one chair frame; wherein such at least one chair frame comprises at least one back support adapted to support the back of at least one seated user; and wherein such at least one chair frame is adapted to allow nesting-stacking.

Moreover, it provides such a modular furniture system, further comprising at least one back-support cover adapted to substantially cover such at least one back support. Additionally, it provides such a modular furniture system, wherein such at least one back-support cover comprises at least one fabric. Also, it provides such a modular furniture system, wherein such at least one releasable attacher comprises at least one hook and loop fastener. In addition, it provides such a modular furniture system, wherein such at least one chair frame comprises: at least one frame support adapted to directly releasably support such at least one modular chair seat; and a plurality of thin leg-bars adapted to vertically support such at least one frame support above the ground; wherein such at least one frame support comprises at least one horizontal-plane aperture adapted to receive such at least one plurality of thin leg-bars of at least one other substantially identical chair frame during stacking of multiple units of such chair frames.

And, it provides such a modular furniture system, wherein at least one of such plurality of thin leg-bars comprises: at least one metal tube comprising at least one bottom end adapted to be adjacent the ground in use, at least one top end adapted to be connected to such at least one frame support, at least one inside aperture diameter, at least one outside diameter, and at least one wall thickness; wherein at least one portion of such at least one metal tube, at least including such at least one bottom end, comprises at least one reduced outside diameter and at least one increased wall thickness relative to at least one other portion of such at least one metal tube. Further, it provides such a modular furniture system, wherein such at least one portion comprises at least one work-hardened metal microstructure relative to such at least one other portion of such at least one metal tube.

Even further, it provides such a modular furniture system, further comprising at least one frame support strengthener adapted to strengthen such at least one frame support whereby such at least one frame support comprises the substantially exclusive structural connection between such plurality of thin leg-bars. Moreover, it provides such a modular furniture system, further comprising at least one transporter adapted to transport such plurality of such at least one chair frames in at least one nested-stacked configuration. Additionally, it provides such a modular furniture system, wherein such at least one transporter is adapted to transport at least about twenty-four nesting-stacked chair frames and at least about twenty-four modular chair seats simultaneously. Also, it provides such a modular furniture system, wherein such at least one transporter is adapted to transport at least about thirty-six nesting-stacked chair frames and at least about thirty-six modular chair seats simultaneously.

In addition, it provides such a modular furniture system, wherein such at least one transporter comprises: at least one chair frame holder adapted to hold at least two of such at least one chair frames which are nesting-stacked together; and at least one modular chair seat holder adapted to hold at least two of such at least one modular chair seats; wherein such at least one transporter comprises at least three wheels. And, it provides such a modular furniture system, wherein such at least one transporter comprises at least one forklift guide. And, it provides such a modular furniture system, further comprising at least one chair-foot adapted to increase the strength of such at least one chair frame. Further, it provides such a modular furniture system, wherein such at least one chair-foot comprises steel. Even further, it provides such a modular furniture system, wherein such at least one chair-foot is adapted to lower the center of gravity of such at least one chair frame. Moreover, it provides such a modular furniture system, wherein such at least one chair-foot is adapted to increase the tipping stability of such at least one chair frame. Additionally, it provides such a modular furniture system, wherein such at least one chair-foot is adapted to provide weight sufficient to increase the tipping stability of such at least one chair frame.

Also, it provides such a modular furniture system, wherein such at least one chair frame comprises at least one frame support adapted to directly releasably support such at least one modular chair seat and comprises a plurality of thin leg-bars adapted to vertically support such at least one frame support above the ground; further comprising at least one chair-leg cover adapted to cover at least one of such plurality of thin leg-bars and to not cover such at least one modular chair seat. In addition, it provides such a modular furniture system, wherein such at least one chair-leg cover is adapted to cover exactly four of such plurality of thin leg-bars and to not cover such at least one modular chair seat.

In accordance with another preferred embodiment hereof, this invention provides a modular furniture system, relating to stackable furniture having removable modular horizontal support portions, comprising the steps of: providing stackable furniture with removable horizontal supports and back covers; removing such horizontal supports; removing such back covers; nesting-stacking such stackable furniture; separately storing such back covers; and separately storing such horizontal supports. And, it provides such a modular furniture system, further comprising the steps of: providing stackable furniture with chair-leg covers; removing such chair-leg covers from such stackable furniture; and separately storing such chair-leg covers.

In accordance with another preferred embodiment hereof, this invention provides a modular furniture system, relating to stackable furniture having modular components, comprising the steps of: receiving at least one customer's selection of at least one chair frame; receiving such customer's selection of at least one chair seat; receiving such customer's selection of at least one back cover; and providing to such customer furniture comprising the selected components.

Further, it provides such a modular furniture system, further comprising the step of receiving such customer's selection of at least one chair-leg cover. Even further, it provides such a modular furniture system, further comprising the step of manufacturing such at least one chair frame. Even further, it provides such a modular furniture system, wherein such step of providing to such customer furniture comprising the selected components comprises the step of renting to such customer furniture comprising the selected components. Even further, it provides such a modular furniture system, wherein such step of providing to such customer furniture comprising the selected components comprises the step of selling to such customer furniture comprising the selected components. Even further, it provides such a modular furniture system, wherein such step of selling to such customer furniture comprising the selected components comprises the step of providing at least one franchise to such customer.

Even further, it provides such a modular furniture system, wherein such step of providing at least one franchise to such customer comprises the step of providing at least one chair rental territory to such at least one customer. Even further, it provides such a modular furniture system, wherein such step of providing at least one franchise to such customer comprises the step of offering at least one chair seat having at least one new aesthetic design to such at least one customer. Even further, it provides such a modular furniture system, wherein such step of providing at least one franchise to such customer comprises the step of offering at least one back cover having at least one new aesthetic design to such at least one customer. Even further, it provides such a modular furniture system, wherein such step of providing at least one franchise to such customer comprises the step of offering at least one chair frame having at least one new aesthetic design to such at least one customer. Even further, it provides such a modular furniture system, wherein such step of providing at least one franchise to such customer comprises the step of offering at least one chair-leg cover having at least one new aesthetic design to such at least one customer.

Even further, it provides each and every novel feature, element, combination, step and/or method disclosed or suggested by this provisional patent application.

BRIEF DESCRIPTION OF THE DRAWINGS

FIG. 7A shows a front perspective view illustrating the chair frame according to FIG. 4.

FIG. 7B shows a side view illustrating the chair frame according to FIG. 4.

FIG. 7C shows a top plan view illustrating the chair frame according to FIG. 4.

FIG. 7D shows a front view illustrating the chair frame according to FIG. 4.

FIG. 16A shows a partial perspective view illustrating a table frame and a plain toplet according to a preferred embodiment of the present invention.

FIG. 16B shows a partial perspective view illustrating a table frame and a plain toplet having two toplet attachers according to a preferred embodiment of the present invention.

FIG. 16C shows a partial perspective view illustrating a table frame and a plain toplet having two toplet attachers, one of which is a height-adjusting toplet attacher, according to a preferred embodiment of the present invention.

FIG. 16D shows a partial perspective view illustrating a decorative toplet having two toplet attachers according to a preferred embodiment of the present invention.

FIG. 32 shows a side view illustrating the dolly according to FIG. 29, with the seat basket and the top chair support folded outward.

FIG. 33 shows a side view illustrating the dolly according to FIG. 29, with the top chair support folded outward.

FIG. 47A shows a top plan view, partially in section, illustrating a chair seat according to the preferred embodiment of the present invention.

FIG. 47B shows a bottom plan view illustrating the chair seat according to the preferred embodiment of FIG. 47A.

FIG. 47C shows a front view illustrating the chair seat according to the preferred embodiment of FIG. 47A.

FIG. 48 shows a bottom plan view illustrating the chair seat (according to the preferred embodiment of FIG. 47A) attached to the modular stackable chair frame according to the preferred embodiment of FIG. 43.

FIG. 62A shows a front view illustrating a reinforced front chair foot installed in a front leg according to the preferred embodiment of FIG. 43.

FIG. 62B shows a front view illustrating the reinforced front chair foot according to the preferred embodiment of FIG. 62A.

FIG. 62C shows section 62C-62C of FIG. 62A illustrating the tapered strengthened chair front leg according to the preferred embodiment of FIG. 62A.

FIG. 62D shows a front view illustrating the floor cap according to the preferred embodiment of FIG. 62A.

FIG. 62E shows a top view illustrating the floor cap according to the preferred embodiment of FIG. 62D.

FIG. 62F shows section 62C-62C of FIG. 62A illustrating the tapered strengthened chair front leg with the front foot installed according to the preferred embodiment of FIG. 62A.

FIG. 63A shows a front view illustrating a rear chair foot installed in a rear leg according to the preferred embodiment of FIG. 43.

FIG. 63B shows a front view illustrating the rear chair foot according to the preferred embodiment of FIG. 63A.

FIG. 63C shows a top view illustrating the rear chair foot according to the preferred embodiment of FIG. 63A.

FIG. 63D shows section 63D-63D of FIG. 63A illustrating the tapered strengthened chair rear leg according to the preferred embodiment of FIG. 63A.

FIG. 63E shows section 63D-63D of FIG. 63A illustrating the tapered strengthened chair rear leg with the rear foot installed according to the preferred embodiment of FIG. 63A.

DETAILED DESCRIPTION OF THE BEST MODES AND PREFERRED EMBODIMENTS OF THE INVENTION

Figure 1:
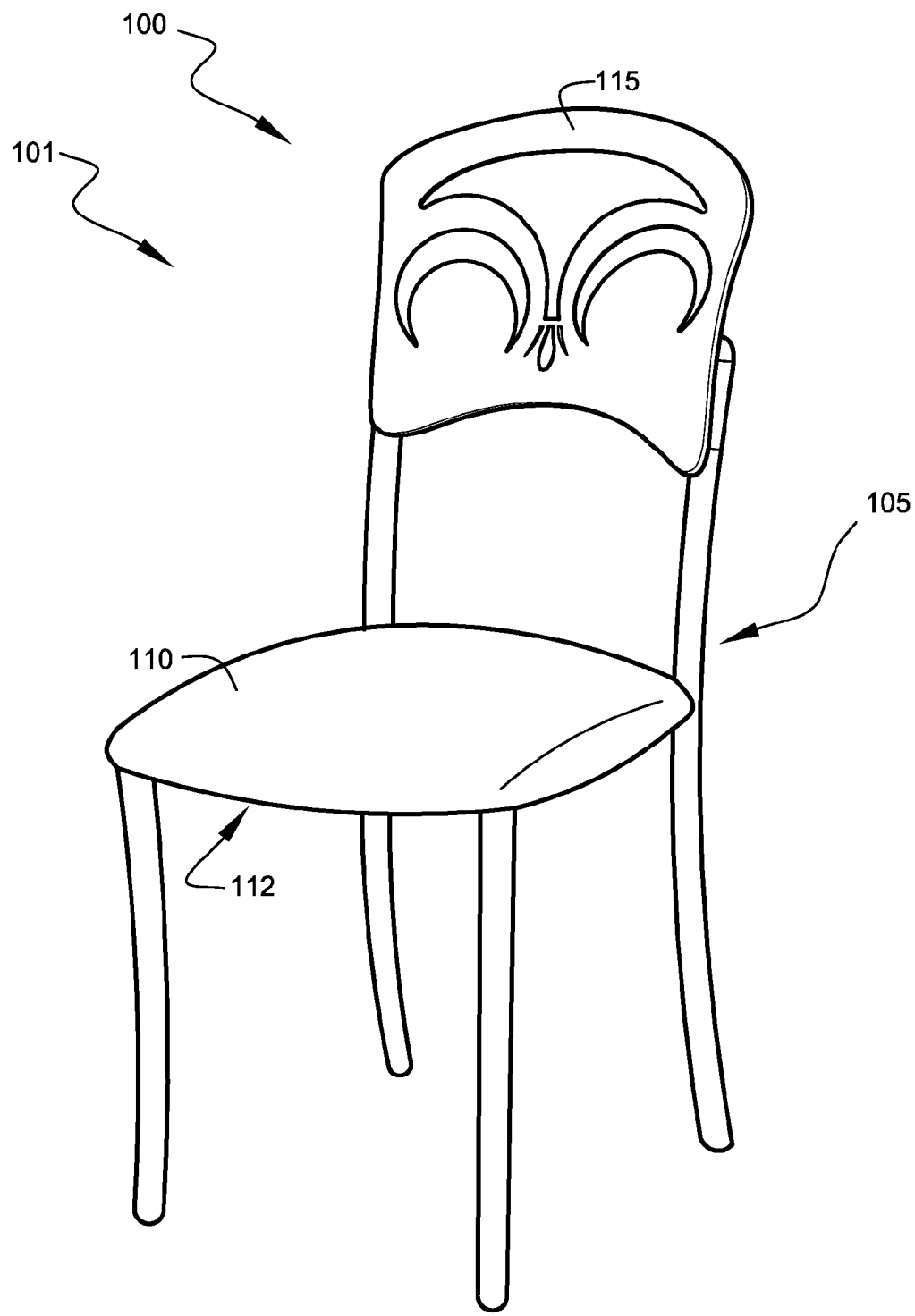
FIG. 1 shows a perspective view illustrating a modular stackable chair according to a preferred embodiment of the present invention.

FIG. 1 shows a perspective view illustrating a modular stackable chair 101 according to a preferred embodiment of the present invention. Preferably, modular furniture system 100 comprises modular stackable chair 101, as shown. Preferably, modular stackable chair 101 comprises chair frame 105, chair seat 110, and chair back 115, as shown. Preferably, chair back 115 and chair seat 110 are easily removable from chair frame 105, as shown. Preferably, multiple styles and designs of chair backs 115 and chair seats 110 may be attached to chair frame 105 to create a variety of chairs having different aesthetics (at least embodying herein wherein multiple designs of modular furniture may be constructed by mixing such modular furniture components), as shown.

Figure 2:
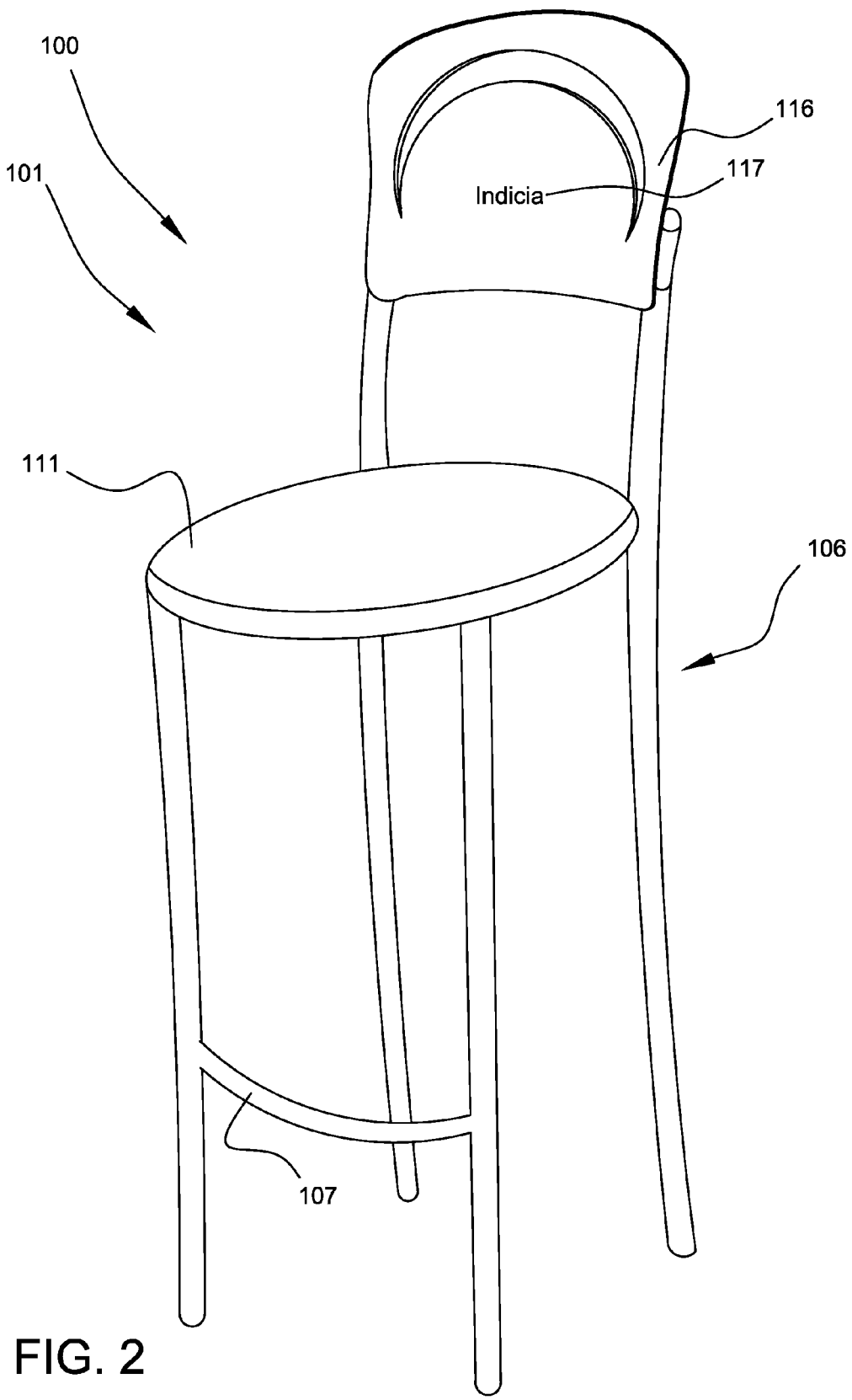
FIG. 2 shows a perspective view illustrating a modular stackable bar stool according to a preferred embodiment of the present invention.

FIG. 2 shows a perspective view illustrating a modular stackable chair 101 according to a preferred embodiment of the present invention. Preferably, modular stackable chair 101 comprises chair frame 106, back 116, and seat 111, as shown. Preferably, chair frame 106 functions substantially identically to chair frame 105, only having a different height, color, finish, design, or material, etc., as shown. Preferably, chair back 116 functions substantially identically to chair back 115, only having a different height, color, finish, design, or material, etc., as shown. Preferably, chair seat 110 functions substantially identically to chair seat 111, only having a different height, color, finish, design, or material, etc., as shown. Preferably, back 115 and seat 110 may be attached to chair frame 106 in exactly the same way they are described attached to chair frame 105, and back 116 and seat 111 may be attached to chair frame 105 in exactly the same way they are described attached to chair frame 106; i.e., chair frames 105 and 106, chair backs 115 and 116, and chair seats 110 and 111 are preferably completely interchangeable, as shown. Upon reading the teachings of this specification, those of ordinary skill in the art will now understand that, under appropriate circumstances, such as user preference, advances in technology, intended use, etc., other interchangeable designs of chair backs, chair seats, and chair frames, such as various chair seat designs, various chair frame designs, various chair back designs, various materials, various colors, etc., may suffice.

Preferably, chair back 116 comprises custom indicia 117, as shown. Preferably, custom indicia 117 may be placed in a chair back 116, as shown (and/or on chair seat 111, and/or on chair frame 106, etc.), to provide advertising, such as, for example, a hotel chain having the name of the hotel placed on chair back 116, as shown. This feature is an example that the present invention enables furniture renters/retailers to offer custom furniture at the extra cost of customizing a component instead of at the cost of building an entire piece of custom furniture, creating a salable advantage over competitors.

Preferably, chair frame 106 (at least embodying herein at least one chair frame adapted to frame at least one chair) comprises footrest 107, as shown. Upon reading the teachings of this specification, those of ordinary skill in the art will now understand that, under appropriate circumstances, such as user preference, advances in technology, intended use, etc., other chair frame components, such as additional struts, armrests, etc., may suffice.

Figure 3A:
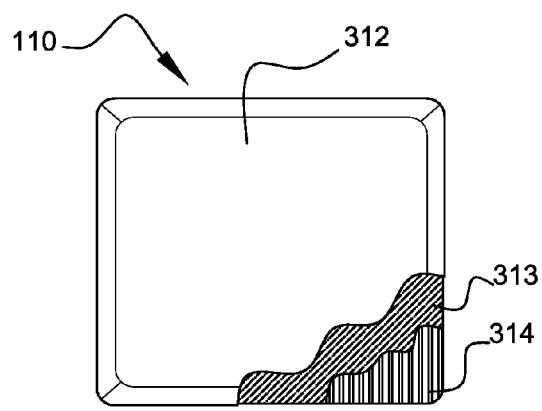
FIG. 3A shows a top plan view illustrating a chair seat according to a preferred embodiment of the present invention.

FIG. 3A shows a top plan view, partially in section, illustrating a chair seat 110 according to a preferred embodiment of the present invention. Preferably, chair seat 110 (at least embodying herein horizontal support means for providing an essentially-horizontal surface able to support objects; and at least embodying herein at least one horizontal support adapted to provide an essentially-horizontal surface able to support objects; and at least embodying herein at least one modular chair seat adapted to be removed from and placed on said at least one chair frame) is an upholstered chair seat comprising a top layer 312, a padding layer 313, and a base 314, as shown. Preferably, top layer 312 comprises an attractive and durable surface such as, for example, fabric, leather, vinyl, etc. Preferably, padding layer 313 comprises a comfortable, durable padding material, such as, for example, fiberfill, foam, down, cotton, etc. Preferably, base 314 comprises a durable, strong, rigid material, such as, for example, metal, wood, particleboard, plastic, composite, etc. Preferably, chair seat 110 (at least embodying herein wherein such at least one horizontal support comprises at least one chair seat; and at least embodying herein wherein such horizontal support means comprises at least one chair seat) is of any size and shape that fits chair frame 105, such as, for example, square (as shown), rectangular, round (as shown), oval, tetrahedron, novelty, etc. Preferably, chair seat 110 is assembled using standard upholstery techniques. Upon reading the teachings of this specification, those of ordinary skill in the art will now understand that, under appropriate circumstances, such as user preference, advances in technology, intended use, aesthetic preference, etc., other materials, layers, and designs, such as only a base layer, additional layers, body contour shapes, other materials, etc., may suffice.

Figure 3B:
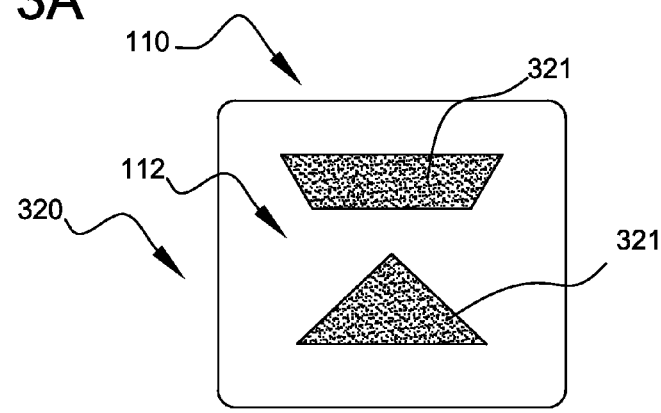
FIG. 3B shows a bottom plan view illustrating the chair seat according to FIG. 3A.

FIG. 3B shows a bottom plan view illustrating chair seat 110 according to FIG. 3A. Preferably, modular stackable chair 101 comprises seat attachers 320, as shown, which function as positional stabilizers to provide positional stability of chair seat 110 on chair frame 105, as shown. Preferably, seat attachers 320 (at least embodying herein first releasable attacher means for releasably attaching such horizontal support means to such raised-support means; and at least embodying herein at least one releasable attacher adapted to releasably attach said at least one modular chair seat to said at least one chair frame) comprise tool-free attachers, preferably releasable pressure-activated fasteners, most preferably hook and loop fasteners 321 (at least embodying herein wherein such at least one positional stabilizer comprises at least one hook and loop fastener), as shown. Preferably, one portion of hook and loop fasteners 321 are attached to the bottom of chair seat 110 in a position to engage the other portion of hook and loop fasteners 321 which are attached to chair frame 105 (as shown, especially in FIG. 7C) when chair seat 110 is properly positioned on chair frame 105, as shown. Upon reading the teachings of this specification, those of ordinary skill in the art will now understand that, under appropriate circumstances, such as user preference, advances in technology, intended use, etc., other seat attachers, such as hooks, latches, snaps, straps, a single seat attacher, multiple seat attachers, etc., may suffice.

Figure 3C:
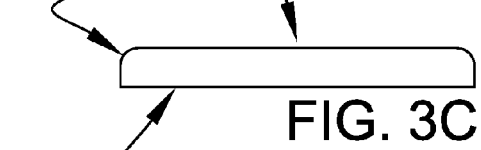
FIG. 3C shows a front view illustrating the chair seat according to FIG. 3A.

FIG. 3C shows a front view illustrating chair seat 110 according to FIG. 3A. Preferably, chair seat 110 has comfortable rounded edges 330, as shown. Upon reading the teachings of this specification, those of ordinary skill in the art will now understand that, under appropriate circumstances, such as user preference, advances in technology, intended use, etc., other chair seat shapes, such as edges extending below the bottom of the seat, curved edges, scalloped edges, etc., may suffice.

Figure 4:
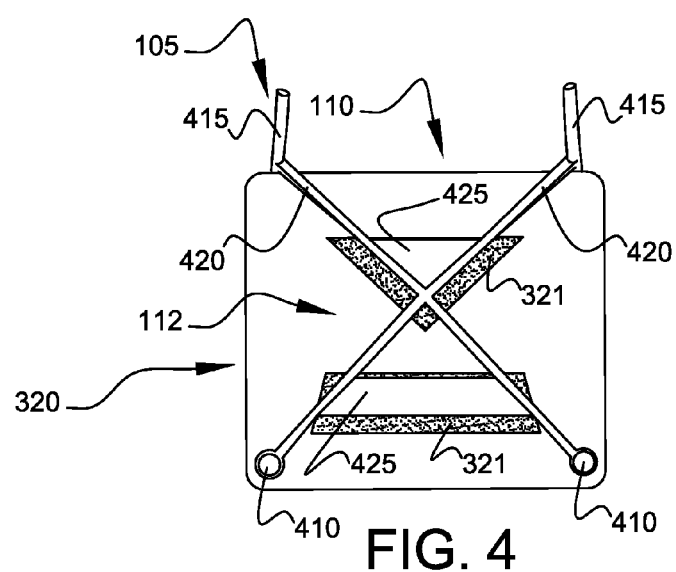
FIG. 4 shows a bottom plan view illustrating the chair seat according to FIG. 3A attached to a modular stackable chair frame according to a preferred embodiment of the present invention.

FIG. 4 shows a bottom plan view illustrating chair seat 110 (according to FIG. 3A) attached to modular stackable chair frame 105 according to a preferred embodiment of the present invention. Preferably, chair frame 105 (at least embodying herein raised-support means for supporting such horizontal support means at least one distance above a floor; and at least embodying herein at least one rigid raised-support adapted to support such at least one horizontal support at least one distance above a floor) comprises front legs 410, back legs 415, crossbars 420, and crossbar plates 425, as shown. Preferably, each crossbar 420 connects one front leg 410 and one back leg 415 together, as shown. Preferably, crossbars 420 cross, and are joined together, approximately in the middle of crossbars 420, as shown. Preferably, crossbar plates 425 are thin strips of material that connect crossbars 420 to each other, as shown, and also support seat attachers 320, which most preferably comprise hook and loop fasteners 321 (as shown especially in FIG. 7C). Upon reading the teachings of this specification, those of ordinary skill in the art will now understand that, under appropriate circumstances, such as user preference, advances in technology, intended use, etc., other chair frame components, such as no crossbar plates, additional crossbar plates, other shapes of crossbar plates, thick crossbar plates, curved crossbars, etc., may suffice.

Preferably, chair seat 110 is installed on chair frame 105 by placing bottom 112 of the chair seat 110 against the top 426 of the crossbar plates 425, as shown, so that seat attachers 320 (at least embodying herein positional stabilizer means for assisting positional stability of such horizontal support means when supported by such raised-support means; wherein such positional stabilizer means comprises releasable attacher means for releasably pressure-activating such positional stabilizer means; and at least embodying herein at least one positional stabilizer adapted to assist positional stability of such at least one horizontal support when supported by such at least one raised-support means wherein such at least one positional stabilizer comprises at least one releasable attacher adapted to releasably pressure-activate such at least one positional stabilizer) are pressed together and lock to each other. Preferably, using preferred hook-and-loop-type fasteners, chair seat 110 is removed from chair frame 105 by lifting up on chair seat 110 with sufficient force to release seat attachers 320. Then, chair frames 105 may be nesting-stacked or spirally nesting-stacked, all as hereinafter more particularly described, and chair seats 110 may be stacked separately or otherwise stored.

Preferably, chair frame 105 comprises at least one strong, rigid material, preferably metal, most preferably steel. Upon reading the teachings of this specification, those of ordinary skill in the art will now understand that, under appropriate circumstances, such as user preference, advances in technology, intended use, etc., other rigid materials, such as other metals, plastics, wood, bamboo, composite materials, multiple materials, etc., may suffice.

Figure 5:
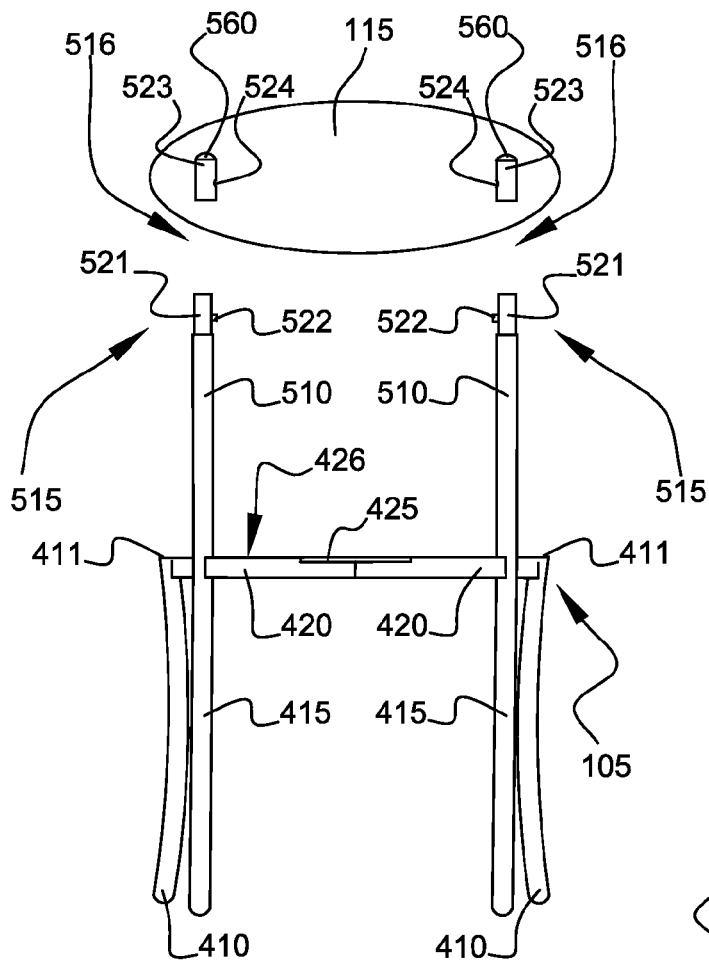
FIG. 5 shows an exploded back view illustrating a modular chair back and a modular stackable chair frame according to the preferred embodiment of FIG. 4.

FIG. 5 shows an exploded back view illustrating modular chair back 115 and modular stackable chair frame 105 according to the preferred embodiment of FIG. 4. Preferably, chair frame 105 comprises back struts 510, as shown. Preferably, back 115 (at least embodying herein back-contour support means for supporting at least one contour of at least one human back, wherein such back-contour support means is substantially perpendicular to such horizontal support means; and at least embodying herein back-contour support means for supporting at least one contour of at least one human back, wherein such back-contour support means is substantially perpendicular to such horizontal support means; and at least embodying herein at least one back support adapted to support the back of at least one seated user) attaches to back struts 510 (at least embodying herein raised frame means for providing an essentially raised frame to support such back contour support means above such horizontal support means; and at least embodying herein at least one raised frame adapted to provide an essentially raised frame to support such at least one back-contour support above such at least one horizontal support; and at least embodying herein at least one raised frame adapted to support said at least one back support above said at least one chair frame) with back attachers 515, as shown. Preferably, back attachers 515 (at least embodying herein releasable locking attacher means for releasably attaching such back-contour support means to such raised frame means; and at least embodying herein at least one releasable attacher adapted to releasably attach such at least one back-contour support to such at least one raised frame; and at least embodying herein at least one releasable back support attacher adapted to releasably attach said at least one back support to said at least one raised frame) comprise releasable fasteners, most preferably button lock tubes 516 (at least embodying herein second releasable attacher means for releasably attaching such back-contour support means to such raised frame means), as shown. Preferably, each button lock tube 516 (at least embodying herein wherein such releasable locking attacher means comprises locking tube means for concentric tube locking such back-contour support means and such raised frame means together; and at least embodying herein wherein such at least one releasable attacher comprises at least one locking tube adapted to lock such at least one back-contour support and such at least one raised frame together) comprises male tube 521, spring-loaded button 522, female tube 523, and buttonhole 524, as shown. Preferably, each back strut 510 comprises one male tube 521 and one spring-loaded button 522, as shown. Preferably, each chair back 115 comprises two female tubes 523, each having at least one buttonhole 524, as shown. Preferably, female tubes 523 on chair back 115 align with male tubes 521 on back struts 510, as shown. Preferably, spring-loaded buttons 522 align with buttonholes 524 to lock chair back 115 in place on chair frame 105 (as shown especially in FIG. 6). Preferably, chair back 115 may be removed from chair frame 105 by simultaneously depressing both spring-loaded buttons 522 and lifting chair back 115 off of chair frame 105. Upon reading the teachings of this specification, those of ordinary skill in the art will now understand that, under appropriate circumstances, such as user preference, advances in technology, intended use, etc., other arrangements, such as other back attachers, back attachers having adjustable heights, the back struts comprising the female tubes and the chair back comprising the male tubes, etc., may suffice.

Preferably, chair back 115 comprises end caps 560, which insert into the tops of female tubes 523, as shown, in order to seal and decorate the tops of female tubes 523, as shown. Preferably, end caps 560 (at least embodying herein end-cap means for end-capping such releasable locking attacher means; and at least embodying herein at least one cap adapted to cap such at least one releasable attacher) are removable and replaceable, and are held in the tops of female tubes 523 by friction, as shown. Preferably, end caps 560 match the finish of female tubes 523, which preferably match the finish of seat back 115. In another preferred embodiment, end caps 560 match the finish of back struts 510. Upon reading the teachings of this specification, those of ordinary skill in the art will now understand that, under appropriate circumstances, such as user preference, advances in technology, intended use, etc., other end caps, such as integral end caps, welded end caps, end caps of other materials, other finishes, etc., may suffice.

Preferably, rental customers may choose the style, finish, color, etc., of each component of modular furniture system 100, creating modular stackable furniture meeting the customer's aesthetic requirements from at least one small and easily-stored rental stock of components. Preferably, furniture renters benefit by maintaining at least one small and varied stock of components able to meet almost any customer's needs. For example, a renter stocking five chair frame 105 designs, ten chair back 115 designs, and ten chair seat 110 designs can offer five hundred different modular stackable chair 101 designs for rent.

Figure 6:
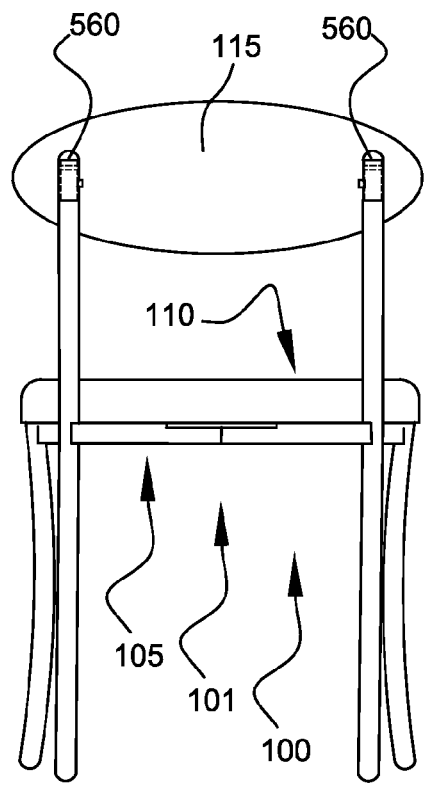
FIG. 6 shows a back view illustrating a fully assembled modular stackable chair according to the preferred embodiment of FIG. 4.

FIG. 6 shows a back view illustrating fully assembled modular stackable chair 101 according to the preferred embodiment of FIG. 4. Preferably, chair back 115 and chair seat 110 attach to chair frame 105 strongly enough to remain attached during normal use, but detach quickly and easily for transportation, storage, and design changes.

Preferably, chair back 115 comprises at least one strong, rigid material, preferably an upholstered back, more preferably bare metal, most preferably steel. Upon reading the teachings of this specification, those of ordinary skill in the art will now understand that, under appropriate circumstances, such as user preference, advances in technology, intended use, etc., other materials, such as other metals, plastics, wood, bamboo, composite materials, multiple materials, etc., may suffice.

FIG. 7A shows a front perspective view illustrating chair frame 105 according to FIG. 4. Preferably, in order to conserve weight and space, chair frame 105 is constructed with thin tubes and struts, preferably by welds, as shown. Upon reading the teachings of this specification, those of ordinary skill in the art will now understand that, under appropriate circumstances, such as user preference, advances in technology, intended use, etc., other construction methods, such as rugged construction with larger tubes and struts, assembly with nuts and bolts, solid (non-tube) pieces, molded plastic, etc., may suffice.

Preferably, where chair frame 105 and/or chair back 115 (and/or chair seat 110) are made of metal, the metal is coated for aesthetics and durability, most preferably powder coated, as shown. Preferably, the powder coat is of an attractive event-type color, such as, for example, gold vein, silver vein, black, white, purple, etc. Preferably, the event furniture renter keeps a stock of several colors and finishes of chair frame 105 which the customer may choose from.

FIG. 7B shows a side view illustrating chair frame 105 according to FIG. 4. Preferably, in order to meet the aesthetic demands of the ballroom chair use and/or rental trade, chair frame 105 has an elegant gently curved shape, as shown. Preferably, chair frame 105 is constructed with round tubular steel for legs 410 and 415 and back struts 510, and rectangular steel tubes or bars for crossbars 420 and crossbar plates 425, as shown. Upon reading the teachings of this specification, those of ordinary skill in the art will now understand that, under appropriate circumstances, such as user preference, advances in technology, intended use, etc., other shapes and designs, such as other shapes of tubes and bars, baroque, art deco, angular, etc., may suffice.

FIG. 7C shows a top plan view illustrating chair frame 105 according to FIG. 4. The placement of hook and loop fasteners 321 is especially illustrated in this view, as shown. Upon reading the teachings of this specification, those of ordinary skill in the art will now understand that, under appropriate circumstances, such as user preference, advances in technology, intended use, etc., other seat attachment placements, such as on the crossbars, on only one crossbar plate, on the back struts, etc., may suffice.

FIG. 7D shows a front plan view illustrating chair frame 105 according to FIG. 4. Preferably, crossbars 420, crossbar plates 425, and tops 411 of front legs 410 create at least one horizontal plane of support for chair seat 110, as shown. Preferably, chair seat 110 at least covers crossbars 420 (at least embodying herein frame support means for directly releasably supporting such horizontal support means; and at least embodying herein at least one frame support adapted to directly releasably support such at least one horizontal support), crossbar plates 425, and the tops of front legs 410, as shown. Upon reading the teachings of this specification, those of ordinary skill in the art will now understand that, under appropriate circumstances, such as user preference, advances in technology, intended use, etc., other chair seat support contours, such as recessed, curved, etc., may suffice, as long as the chair seat is properly supported in use.

Figure 8:
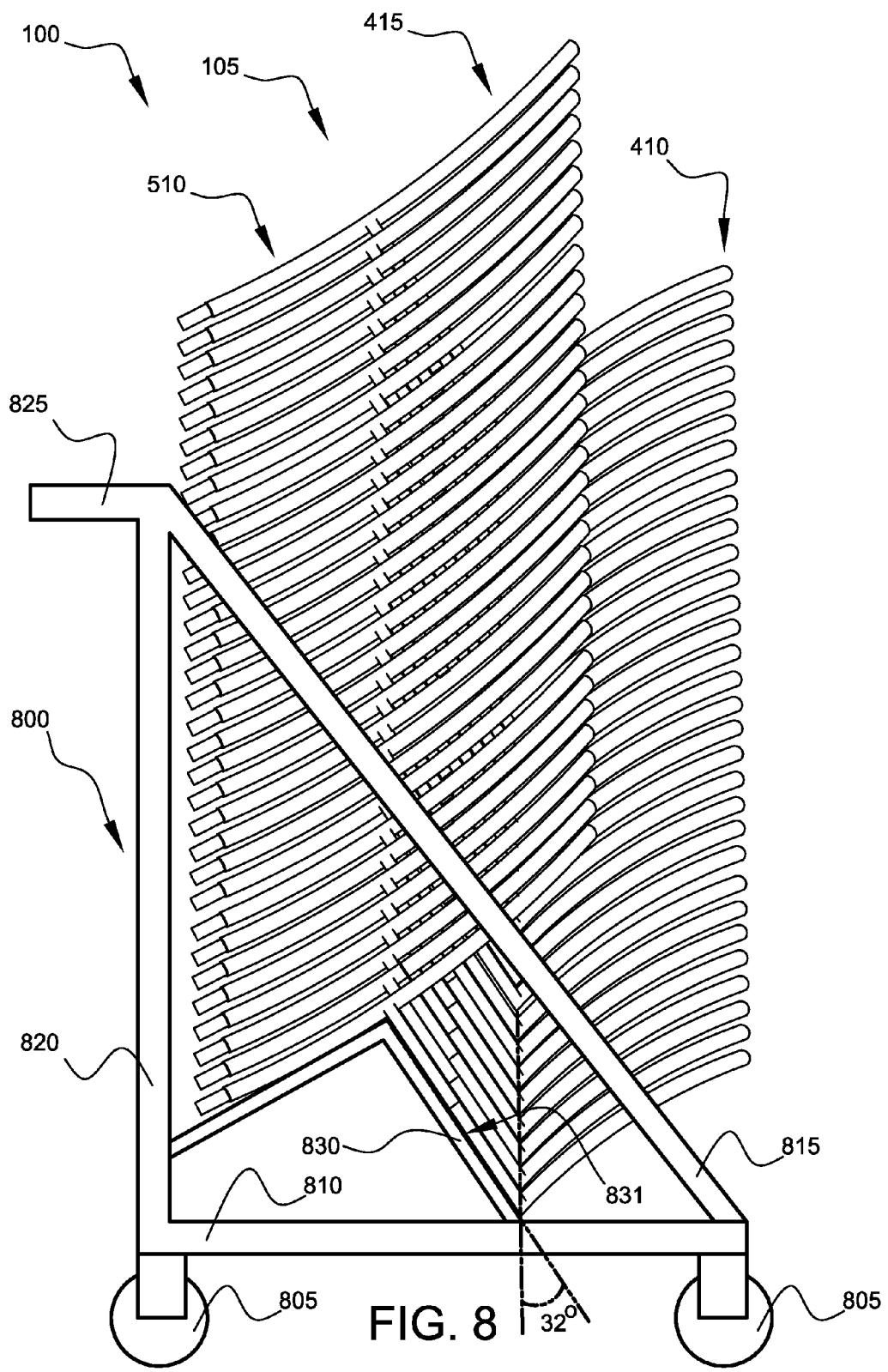
FIG. 8 shows a side view illustrating stacked chair frames on a dolly according to a preferred embodiment of the present invention.

FIG. 8 shows a side plan view illustrating stacked chair frames 105 on dolly 800 according to a preferred embodiment of the present invention. Preferably, modular stackable furniture system 100 comprises dolly 800, as shown. Preferably, dolly 800 is adapted to transport many chair frames 105 in at least one nesting-stacked configuration, as shown. Preferably, dolly 800 comprises wheels 805, platform 810, side rail 815, back rail 820, handle 825, and chair support structure 830, as shown. Preferably, chair support structure 830 (at least embodying herein wherein such transporter means comprises vertical support means for supporting such at least one nested stack of such plurality of such raised-support means in an approximately vertical position; and at least embodying herein wherein such at least one transporter comprises at least one vertical support adapted to support such plurality of such at least one raised-supports in a nested-stacked configuration in an approximately vertical position) is shaped and angled to permit chair frames 105 to be stacked approximately vertically, as shown. Upon reading the teachings of this specification, those of ordinary skill in the art will now understand that, under appropriate circumstances, such as user preference, advances in technology, intended use, etc., other dolly arrangements, such as no platform, addition of brakes, etc., may suffice.

Preferably, chair frames 105 (at least embodying herein a plurality of such raised-support means; and a plurality of such at least one raised-supports) are nesting-stacked onto dolly 800 by placing front legs 410 and back legs 415 of an upper chair frame 105 behind and above front legs 410 and back legs 415 (at least embodying herein a plurality of thin raised leg-bars supporting such frame support means wherein such frame support means comprises horizontal-plane aperture means for providing apertures for such plurality of thin raised leg-bars; and at least embodying herein a plurality of thin raised leg-bars supporting such at least one frame support means wherein such at least one frame support means comprises at least one horizontal-plane aperture adapted to providing apertures for such at least one plurality of thin raised leg-bars) of lower chair frame 105 (at least embodying herein nesting-stacker means for providing stackable nesting of such plurality of such raised-support means upon release of attachment of such releasable pressure-activated attacher means; and at least embodying herein at least one nesting-stacker adapted to providing stackable nesting of such at least one plurality of such at least one raised-supports upon release of attachment of such at least one first releasable attacher; and at least embodying herein wherein such at least one chair frame is nesting-stackable; and at least embodying herein wherein such at least one chair frame is adapted to allow nesting-stacking), in a repeating fashion, as shown. The open structure, such as that created by the X configuration of crossbars 420, of chair frame 105 provides ample space for the front legs 410 and back legs 415 of nested chair frames 105, as shown. Preferably, for commercial purposes, up to about forty chair frames 105 may be stacked on dolly 800 (at least embodying herein transporter means for transporting at least one nested stack of such plurality of such raised-support means; and at least embodying herein at least one transporter adapted to transport a plurality of such at least one raised-supports in a nested-stacked configuration), in a manner as shown. Additionally, a smaller number of chair frames 105 may be stacked on the floor by preferably placing front legs 410 and back legs 415 of an upper chair frame 105 in front and above front legs 410 and back legs 415 of an upright lower chair frame 105 (at least embodying herein wherein at least one lower frame-support means may stackably support at least one upper frame-support means; and at least embodying herein wherein at least one lower frame-support may stackably support at least one upper frame-support), in a repeating fashion. Upon reading the teachings of this specification, those of ordinary skill in the art will now understand that, under appropriate circumstances, such as user preference, advances in technology, intended use, etc., other nesting-stackable chair frames may suffice.

The height of any nested stack of chair frames 105 is primarily a function of the thickness of crossbars 420, back struts 510, front legs 410, and back legs 415, as shown. The angle of rise of any nested stack of forty chair frames 105 is also primarily a function of the thickness of crossbars 420, back struts 510, front legs 410, and back legs 415, as shown. Therefore, the angle of chair support structure 830 must be set to support any nested stack of chair frames 105 having certain dimensions in an approximately vertical position; i.e., when chair frames 105 are redesigned with different dimensions, the chair support structure 830 (at least embodying herein wherein such vertical support means comprises at least one adjustable angle of support; and at least embodying herein wherein such at least one vertical support has at least one adjustable angle of support) will also be changed. In the present example, front 831 of chair support structure 830 is approximately 32 degrees from vertical, as shown. Upon reading the teachings of this specification, those of ordinary skill in the art will now understand that, under appropriate circumstances, such as user preference, advances in technology, intended use, etc., other arrangements, such as adjustable angle chair support structures, etc., may suffice.

Figure 9:
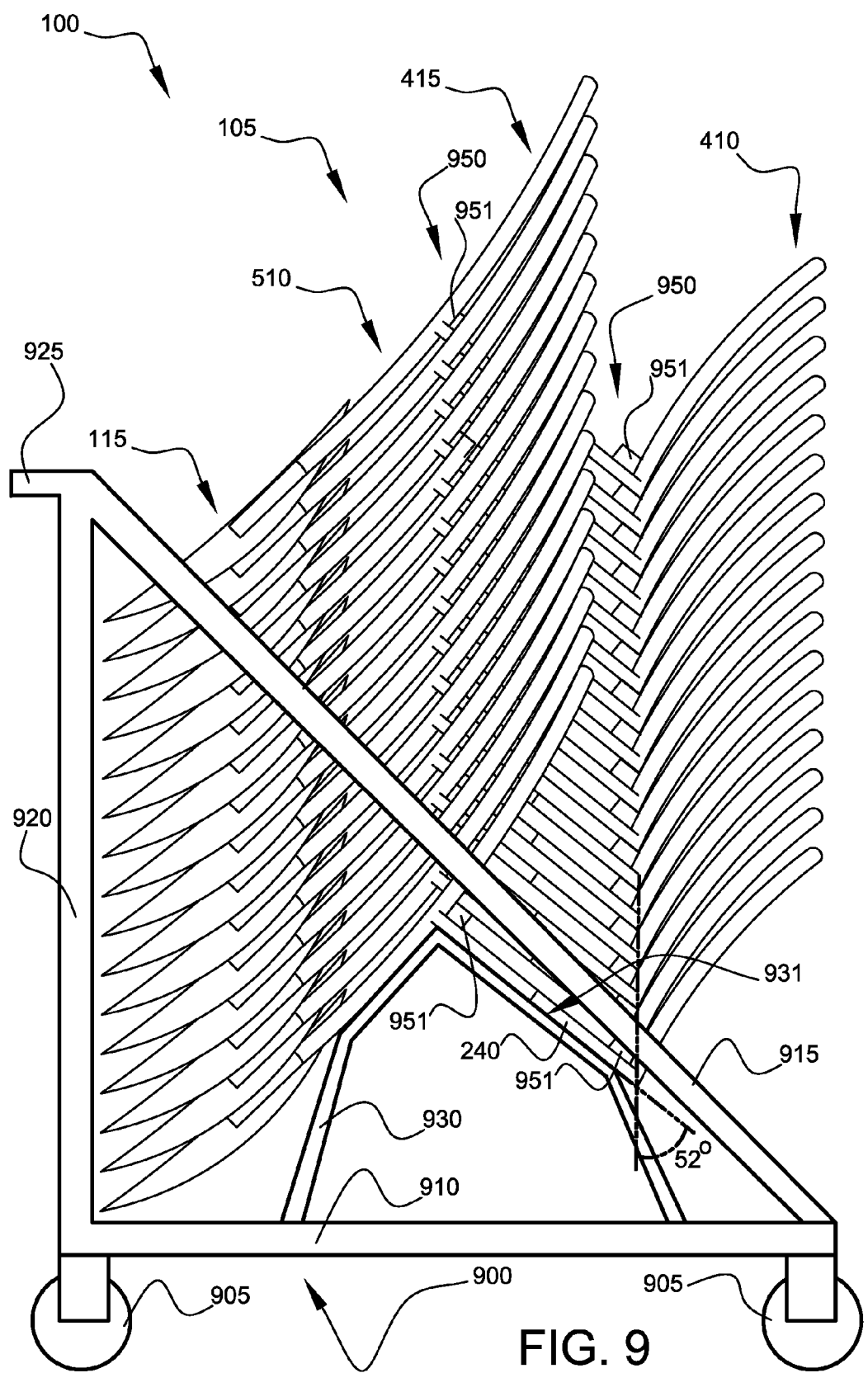
FIG. 9 shows a side view illustrating stacked chair frames with backs on a dolly according to a preferred embodiment of the present invention.

FIG. 9 shows a side plan view illustrating stacked chair frames 105 with backs 115 on dolly 900 according to a preferred embodiment of the present invention. Preferably, modular furniture system 100 comprises dolly 900, as shown. Preferably, dolly 900 is adapted to transport many chair frames 105 in at least one nesting-stacked configuration, with backs 115 still on, as shown. This requires additional spacing between each chair frame 105 to prevent damage to chair backs 115, as shown. Preferably, dolly 900 comprises wheels 905, platform 910, side rail 915, back rail 920, handle 925, and chair support structure 930, as shown. Preferably, chair support structure 930 is shaped and angled to permit chair frames 105 with backs 115 to be stacked approximately vertically, as shown. In this embodiment, chair support structure 930 has also been raised above platform 910 to accommodate the extra length of chair backs 115, as shown. Upon reading the teachings of this specification, those of ordinary skill in the art will now understand that, under appropriate circumstances, such as user preference, advances in technology, intended use, etc., other dolly arrangements, such as no platform, addition of brakes, adjustable angle of the chair support structure, etc., may suffice.

Preferably, chair frames 105 comprise spacers 950, as shown. Preferably, spacers 950 space chair frames 105 far enough apart during nesting-stacking that chair backs 115 do not touch or damage each other during storage or transportation, as shown. Preferably, spacers 950 (at least embodying herein wherein such nesting-stacker means comprises spacer means for spacing such plurality of such raised-supports apart from each other in at least one nested configuration; and at least embodying herein wherein such at least one nesting-stacker comprises at least one spacer adapted to space such plurality of such at least one raised-supports apart from each other in at least one nested-stacked configuration) comprise metal blocks 951, more preferably four metal blocks 951, attached to the underside of crossbars 420 near front legs 410 and back legs 415, as shown. Preferably, spacers 950 change the stacking angle of the chair frames 105, and therefore dolly 900 requires at least one differently angled chair support structure 930 than dolly 800, in order to provide at least one vertical stack of chair frames 105. In the present example, the front 931 of chair support structure 930 is approximately 52 degrees from vertical, as shown. Upon reading the teachings of this specification, those of ordinary skill in the art will now understand that, under appropriate circumstances, such as user preference, advances in technology, intended use, etc., other spacing arrangements, such as spacers inherent in the dolly, removable spacers, spacers of other thicknesses and placements, etc., may suffice. Upon reading the teachings of this specification, those of ordinary skill in the art will now understand that, under appropriate circumstances, such as user preference, advances in technology, intended use, etc., other methods of protecting chair backs from damage during stacking, such as padding between the backs, protective bags over the backs, etc., may suffice.

Figure 10A:
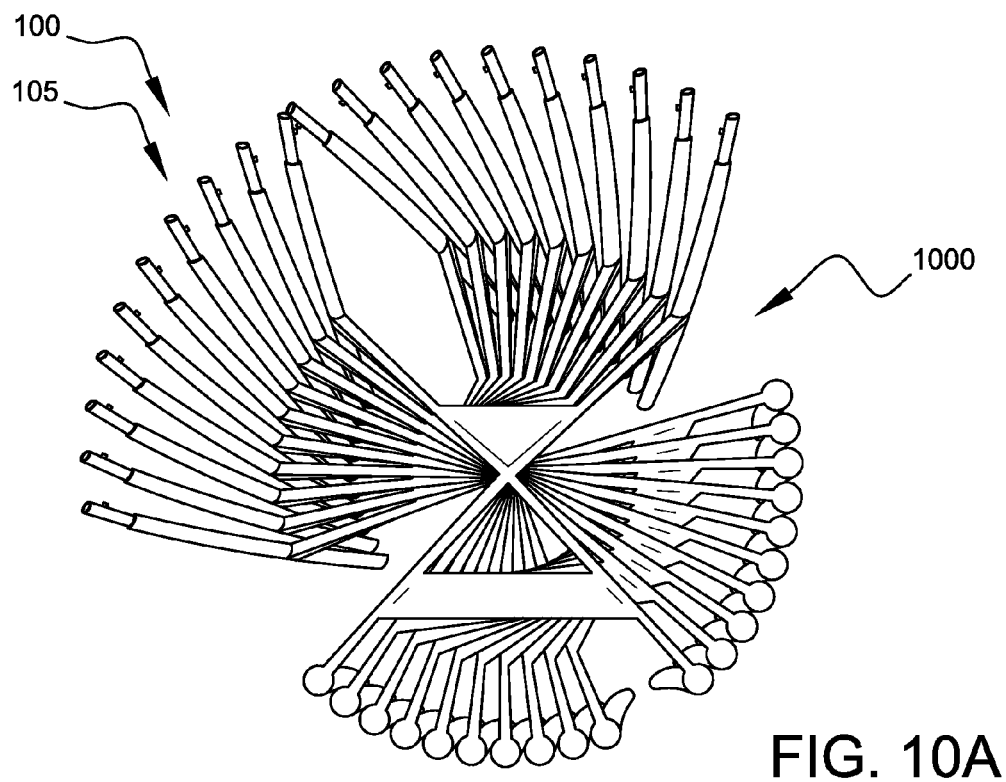
FIG. 10A shows a top plan view illustrating a clockwise spiral stack of chair frames according to a preferred embodiment of the present invention.

FIG. 10A shows a top plan view illustrating one clockwise spiral stack of chair frames 105 according to a preferred embodiment of the present invention. Preferably, chair frames 105 may also be spirally nesting stacked, as shown. Preferably, chair frames 105 are spirally nesting stacked by placing one first chair frame 105 upright on the floor, rotating one second upright chair frame 105 by approximately the width of chair leg 410 or 415, and placing such second chair frame 105 directly onto such first chair frame 105 from above, as shown. This procedure is then repeated to increase the number of chair frames 105 in the spiral stack, as shown (at least embodying herein wherein such nesting-stacker means comprises spirally-nesting-stacker means for spirally nesting stacking such plurality of such raised-support means; and at least embodying herein wherein such at least one nesting-stacker comprises at least one spirally-nesting-stacker adapted to spirally nesting stack such a plurality of such at least one raised-supports; and at least embodying herein wherein said at least one chair frame is spirally nesting-stackable). The open structure of chair frame 105 provides ample space for chair legs 410 and 415 of spirally nested chair frames 105, as shown. Where the second chair frame 105 (and any additional chair frames 105) is rotated clockwise, at least one clockwise spiral stack of chair frames 105 results, as shown. Where the second chair frame 105 (and any additional chair frames 105) is rotated counterclockwise, at least one counterclockwise spiral stack of chair frames 105 results, as shown. Preferably, up to about ten chair frames 105 may be spirally stacked into one bundle 1000 (at least embodying herein at least one spiral stack of at least one plurality of raised-supports), as shown, depending on the dimensions of chair frame 105.

Figure 10B:
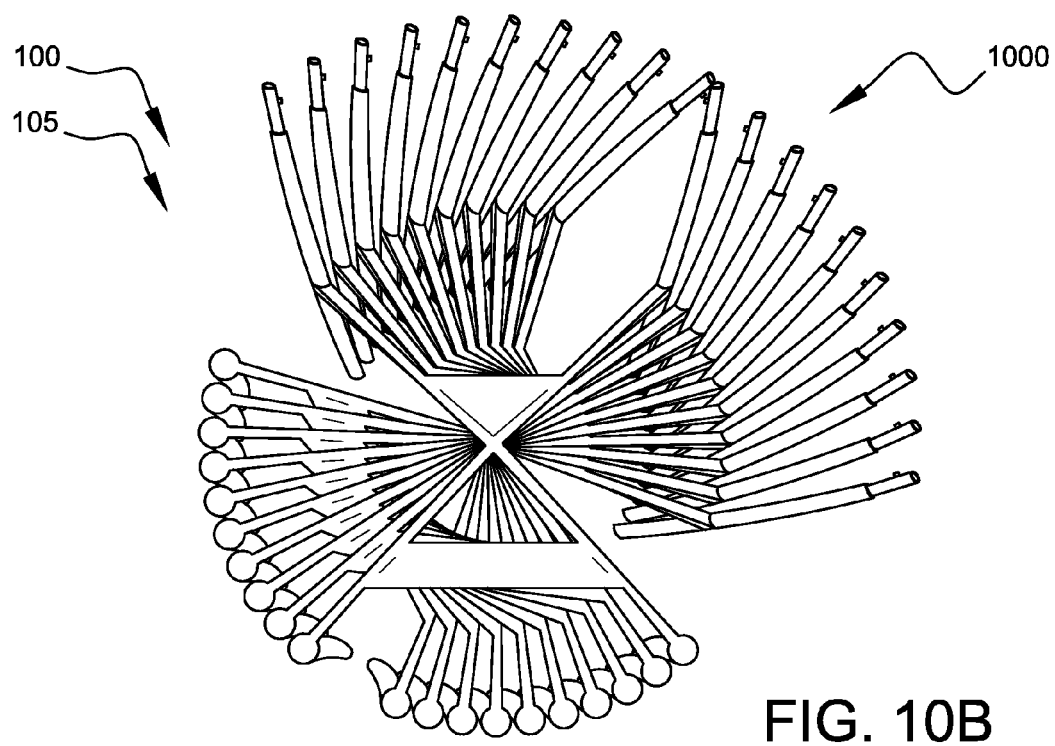
FIG. 10B shows a top plan view illustrating a counterclockwise spiral stack of chair frames according to a preferred embodiment of the present invention.

FIG. 10B shows a top plan view illustrating one counterclockwise spiral stack of chair frames 105 according to a preferred embodiment of the present invention.

Figure 11A:
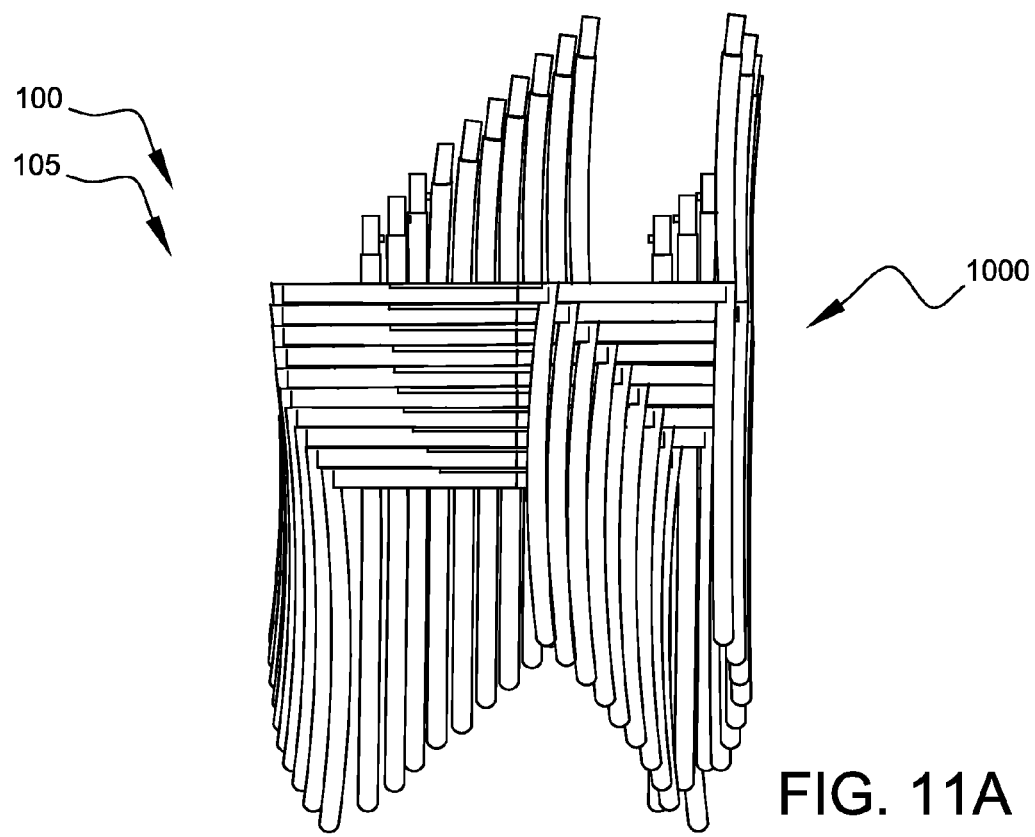
FIG. 11A shows a front view illustrating the clockwise spiral stack of chair frames according to FIG. 10A.

FIG. 11A shows a front plan view illustrating the clockwise spiral stack of chair frames 105 according to FIG. 10A.

Figure 11B:
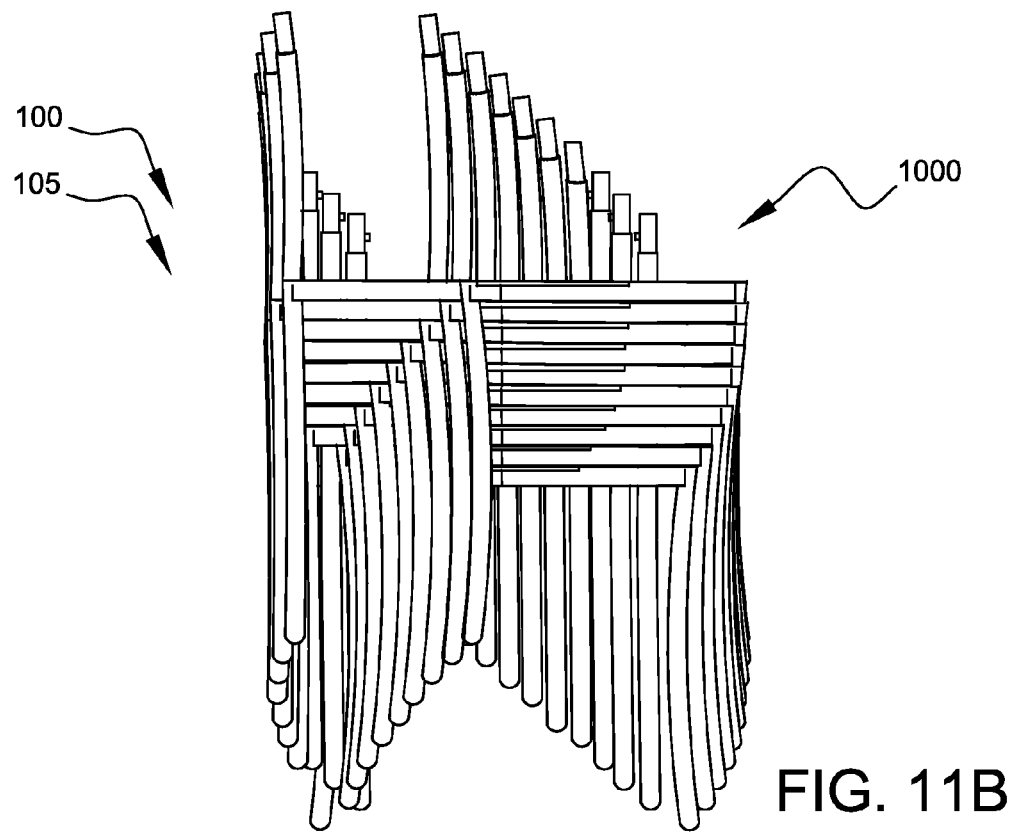
FIG. 11B shows a front view illustrating the counterclockwise spiral stack of chair frames according to FIG. 10B.

FIG. 11B shows a front plan view illustrating the counterclockwise spiral stack of chair frames 105 according to FIG. 10B.

Figure 12A:
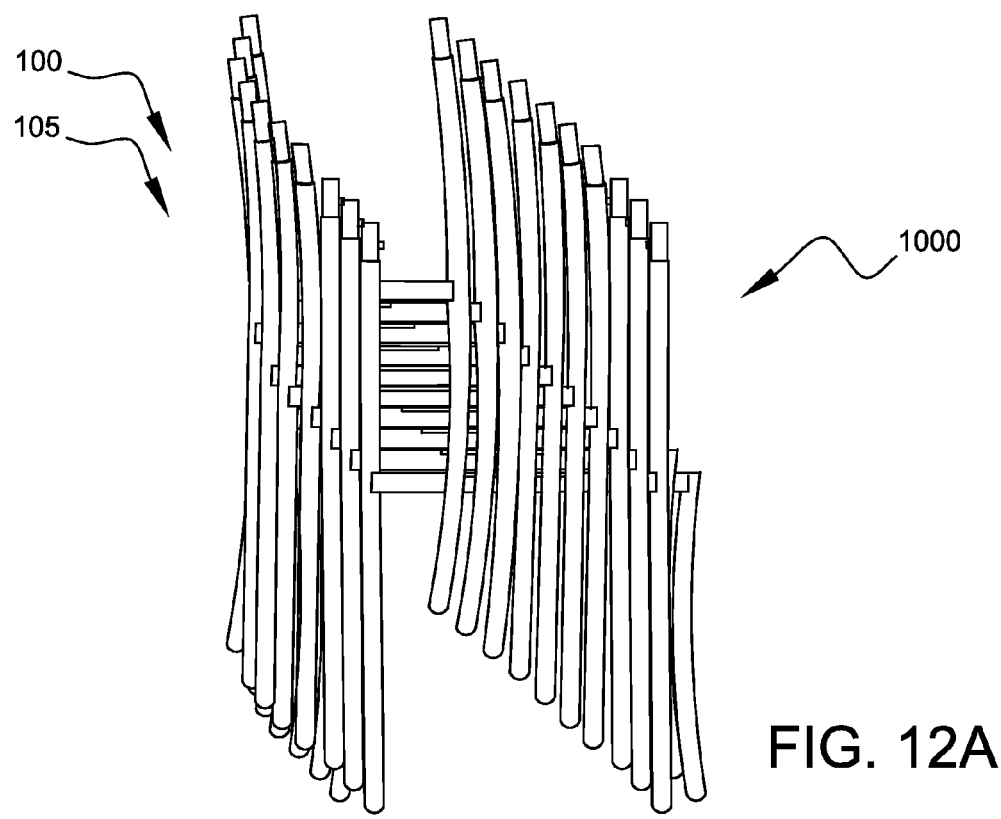
FIG. 12A shows a back view illustrating the clockwise spiral stack of chair frames according to FIG. 10A.

FIG. 12A shows a back plan view illustrating the clockwise spiral stack of chair frames 105 according to FIG. 10A.

Figure 12B:
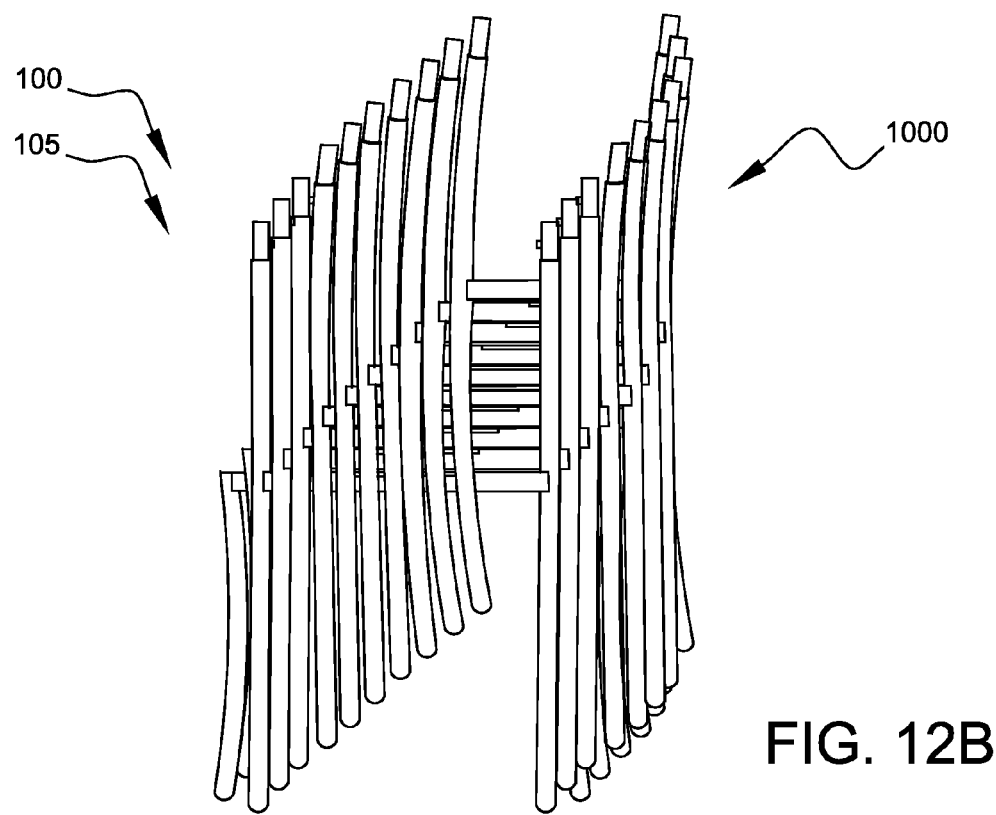
FIG. 12B shows a back view illustrating the counterclockwise spiral stack of chair frames according to FIG. 10B.

FIG. 12B shows a back plan view illustrating the counterclockwise spiral stack of chair frames 105 according to FIG. 10B.

Figure 13:
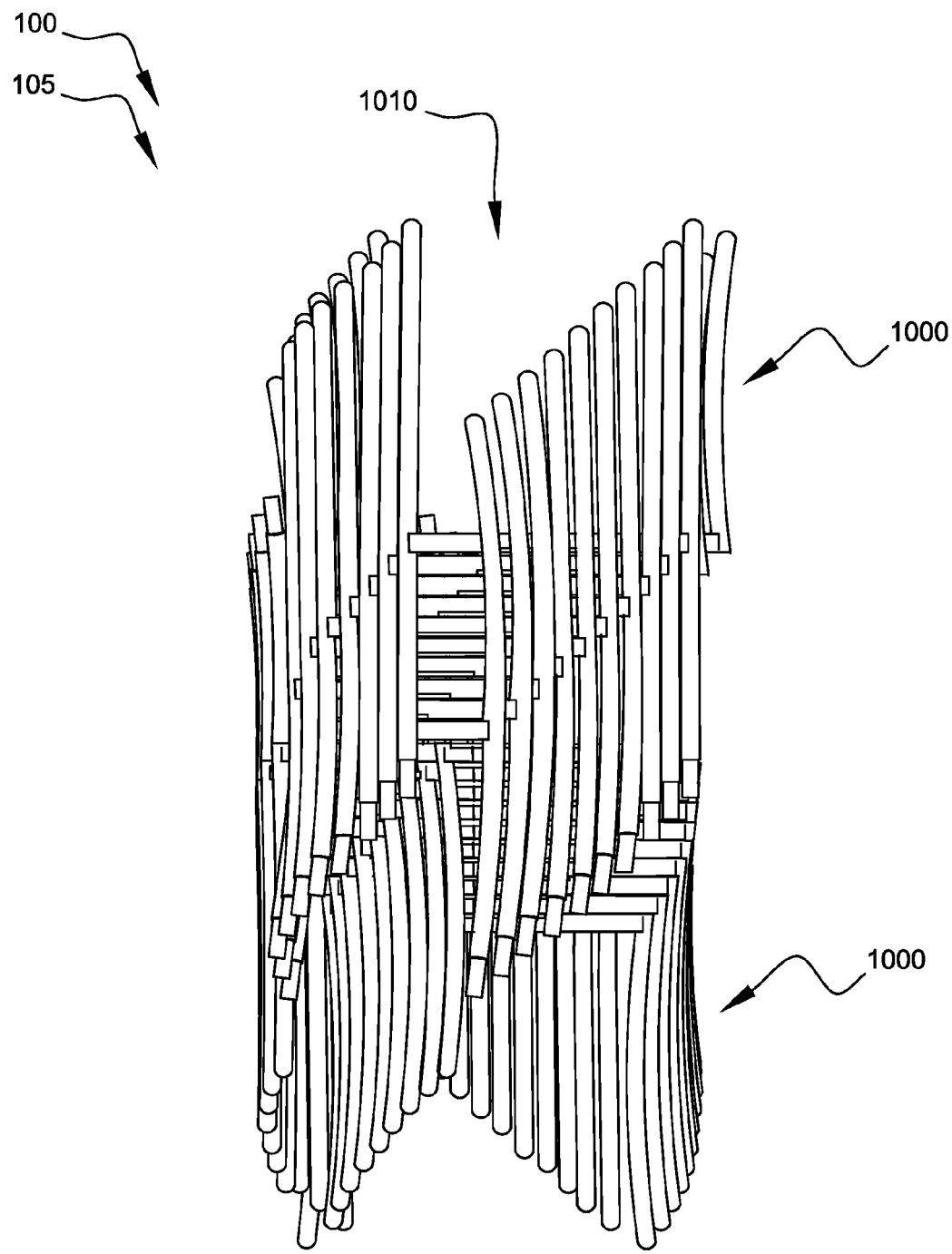
FIG. 13 shows a front view illustrating a counterclockwise spiral stack inverted and stacked upon another counterclockwise spiral stack.

FIG. 13 shows a front plan view illustrating one counterclockwise spiral stack bundle 1000 inverted and stacked upon another counterclockwise spiral stack bundle 1000. In order to increase the height of at least one spiral stack of chair frames 105, one counterclockwise spiral stack bundle 1000 may be inverted and stacked upon another counterclockwise spiral stack bundle 1000 (or one clockwise spiral stack bundle 1000 may be inverted and stacked upon another clockwise spiral stack bundle 1000, or one counterclockwise spiral stack bundle 1000 may be inverted and stacked upon one clockwise spiral stack bundle 1000, or one clockwise spiral stack bundle 1000 may be inverted and stacked upon one counterclockwise spiral stack bundle 1000, etc.) to form one double-bundle 1010, as shown. This provides a novel and eye-catching display, as well as providing space savings, as shown. Also, bundles 1000 and double-bundles 1010 may be easily transported on ordinary flat-platform dollies or carts.

Figure 14:
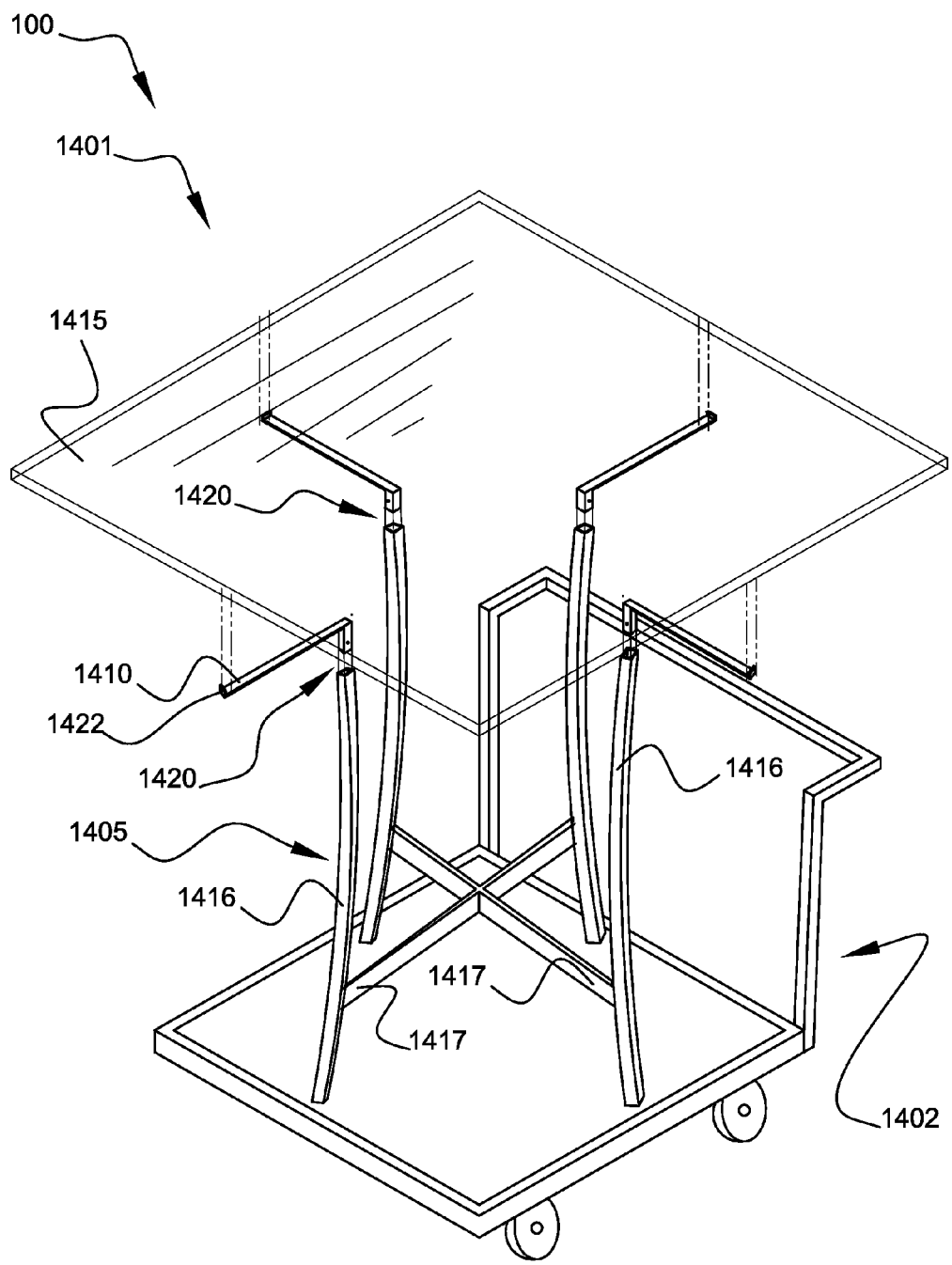
FIG. 14 shows a perspective exploded view illustrating a modular stackable table on a dolly according to a preferred embodiment of the present invention.

FIG. 14 shows a perspective exploded view illustrating modular stackable table 1401 on dolly 1402 according to a preferred embodiment of the present invention. Preferably, modular furniture system 100 comprises modular stackable table 1401, as shown. Preferably, modular stackable table 1401 comprises table frame 1405, toplets 1410, tabletop 1415, and toplet attachers 1420, as shown.

Preferably, table frame 1405 comprises legs 1416 (most preferably four legs 1416) and crossbars 1417 (most preferably two crossbars 1417), as shown. Preferably, each crossbar 1417 connects two legs 1416, as shown. Preferably, crossbars 1417 meet and are attached to each other approximately in the center of crossbars 1417, as shown. Upon reading the teachings of this specification, those of ordinary skill in the art will now understand that, under appropriate circumstances, such as user preference, advances in technology, intended use, etc., other arrangements, such as other numbers of legs, other numbers of crossbars, and odd number of legs, etc., may suffice.

Preferably, table frame 1401 comprises at least one strong, rigid material, preferably metal, most preferably steel. Preferably, table frame 1401 (at least embodying herein wherein such raised frame means comprises at least one table frame; and at least embodying herein wherein such at least one raised frame comprises at least one table frame; and at least embodying herein at least one table frame adapted to frame at least one table) is available in several sizes, such as, for example, ballroom table size, tavern table size, café table size, child size, etc. Upon reading the teachings of this specification, those of ordinary skill in the art will now understand that, under appropriate circumstances, such as user preference, advances in technology, intended use, etc., other materials, such as other metals, plastics, wood, bamboo, composite materials, multiple materials, etc., may suffice.

Preferably, tabletop 1415 comprises at least one strong, rigid material, such as, for example, glass (as shown), wood, metal, plastic, plywood, composite, etc. Preferably, tabletop 1415 (at least embodying herein wherein such horizontal support means comprises at least one table top; and at least embodying herein wherein such at least one horizontal support comprises at least one table top) may be of any required size supportable by table frame 1405, such as, for example, fifty-four inches in diameter, seventy-two inches in diameter, etc. Preferably, tabletop 1415 may be of any desired shape, such as, for example, square (as shown), round, octagonal, oval, triangular, annular, etc. Upon reading the teachings of this specification, those of ordinary skill in the art will now understand that, under appropriate circumstances, such as user preference, advances in technology, intended use, etc., other tabletops, such as other materials, other shapes, colors, decorations, indicia, etc., may suffice.

Preferably, toplets 1410 (at least embodying herein wherein such positional stabilizer means comprises intermediate support means for supporting such horizontal support means above such raised-support means; and at least embodying herein wherein such at least one positional stabilizer comprises at least one intermediate support adapted to support such at least one horizontal support above such at least one raised-support; and at least embodying herein at least one intermediate support adapted to provide intermediate support between said at least one table frame and said at least one modular table top) comprise an intermediate support between table frame 1405 and tabletop 1415, as shown. Preferably, toplets 1410 attach to table frame 1405 with toplet attachers 1420 (at least embodying herein wherein such first releasable attacher means comprises intermediate support means for supporting such horizontal support means above such raised-support means), and support tabletop 1415 (at least embodying herein wherein such tabletop means is releasably supported by such intermediate support means), as shown. Preferably, toplets 1410 are available in many different sizes and shapes in order to accommodate many different sizes and shapes of tabletops 1415. Preferably, toplets 1410 comprise end holders 1422 (at least embodying herein wherein such intermediate support means comprises edge-holder means for holding at least one edge of such horizontal support means; and at least embodying herein wherein such at least one intermediate support comprises at least one edge-holder adapted to hold at least one edge of such at least one horizontal support; and at least embodying herein at least one releasable attacher adapted to releasably attach said at least one modular table top to said at least one table frame) to help secure tabletop 1415 in place by holding the edges of tabletop 1415, as shown.

Preferably, toplets 1410 comprise at least one strong, rigid material, preferably plastic, more preferably metal, most preferably steel. Preferably, toplets 1410 are available in several sizes to accommodate several sizes and shapes of tabletop 1415 and table frames 1405. Upon reading the teachings of this specification, those of ordinary skill in the art will now understand that, under appropriate circumstances, such as user preference, advances in technology, intended use, etc., other materials, such as other metals, wood, bamboo, composite materials, multiple materials, etc., may suffice.

Figure 15:
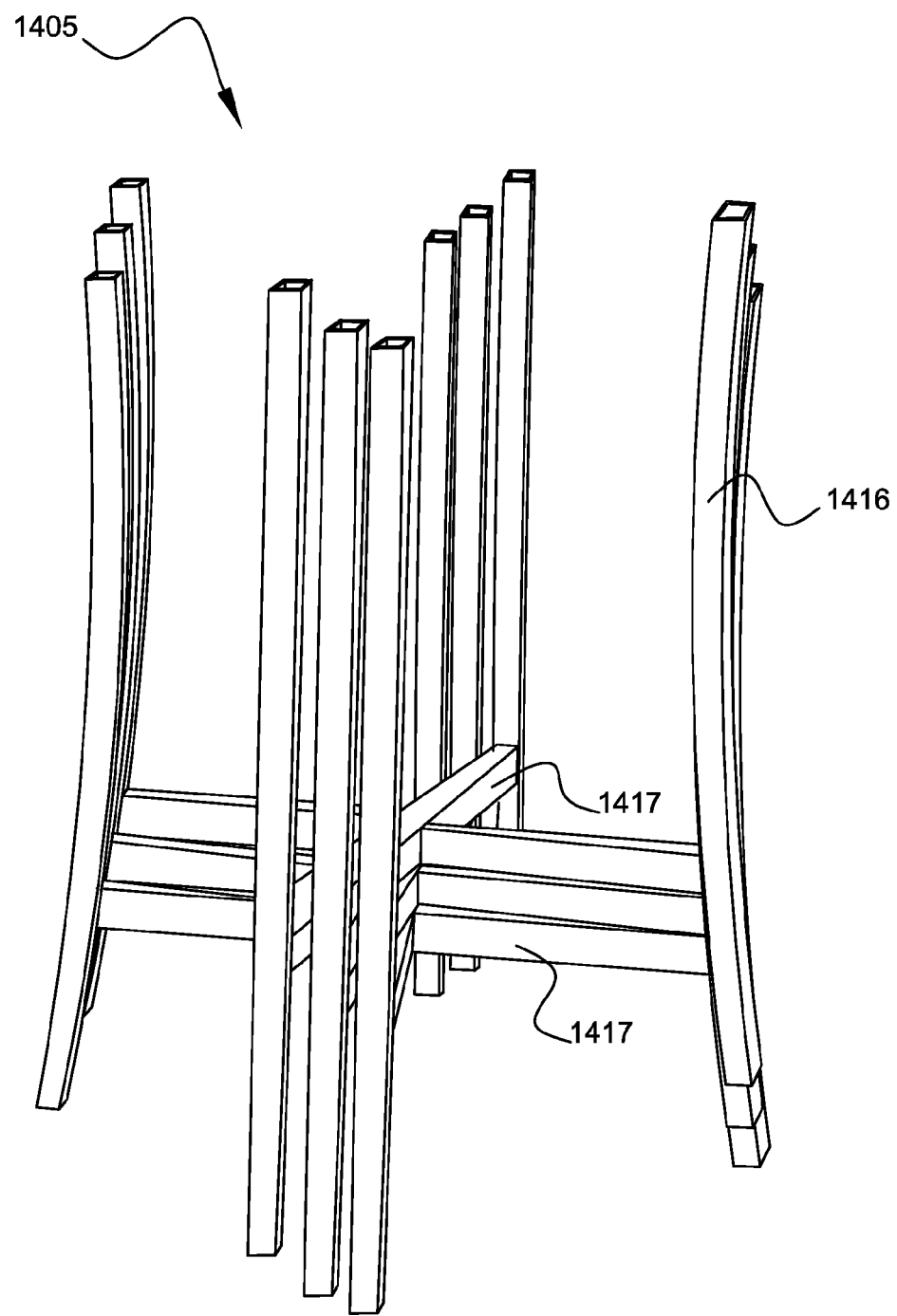
FIG. 15 shows a perspective view illustrating a spiral stack of three table frames according to a preferred embodiment of the present invention.

FIG. 15 shows a perspective view illustrating one spiral stack of three table frames 1405 according to a preferred embodiment of the present invention. Preferably, table frames 1405 may be spirally-stacked by placing one first table frame 1405 upright on the floor, rotating one second upright table frame 1405 clockwise or counterclockwise by approximately the width of one leg 1416, and placing such second table frame 1405 directly onto such first table frame 1405, as shown (at least embodying herein wherein said at least one table frame is nesting-stackable; and at least embodying herein wherein said at least one table frame is spirally nesting-stackable). This procedure is then repeated to increase the number of table frames 1405 in the spiral stack, as shown. Preferably, table frames 1405 may be stored and transported in spiral stacks of about ten to about eighteen table frames 1405, most preferably about twelve (ballroom-sized) table frames 1405, depending on the size and weight of table frames 1405. Upon reading the teachings of this specification, those of ordinary skill in the art will now understand that, under appropriate circumstances, such as user preference, advances in technology, intended use, etc., other arrangements, such as nesting-stacking table frames, smaller stacks of table frames, larger stacks of table frames, etc., may suffice.

FIG. 16A shows a partial perspective view illustrating table frame 1405 and toplet 1410 according to a preferred embodiment of the present invention. Preferably, toplet 1410 comprises strut 1610, and end holder 1422, as shown. Preferably, toplet attachers 1420 comprise releasable fasteners (at least embodying herein at least one releasable intermediate support attacher adapted to releasably attach said at least one intermediate support to said at least one table frame), most preferably button lock tubes 1616, as shown. Preferably, button lock tubes 1616 comprise male tube 1621, spring-loaded button 1622, female tube 1623, and buttonhole 1624, as shown. Preferably, each toplet 1410 comprises at least one male tube 1621, each having at least one spring-loaded button 1622, as shown. Preferably, each leg 1416 comprises female tube 1623, having at least one buttonhole 1624, as shown. Preferably, male tube 1621 on toplet 1410 is placed in female tube 1623 in leg 1416, as shown. Preferably, spring-loaded button 1622 aligns with buttonhole 1624 to lock toplet 1410 in place on table frame 1405, as shown. Preferably, toplet 1410 may be removed from table frame 1405 by depressing spring-loaded button 1622 and lifting toplet 1410 off of table frame 1405. Upon reading the teachings of this specification, those of ordinary skill in the art will now understand that, under appropriate circumstances, such as user preference, advances in technology, intended use, etc., other arrangements, such as other toplet attachers, the toplet comprising the female tube and the leg comprising the male tube, buttonholes at several heights, etc., may suffice.

FIG. 16B shows a partial perspective view illustrating table frame 1405 and toplet 1410 having two toplet attachers 1420 according to a preferred embodiment of the present invention. Preferably, toplet 1410 may have more than one toplet attacher 1420, i.e., more than one male tube 1621 with spring-loaded button 1622, as shown. Preferably, either toplet attacher 1420 may be used, so that one particular toplet 1410 (at least embodying herein wherein such at least one intermediate support comprises at least one positional stabilizer) may be used to support multiple sizes of tabletops 1415. Upon reading the teachings of this specification, those of ordinary skill in the art will now understand that, under appropriate circumstances, such as user preference, advances in technology, intended use, etc., other arrangements, such as adjustable-length toplets, adjustably-positionable toplet attachers, etc., may suffice.

FIG. 16C shows a partial perspective view illustrating table frame 1405 and toplet 1410 having two toplet attachers 1420, one of which comprises height-adjusting toplet attacher 1422, according to a preferred embodiment of the present invention. Preferably, height-adjusting toplet attachers 1422 (at least embodying herein wherein such intermediate support means comprises height adjuster means for adjusting the height of such intermediate support means; and at least embodying herein wherein such at least one intermediate support comprises at least one height adjuster adapted to adjust the height of such at least one intermediate support) raise the height of strut 1610, as shown, thereby raising the height of tabletop 1415. Upon reading the teachings of this specification, those of ordinary skill in the art will now understand that, under appropriate circumstances, such as user preference, advances in technology, intended use, etc., other means of raising the height of the tabletop, such as height-adjustment tubes that may be added to any toplet attacher, increasing the thickness of the toplet strut, adding feet to the legs, etc., may suffice.

FIG. 16D shows a partial perspective view illustrating decorative toplet 1620 having two toplet attachers 1420 according to a preferred embodiment of the present invention. Preferably, toplets 1410 may comprise decorative toplets 1620, as shown. Preferably, decorative toplets 1620 perform the same functions as toplets 1410. Preferably, end holders 1422 are optional for both toplets 1410 and decorative toplets 1620. Preferably, decorative toplets 1620 also comprise connector clips 1601 (at least embodying herein wherein such intermediate support means comprises edge connector means for connecting the edges of a plurality of such intermediate support means; and at least embodying herein wherein such at least one intermediate support comprises at least one edge connector adapted to connect the edges of such at least one intermediate support), as shown, which connect decorative toplets 1620 to each other if they are adjacent at the edges in use.

Figure 17:
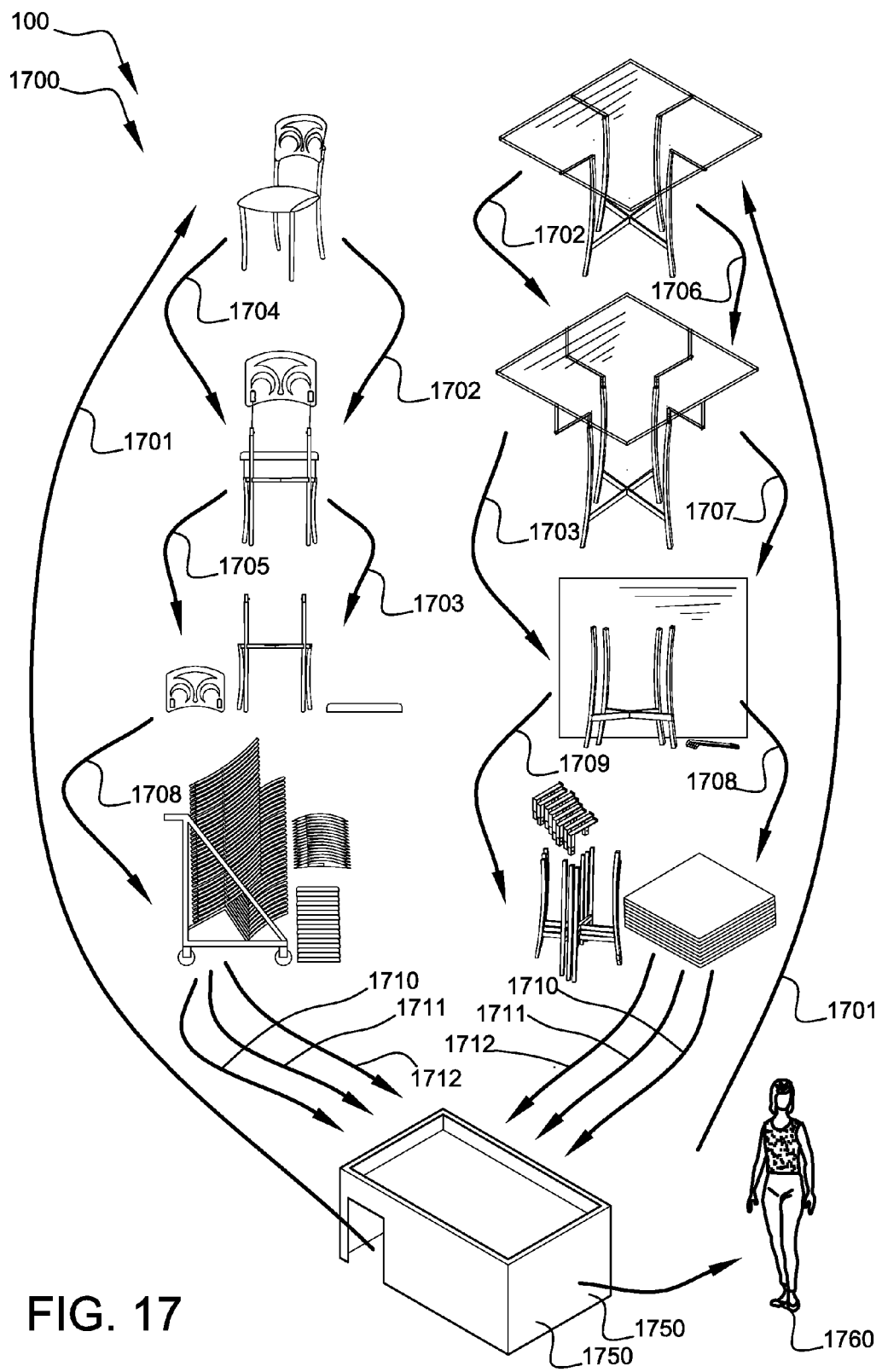
FIG. 17 shows a diagram illustrating a method according to a preferred embodiment of the present invention.

FIG. 17 shows a diagram of method 1700 according to a preferred embodiment of the present invention. Preferably, modular furniture system 100 comprises method 1700. Preferably, method 1700 is performed by renter 1751, preferably at rental-warehouse 1750, and preferably comprises the steps of: providing 1701 stackable furniture with removable horizontal supports (at least embodying herein providing stackable furniture with removable horizontal supports); removing 1702 such horizontal supports (at least embodying herein removing such horizontal supports); separately storing 1703 such horizontal supports (at least embodying herein separately storing such horizontal supports), as shown.

Preferably, method 1700 further comprises the steps of: removing back-contour supports 1704 from said stackable furniture (at least embodying herein removing back-contour supports from such stackable furniture); separately storing 1705 such back-contour supports (at least embodying herein separately storing such back-contour supports), as shown.

Preferably, method 1700 further comprises the steps of: removing intermediate supports 1706 from said stackable furniture (at least embodying herein removing intermediate supports from such stackable furniture); and separately storing 1707 such intermediate supports (at least embodying herein separately storing such intermediate supports), as shown.

Preferably, method 1700 further comprises the steps of: stacking 1708 (at least embodying herein nesting-stacking such stackable furniture) at least one portion of such plurality of modular furniture components to conserve rental-warehouse 1750 space; spirally-nesting-stacking 1709 such stackable furniture (at least embodying herein wherein the step of nesting-stacking further comprises the step of spirally-nesting-stacking such stackable furniture); minimizing the use 1710 (at least embodying herein minimizing the use of rental-warehouse storage space per assembled furniture piece by storing stacked modular furniture components; and at least embodying herein stacking at least one portion of such plurality of modular furniture components to conserve warehouse space) of rental-warehouse 1750 storage space per assembled furniture piece by storing stacked modular furniture components, as shown.

Preferably, method 1700 further comprises the steps of: increasing the number 1711 (at least embodying herein increasing the number of furniture designs storable in such rental-warehouse by storing separately-stacked modular furniture components having various aesthetic designs) of furniture designs storable in such rental-warehouse 1750 by storing separately-stacked modular furniture components having various aesthetic designs; stocking 1712 (at least embodying herein stocking a plurality of modular furniture components wherein such plurality of modular furniture components comprises a plurality of raised-supports having at least one aesthetic design, and a plurality of horizontal support portions having at least one aesthetic design) a plurality of modular furniture components, as shown.

Preferably, method 1700 further comprises the step of: offering 1713 (at least embodying herein offering such plurality of modular furniture components for rental; and at least embodying herein wherein such plurality of modular furniture components further comprises a plurality of back-contours having at least one aesthetic design; and at least embodying herein wherein such plurality of modular furniture components further comprises a plurality of intermediate supports having at least one aesthetic design) such plurality of modular furniture components for rental, to at least one customer 1760, as shown.

Figure 42:
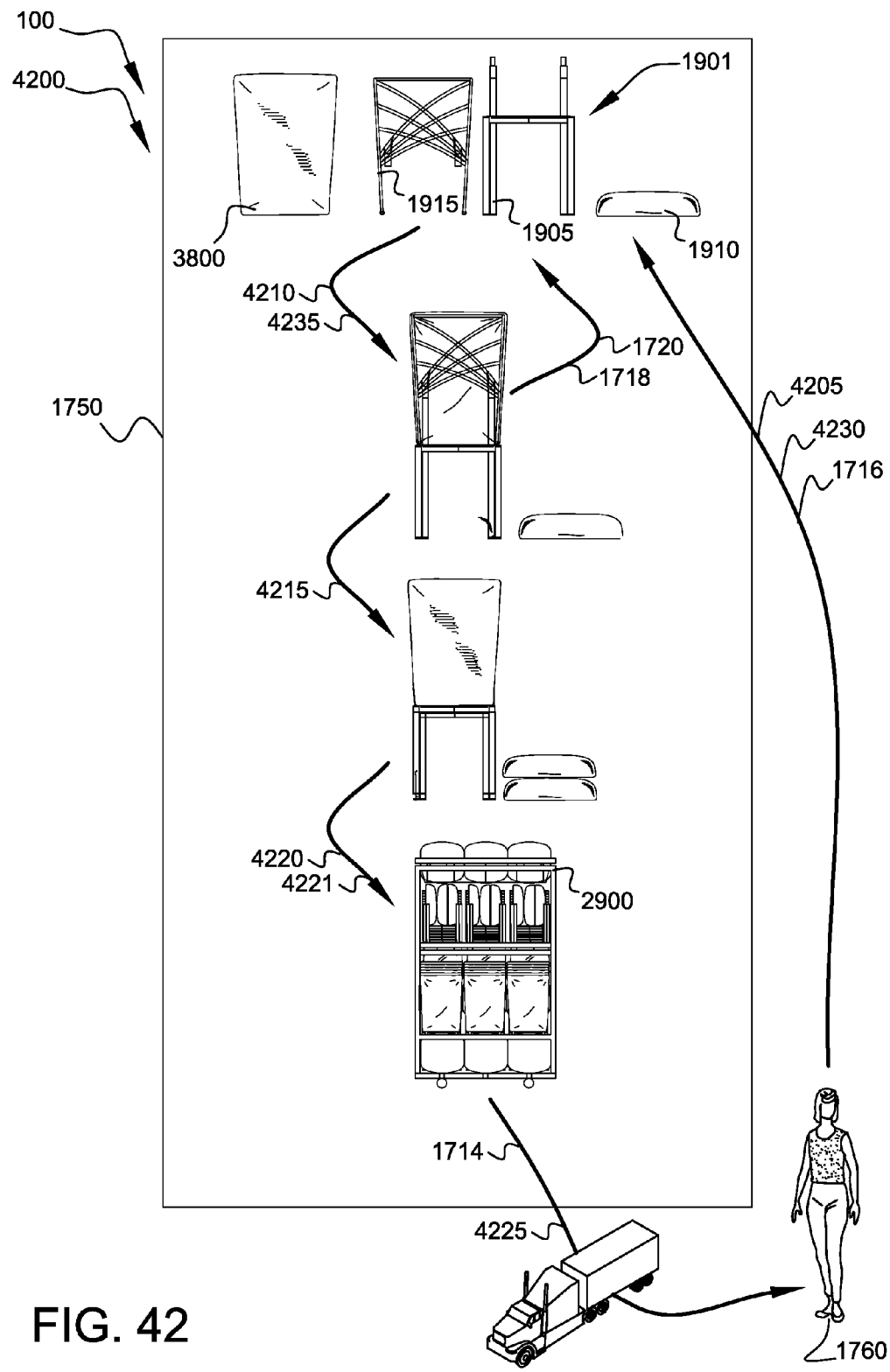
FIG. 42 shows a diagram illustrating a method according to a preferred embodiment of the present invention.

Preferably, method 1700 further comprises the step of transporting 1714 such plurality of modular furniture components in exactly one dolly 2900 (as shown in FIG. 42). Preferably, method 1700 further comprises the step of receiving 1716 such customer 1760's selection of at least one back-contour cover 3800 (as shown in FIG. 42). Preferably, method 1700 further comprises the steps of removing 1718 back-support covers 3800 from such stackable furniture (at least embodying herein the step of removing back-support covers from such stackable furniture), as shown on FIG. 42; and separately storing 1720 such back-support covers 3800 (at least embodying herein the step of separately storing such back-support covers), as shown in FIG. 42.

Upon reading the teachings of this specification, those of ordinary skill in the art will now understand that, under appropriate circumstances, such as user preference, advances in technology, intended use, etc., other steps, such as shipping modular furniture components, refinishing modular furniture components, grouping modular furniture components according to design or other criteria, fewer steps, etc., may suffice.

Figure 18:
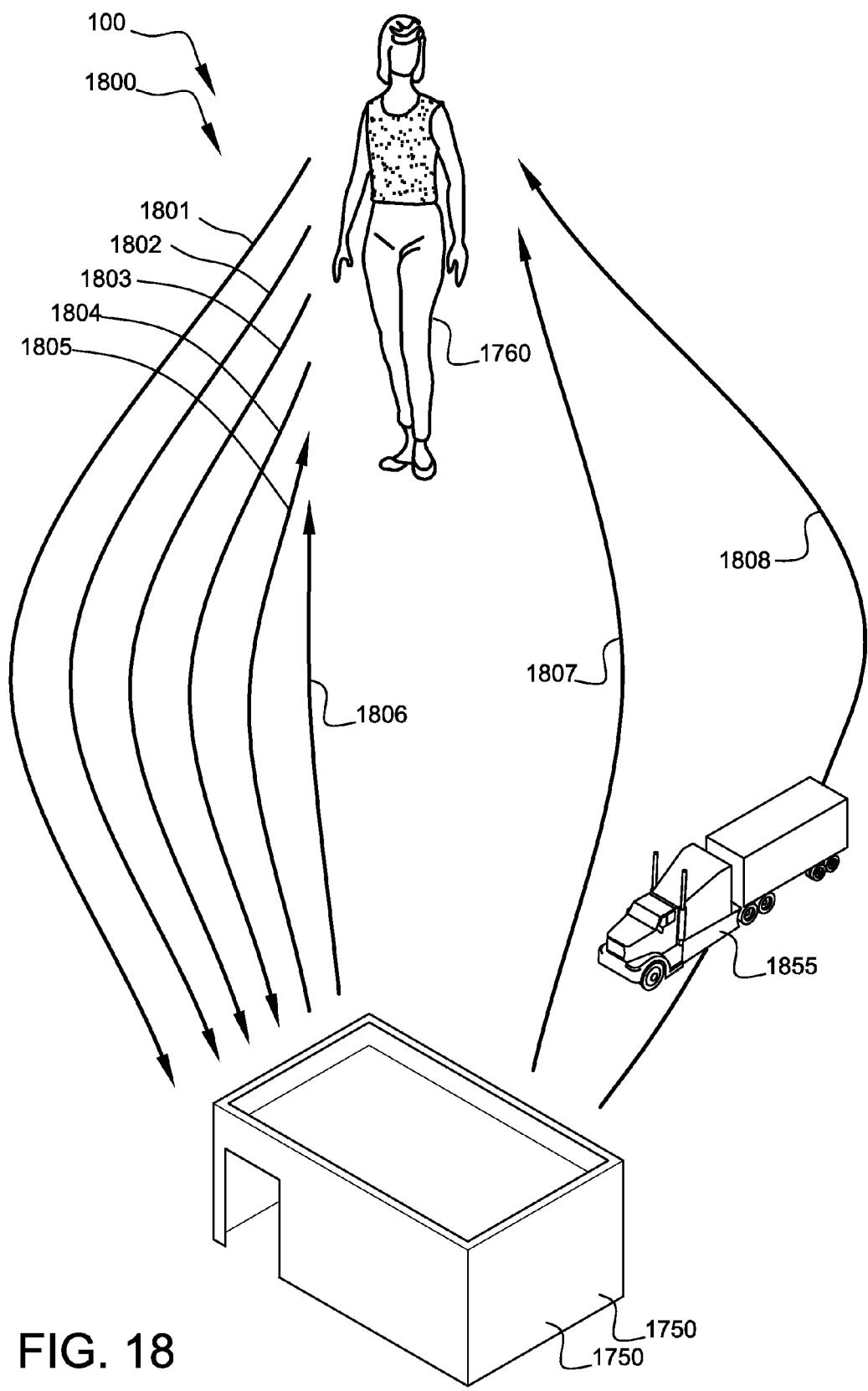
FIG. 18 shows a diagram illustrating a method according to a preferred embodiment of the present invention.

FIG. 18 shows a diagram of method 1800 according to a preferred embodiment of the present invention. Preferably, modular furniture system 100 comprises method 1800. Preferably, method 1800 is performed by renter 1751, preferably at rental-warehouse 1750, and preferably comprises the steps of: receiving 1801 (at least embodying herein receiving at least one customer's selection of at least one raised-support) at least one customer's 1760 selection of at least one raised-support; receiving 1802 (at least embodying herein receiving such customer's selection of at least one horizontal support) such customer's 1760 selection of at least one horizontal support; receiving 1803 (at least embodying herein receiving such customer's selection of at least one back-contour) such customer's 1760 selection of at least one back-contour; receiving 1804 (at least embodying herein receiving such customer's selection of at least one end-cap) such customer's 1760 selection of at least one end-cap; offering 1805 (at least embodying herein offering custom indicia on such modular furniture components) custom indicia on such modular furniture components; receiving 1806 (at least embodying herein receiving such customer's selection of at least one intermediate support) such customer's 1760 selection of at least one intermediate support, as shown.

Preferably, method 1800 further comprises the steps of: offering to rent 1807 (at least embodying herein offering to rent to such customer furniture having the selected components) to such customer 1760 furniture having the selected components; minimizing the use 1808 (at least embodying herein minimizing the use of rental-furniture delivery vehicle space per furniture piece by transporting stacked modular furniture components) of rental-furniture delivery vehicle 1855 space per furniture piece by transporting stacked modular furniture components; and increasing the efficiency 1809 (at least embodying herein increasing the efficiency of rental-furniture delivery by transporting stacks of furniture components having the customer's desired aesthetic design to the customer for assembly at the customer's site) of rental-furniture delivery by transporting stacks of furniture components having the customer's 1760 desired aesthetic design to the customer 1760 for assembly at the customer's 1760 site, as shown.

Upon reading the teachings of this specification, those of ordinary skill in the art will now understand that, under appropriate circumstances, such as user preference, advances in technology, intended use, etc., other steps, such as maintaining an e-commerce web site, shipping modular furniture components, assembling modular furniture components at the customer's site, manufacturing modular furniture components, selling modular furniture components, etc., may suffice.

Figure 19:
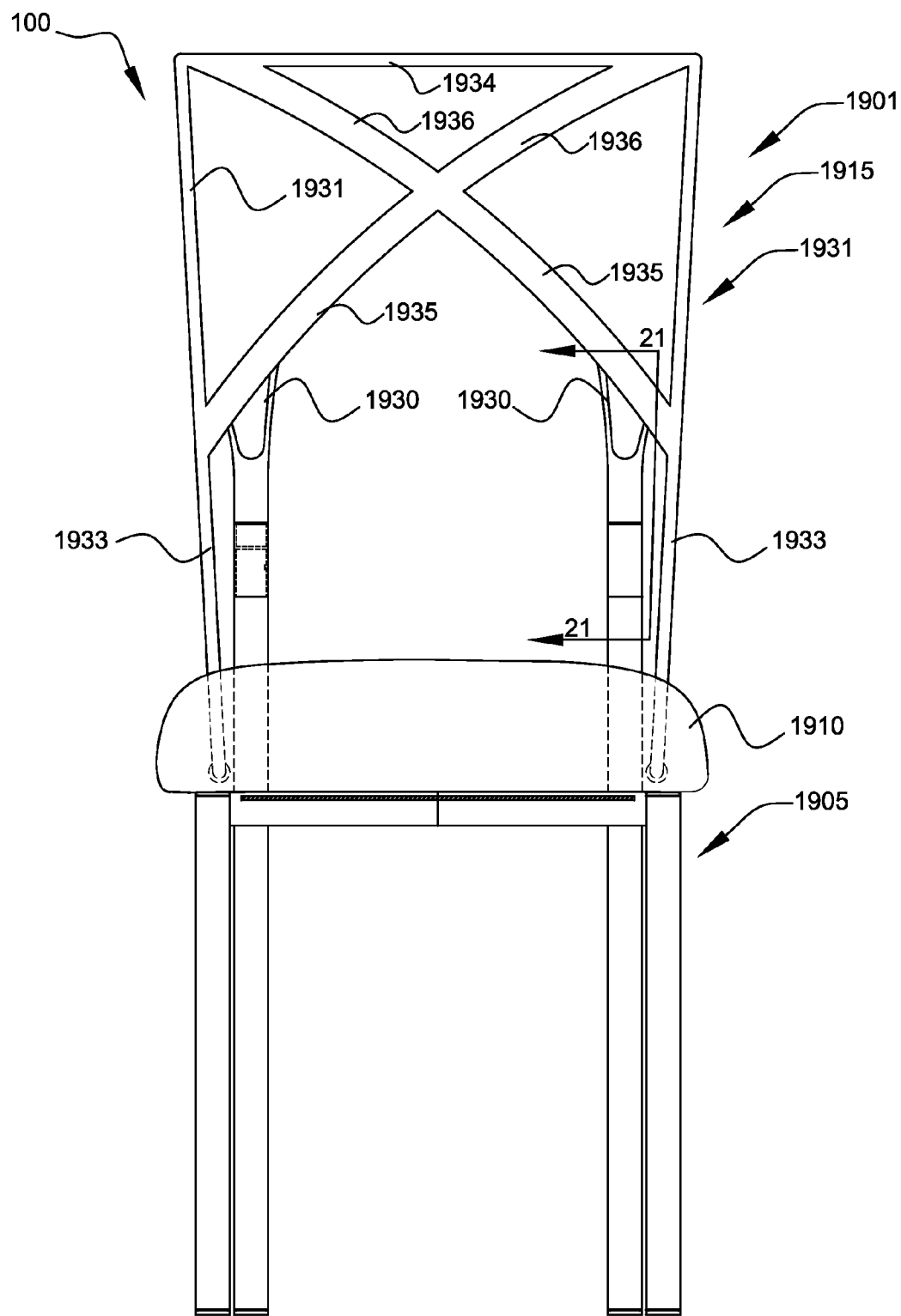
FIG. 19 shows a front view illustrating a modular stackable chair according to another preferred embodiment of the present invention.

FIG. 19 shows a front view illustrating modular stackable chair 1901 according to another preferred embodiment of the present invention. Preferably, modular furniture system 100 comprises modular stackable chair 1901, as shown, which is preferably a modification of modular stackable chair 101. Preferably, modular stackable chair 1901 comprises chair frame 1905, chair seat 1910, and chair back 1915, as shown. Preferably, modular stackable chair 1901 uses at least one different mechanical arrangement than modular stackable chair 101 uses to connect chair back 1915 to chair frame 1905, as shown.

Preferably, chair back 1915 comprises at least one crimped cap 1930 and at least one back frame 1931, as shown. Most preferably, chair back 1915 comprises two crimped caps 1930, as shown. Preferably, crimped cap 1930 is permanently attached, most preferably welded, to back frame 1931, as shown. Preferably, crimped cap 1930 (at least embodying herein at least one connector adapted to connect said at least one back-contour support to said at least one releasable attacher) connects to chair frame 1905 by inserting into female adapter tube 1932 which in turn fits over male tube 521 on back strut 1907, as shown. Upon reading the teachings of this specification, those with ordinary skill in the art will now understand that, under appropriate circumstances, considering such issues as advances in technology, user preference, design aesthetics, etc., other connectors adapted to temporarily connect the chair back to the chair frame, such as other shapes of crimped caps, clips, choosing not to use the female adapter tube, etc., may suffice.

Preferably, back frame 1931 comprises side stretchers 1933, top stretcher 1934, and frame attachments 1935, as shown. Preferably, frame attachments 1935 connect crimped caps 1930 to at least one of side stretchers 1933 and top stretcher 1934, as shown. Preferably, back frame 1931 is both functional as a back-rest and decorative. Therefore, the arrangement of side stretchers 1933, top stretcher 1934, and frame attachments 1935 will vary for aesthetic reasons, with decorative elements 1936 (which also may provide additional back support to the user) frequently being present in various embodiments of chair back 1915. Upon reading the teachings of this specification, those with ordinary skill in the art will now understand that, under appropriate circumstances, considering such issues as advances in technology, user preference, etc., other back frame arrangements, such as built-in padding, other shapes, decorative mixtures of materials, etc., may suffice.

Figure 20:
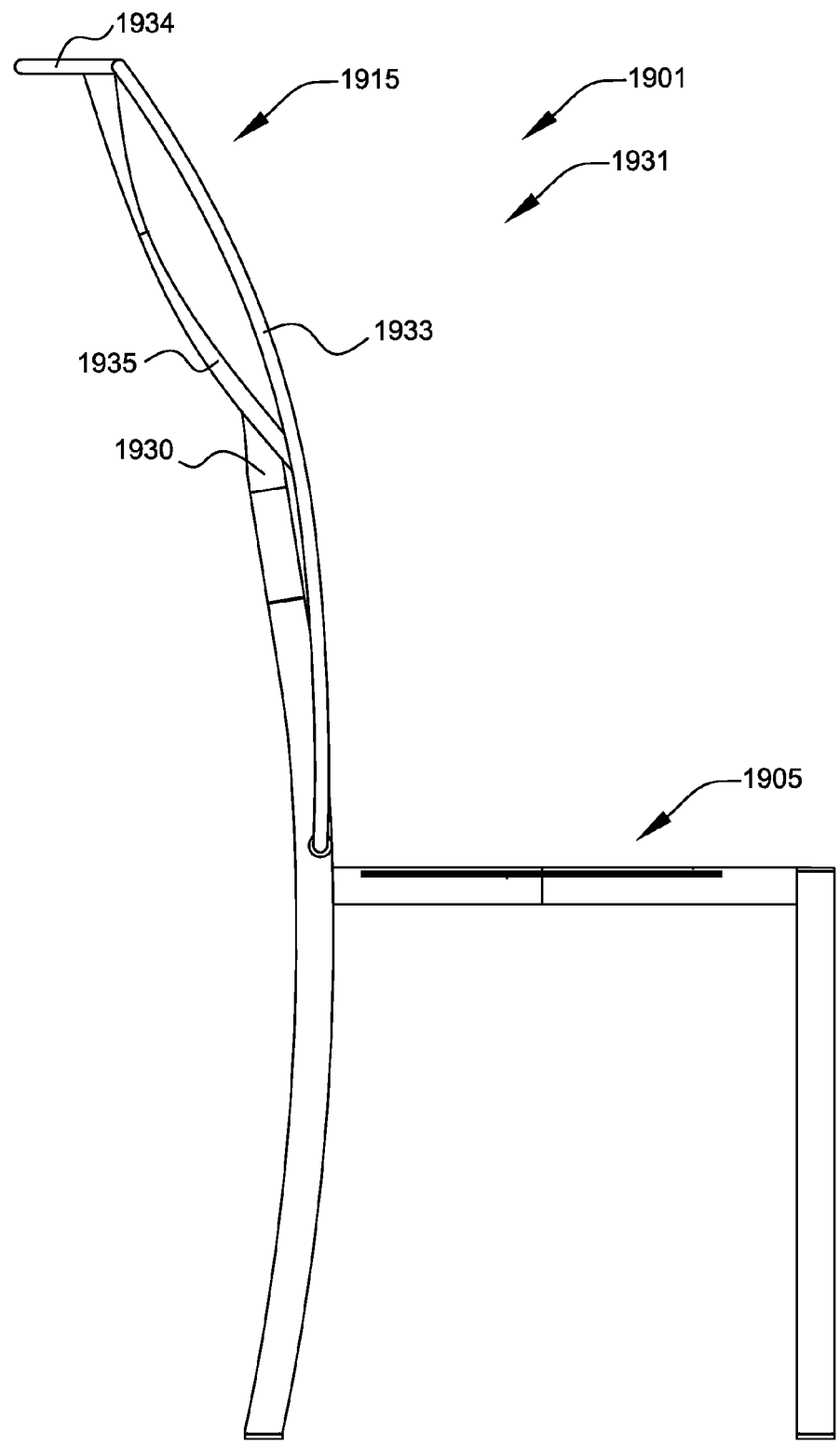
FIG. 20 shows a side view illustrating the modular stackable chair according to FIG. 19.
Figure 26:
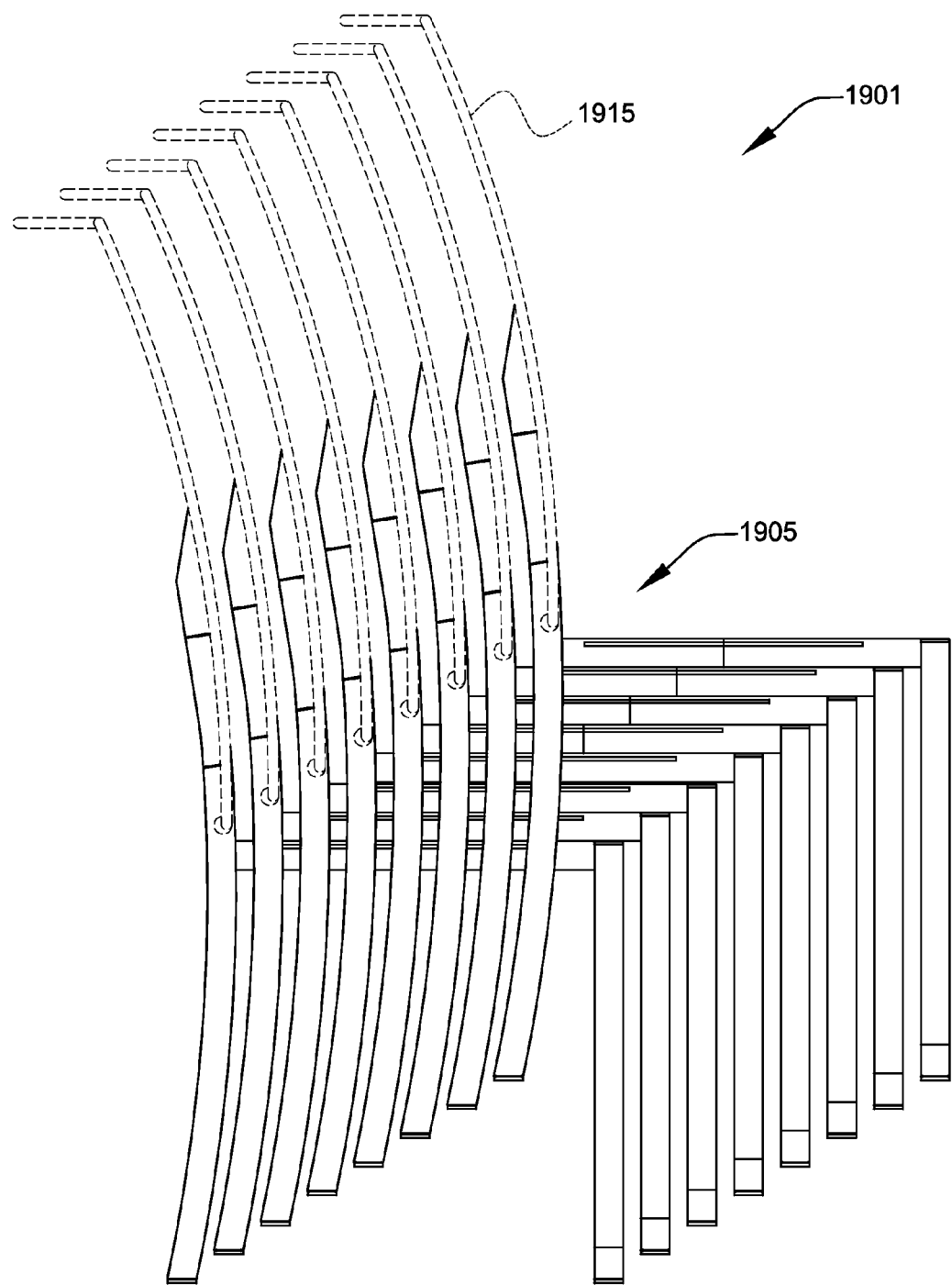
FIG. 26 shows a side view illustrating a stack of the modular stackable chairs according to FIG. 19.

FIG. 20 shows a side view illustrating modular stackable chair 1901 according to FIG. 19. Preferably, chair frame 1905 is stackable and spirally-stackable in the same way as chair frame 105. Preferably, chair frame 1905 is stackable, as shown in FIG. 26, and spirally-stackable with female adapter tubes 1932 attached. Preferably, front legs 1908 are straight for aesthetic reasons, as shown.

Figure 21:
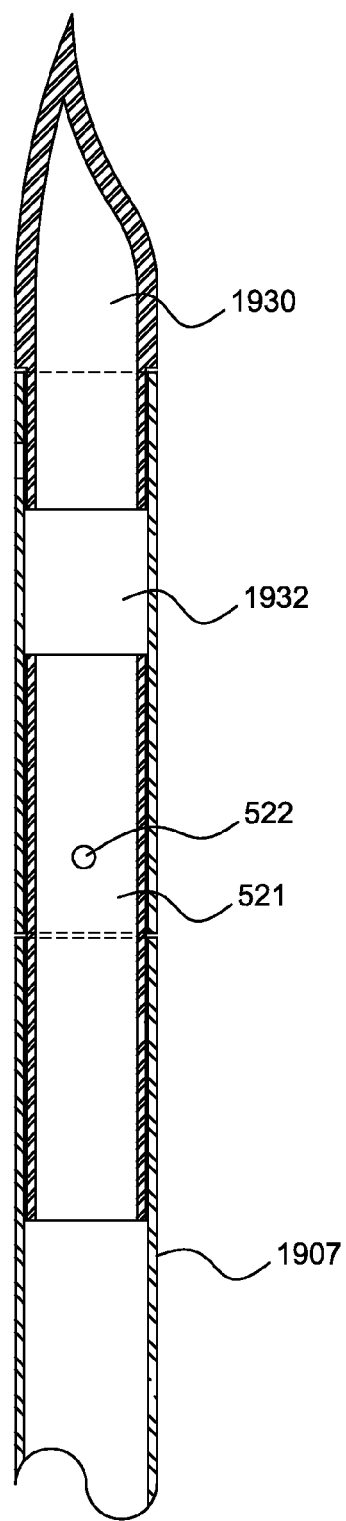
FIG. 21 shows an exploded side view illustrating the modular stackable chair according to FIG. 19.

FIG. 21 shows section 21-21 of FIG. 19, illustrating how crimped cap 1930 is friction-fitted into female adapter tube 1932 which in turn fits over male tube 521 on back strut 1907. Preferably, chair frame 1905 comprises female adapter tube 1932, male tube 521, and back strut 1907, as shown. Preferably, crimped cap 1930 is friction-fitted into female adapter tube 1932, as shown (at least embodying herein wherein said at least one releasable attacher comprises at least one friction locking tube adapted to frictionally lock said at least one back-contour support and said at least one connector together). Preferably, female adapter tube 1932 in turn fits over male tube 521 on back strut 1907, as shown. Preferably, female adapter tube 1932 is button-locked onto male tube 521, in the same way as was shown and described in FIG. 5. Preferably, male tube 521 is permanently attached to back strut 1907. This arrangement allows chair back 1915 to be raised by the height of female adapter tube 1932, as shown in FIG. 19. Further, this arrangement allows chair back 1915 to be quickly removed from chair frame 1905, by pulling crimped cap 1930 off of female adapter tube 1932, without the necessity of depressing any spring-loaded buttons 522. Upon reading the teachings of this specification, those with ordinary skill in the art will now understand that, under appropriate circumstances, considering such issues as advances in technology, user preference, design aesthetics, etc., other arrangements, such as the crimped cap locking into the female adapter tube, etc., may suffice.

Figure 22:
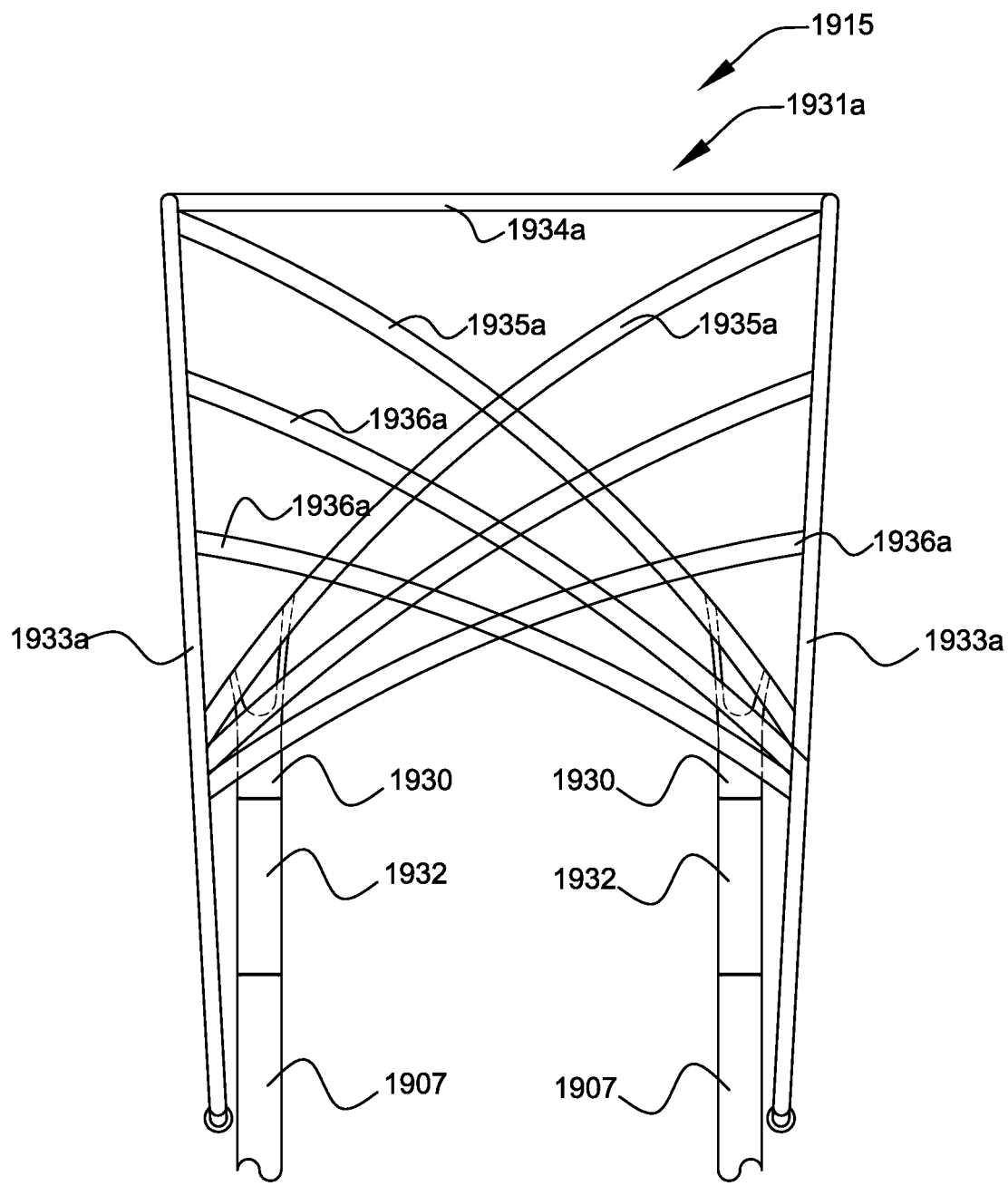
FIG. 22 shows a front view illustrating a chair back for the modular stackable chair according to FIG. 19.

FIG. 22 shows a front view illustrating back frame 1931a for modular stackable chair 1901 according to FIG. 19. Preferably, back frame 1931 comprises back frame 1931a, preferably comprising top stretcher 1934a, frame attachments 1935a, and decorative elements 1936a, as shown. Back frame 1931a is shown to illustrate one particular decorative embodiment of chair back 1915.

Figure 23:
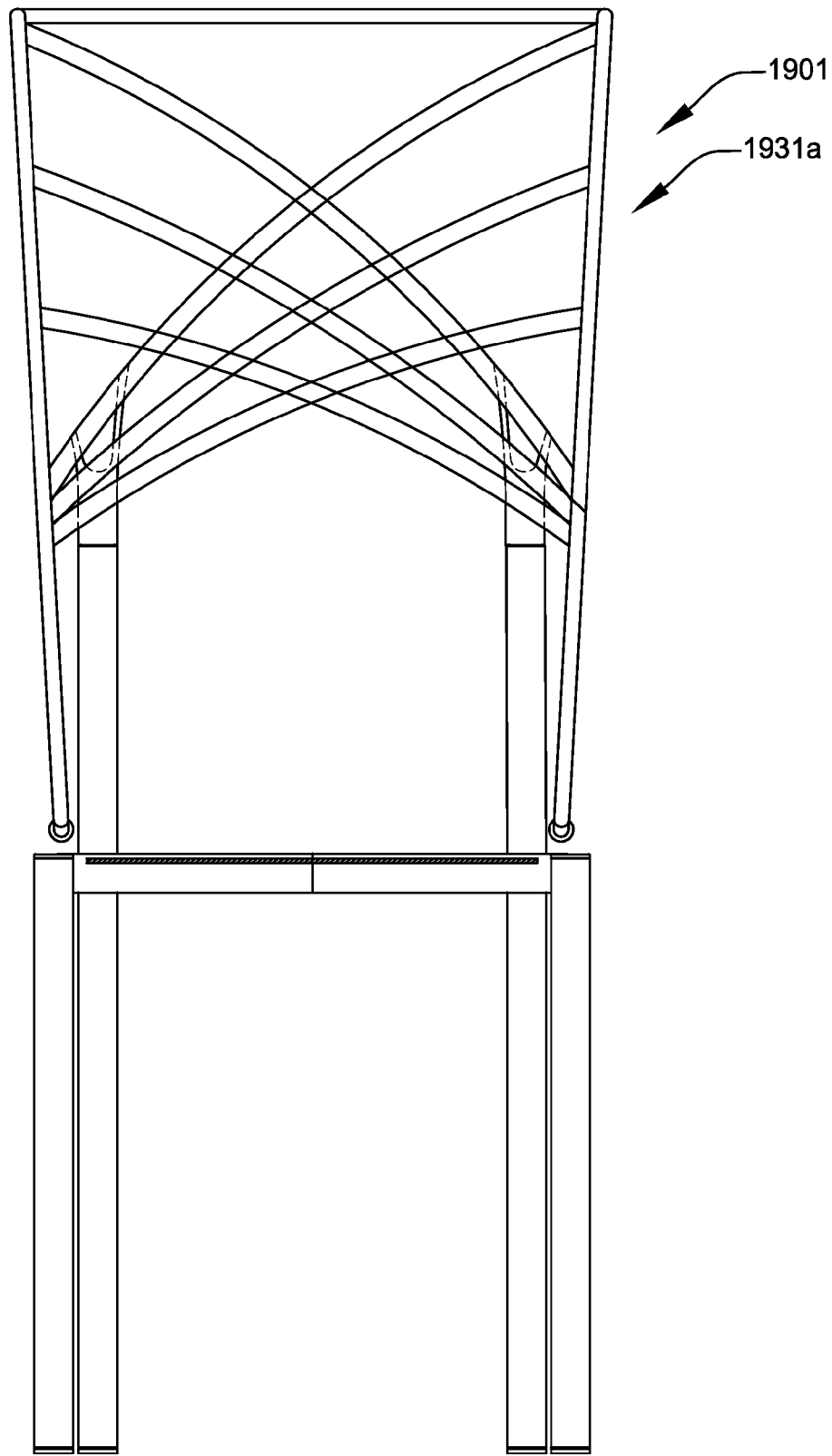
FIG. 23 shows a front view illustrating the modular stackable chair according to FIG. 19 using the chair back according to FIG. 22.

FIG. 23 shows a front view illustrating modular stackable chair 1901 according to FIG. 19 using back frame 1931a according to FIG. 22.

Figure 24:
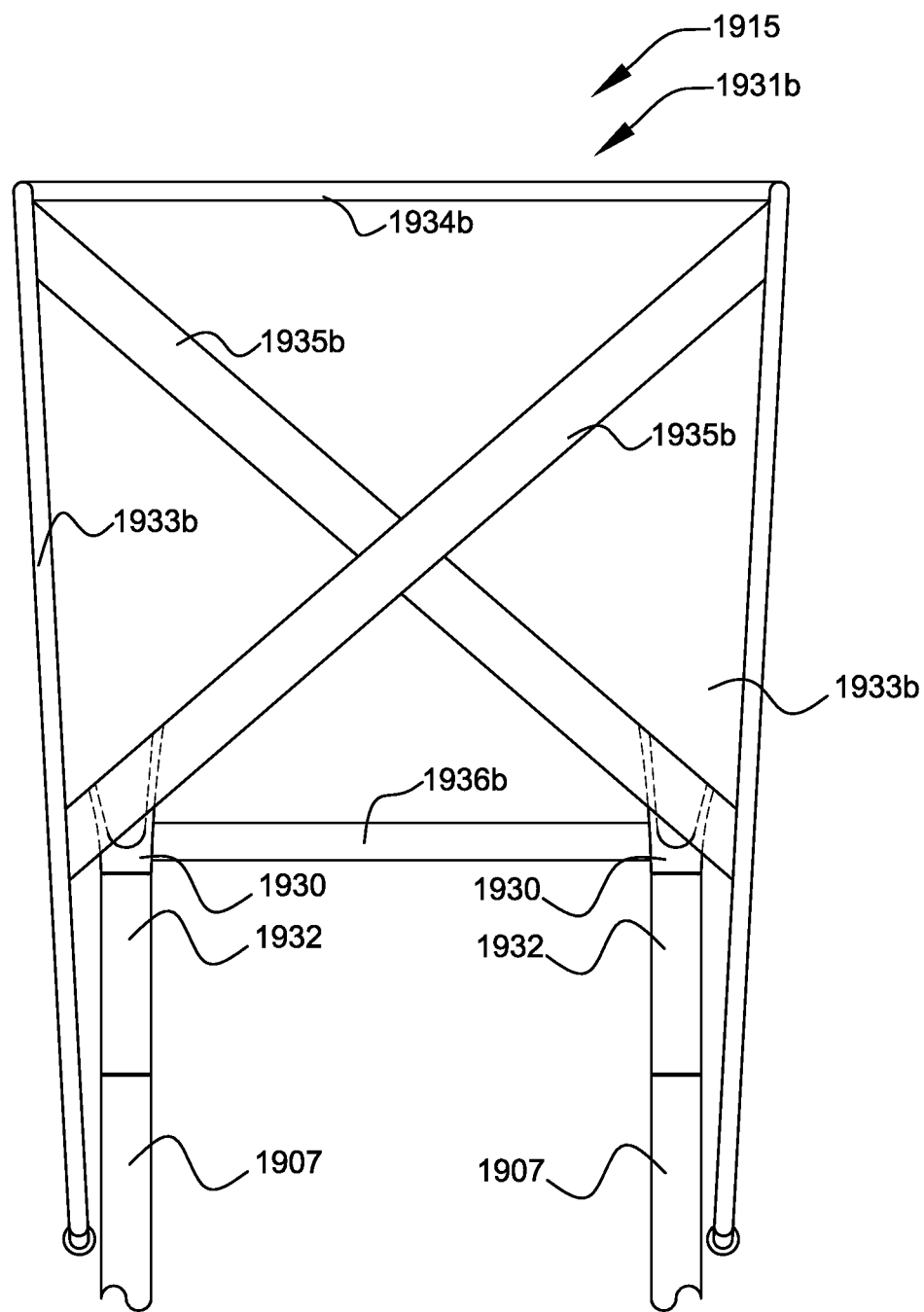
FIG. 24 shows a front view illustrating another chair back for the modular stackable chair according to FIG. 19.

FIG. 24 shows a front view illustrating another chair back 1931b for modular stackable chair 1901 according to FIG. 19. Preferably, back frame 1931 comprises back frame 1931b, preferably comprising top stretcher 1934b, frame attachments 1935b, and decorative elements 1936b, as shown. Back frame 1931b is shown to illustrate one particular decorative embodiment of chair back 1915.

Figure 25:
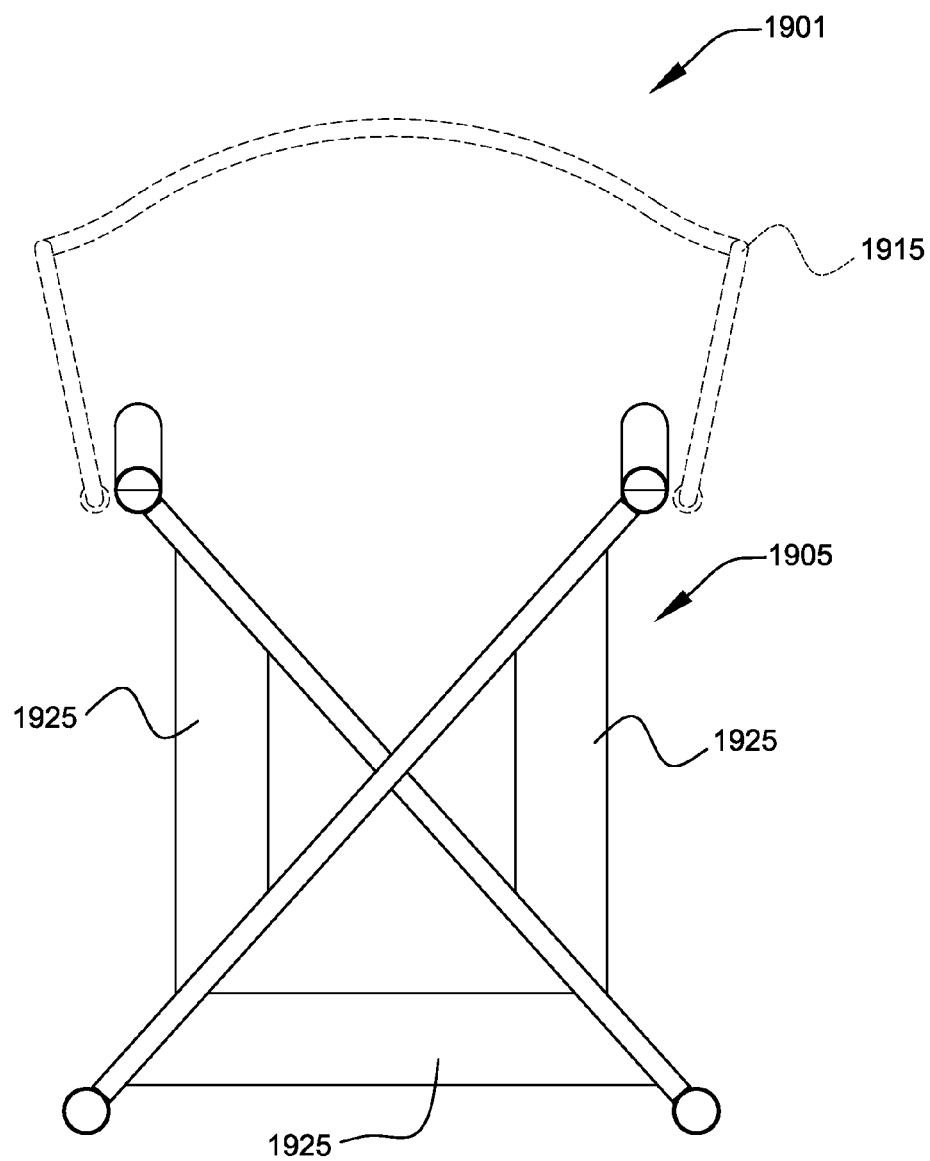
FIG. 25 shows a side view illustrating the modular stackable chair according to FIG. 19.

FIG. 25 shows a top view illustrating modular stackable chair 1901 according to FIG. 19. The position of an embodiment of chair back 1915 is sketched in for illustrative purposes. Preferably, chair frame 1905 comprises crossbar plates 1925, as shown, which are preferably modifications of crossbar plates 425 having substantially the same function but slightly larger size and different placement than crossbar plates 425, as shown.

FIG. 26 shows a side view illustrating one stack of modular stackable chairs 1901 according to FIG. 19. The positions of chair backs 1915 are sketched in for illustrative purposes. Preferably, modular stackable chairs 1901 are stackable with or without attached chair backs 1915, as shown.

Figure 27:
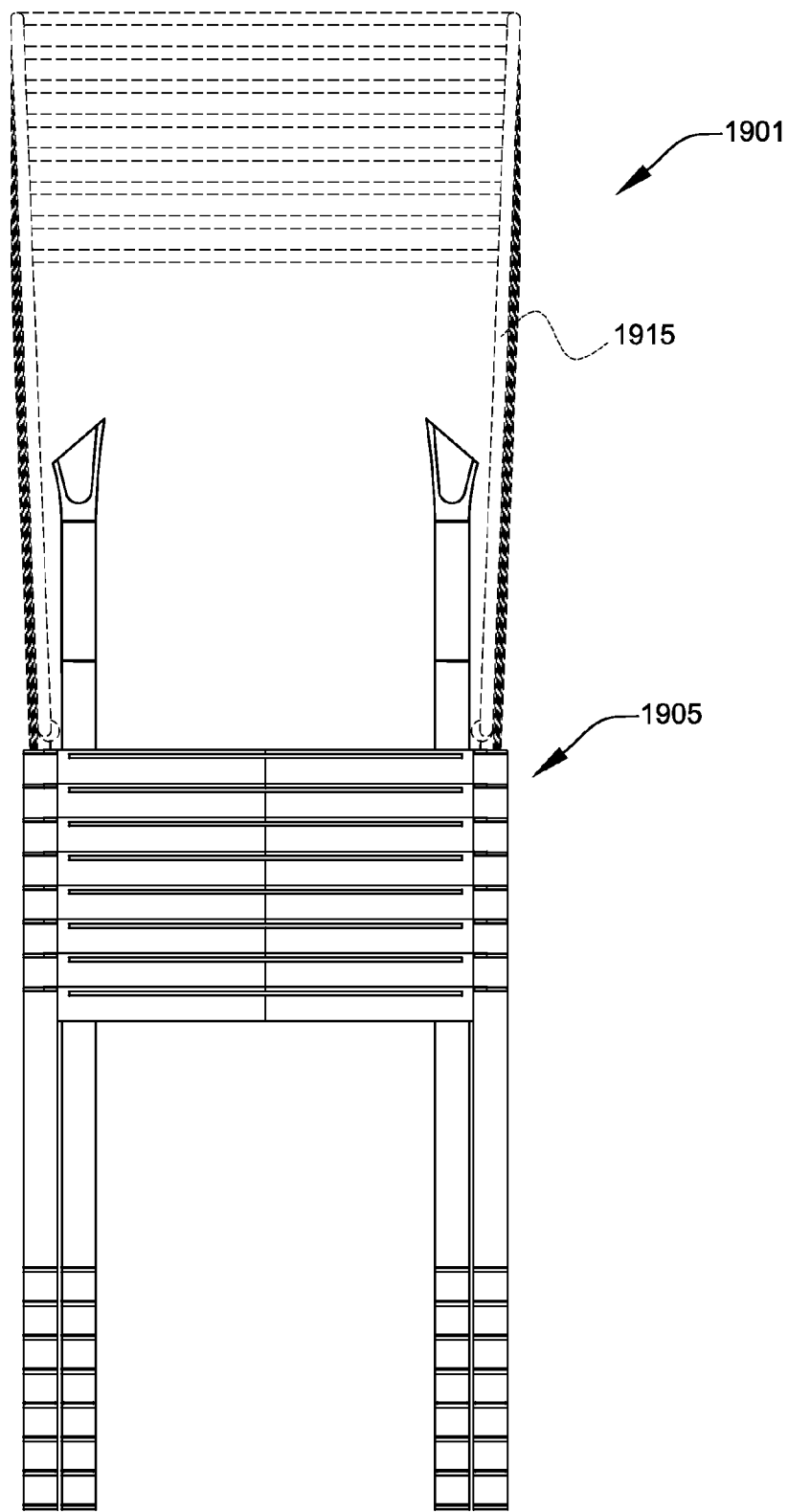
FIG. 27 shows a front view illustrating a stack of the modular stackable chairs according to FIG. 19.

FIG. 27 shows a front view illustrating one stack of modular stackable chairs 1901 according to FIG. 19. The positions of chair backs 1915 are sketched in for illustrative purposes.

Figure 28:
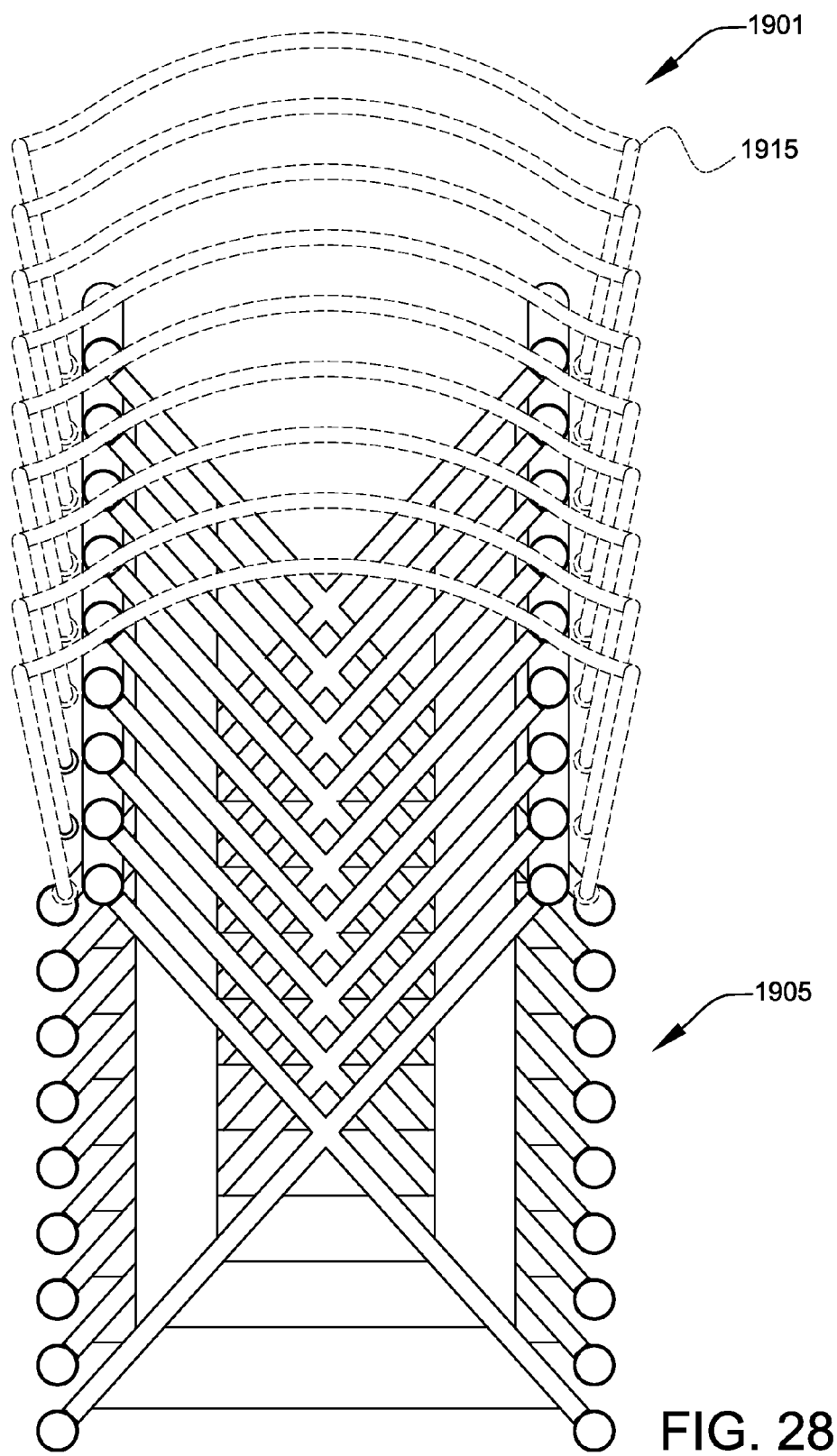
FIG. 28 shows a top view illustrating a stack of the modular stackable chairs according to FIG. 19.

FIG. 28 shows a top view illustrating one stack of modular stackable chairs 1901 according to FIG. 19. The positions of chair backs 1915 are sketched in for illustrative purposes.

Figure 29:
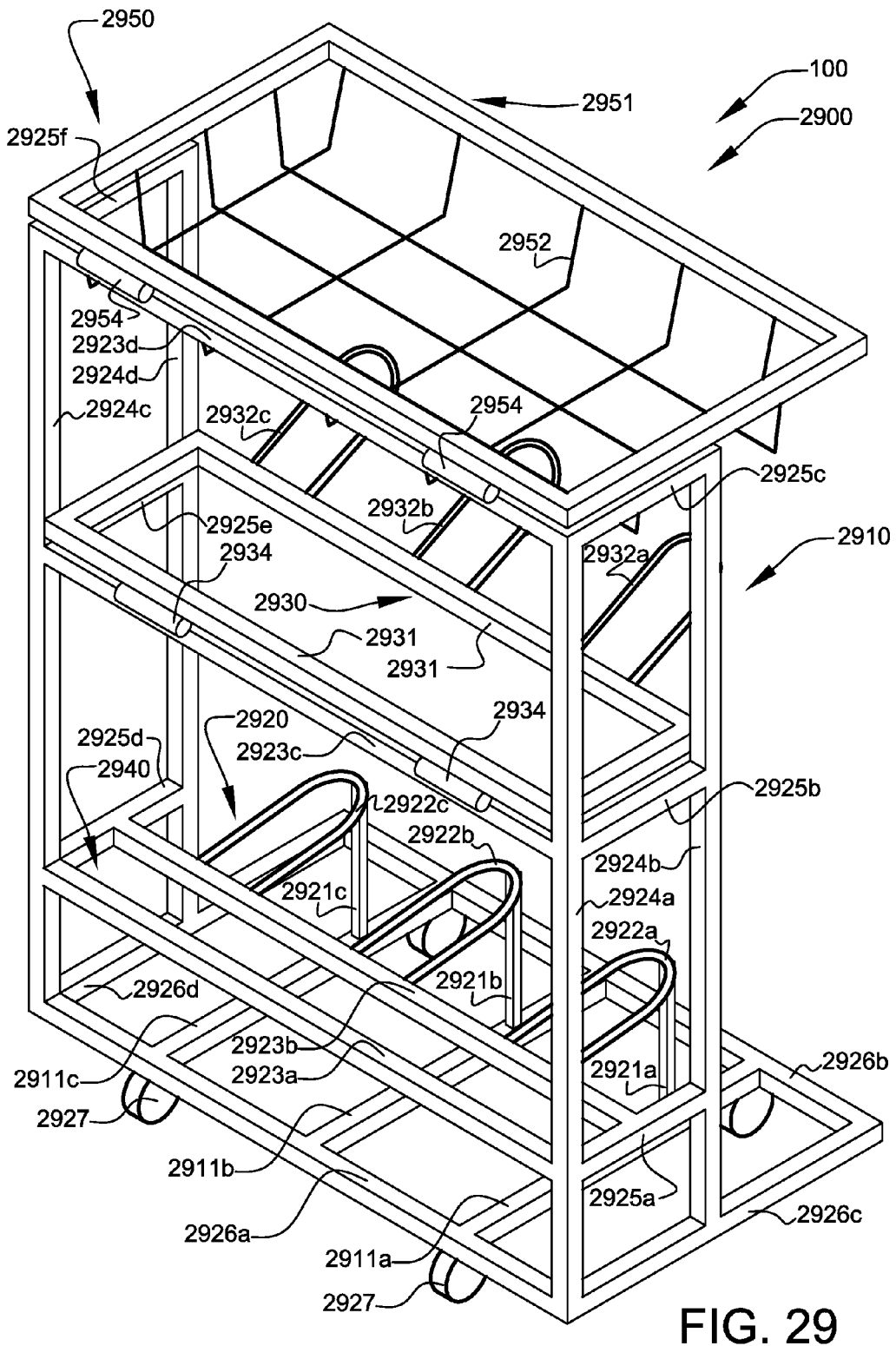
FIG. 29 shows a perspective view illustrating a dolly according to a preferred embodiment of the present invention.
Figures 34, 35:
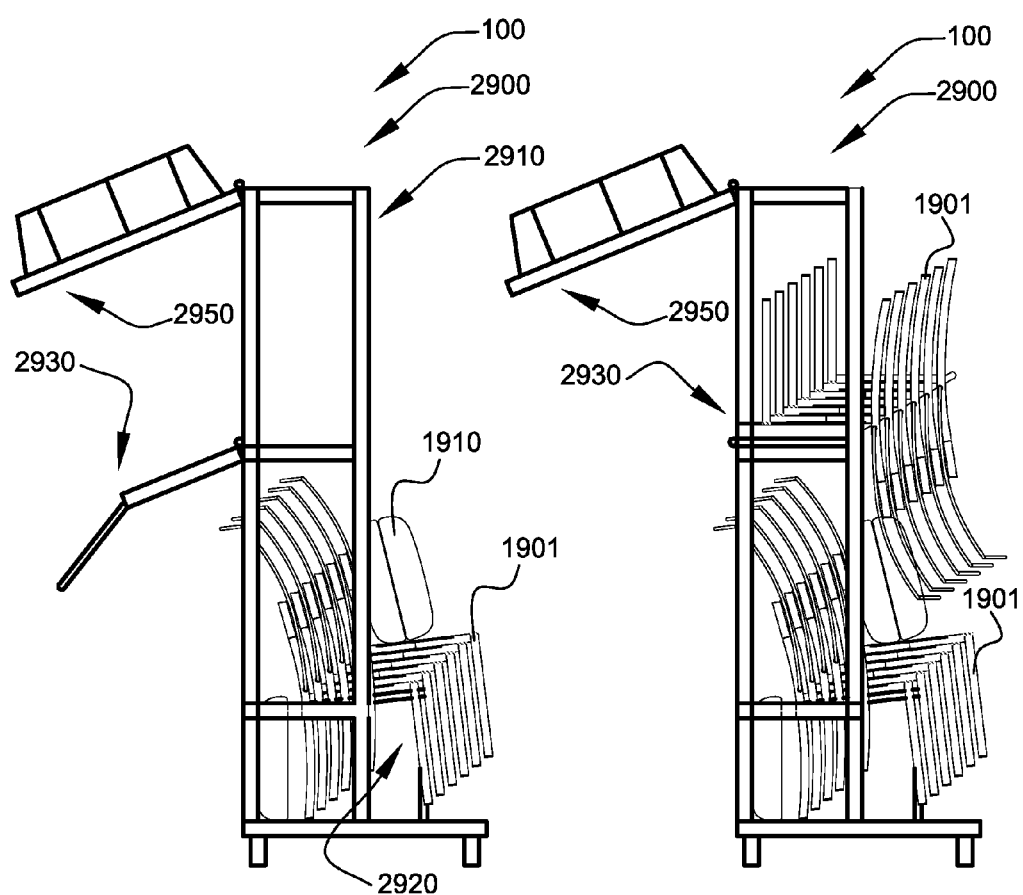
FIG. 34 shows a front view illustrating the dolly according to FIG. 29, loaded with seatless chairs and with chair seats.
FIG. 35 shows a side view illustrating the dolly according to FIG. 29, loaded with seatless chairs and with chair seats.

FIG. 29 shows a perspective view illustrating dolly 2900 according to a preferred embodiment of the present invention. Preferably, modular furniture system 100 comprises dolly 2900, as shown. Preferably, dolly 2900 is adapted to carry modular stackable chairs 101 and/or 1910, as shown in FIG. 34. Preferably, dolly 2900 is adapted to carry about thirty-six modular stackable chairs 1901, as shown in FIG. 34. Preferably, dolly 2900 comprises frame 2910, lower chair holder 2920, upper chair holder 2930, lower seat holder 2940, and upper seat holder 2950, as shown.

Preferably, frame 2910 comprises: lower struts 2911a, 2911b, and 2911c; horizontal struts 2923a, 2923b, 2923c, and 2923d; vertical struts 2924a, 2924b, 2924c, and 2924d; side struts 2925a, 2925b, 2925c, 2925d, 2925e, and 2925f; lower struts 2926a, 2926b, 2926c, and 2926d; and wheels 2927 (at least embodying herein wherein said at least one transporter comprises at least two wheels), as shown.

Preferably, lower chair holder 2920 comprises stack support 2922a, stack support 2922b, and stack support 2922c, as shown. Preferably, lower chair holder 2920 is supported by stack support struts 2921a, 2921b, and 2921c, and by horizontal strut 2923b, as shown.

Preferably, upper chair holder 2930 comprises frame 2931, stack support 2932a, stack support 2932b, stack support 2932c, and hinges 2934, as shown. Preferably, hinges 2934 connect frame 2931 to horizontal strut 2923c, as shown. Preferably, stack supports 2932a, 2932b, and 2932c are connected to frame 2931 substantially above lower chair holder 2920, as shown.

Preferably, lower seat holder 2940 comprises horizontal struts 2923a and 2923b, lower struts 2911a, 2911b, and 2911c, and side struts 2925a and 2925d, as shown.

Preferably, upper seat holder 2950 comprises frame 2951, basket 2952, and hinges 2954, as shown. Preferably, hinges 2954 connect frame 2951 to horizontal strut 2923d, as shown. Preferably, basket 2952 is connected to frame 2951 substantially above upper chair holder 2930, as shown.

Preferably, dolly 2900 is constructed of metal, preferably welded steel tubing, as shown. Upon reading the teachings of this specification, those with ordinary skill in the art will now understand that, under appropriate circumstances, considering such issues as advances in technology, user preference, intended use, intended number of chairs to carry, etc., other arrangements, such as other struts configurations, other numbers of upper seat holders, other numbers of lower seat holders, other numbers of upper chair holders, other numbers of lower chair holders, one or more levels of chair holders, one or more levels of seat holders, other materials, exterior walls and/or doors, dust covers, other numbers of wheels, etc., may suffice.

Figure 30:
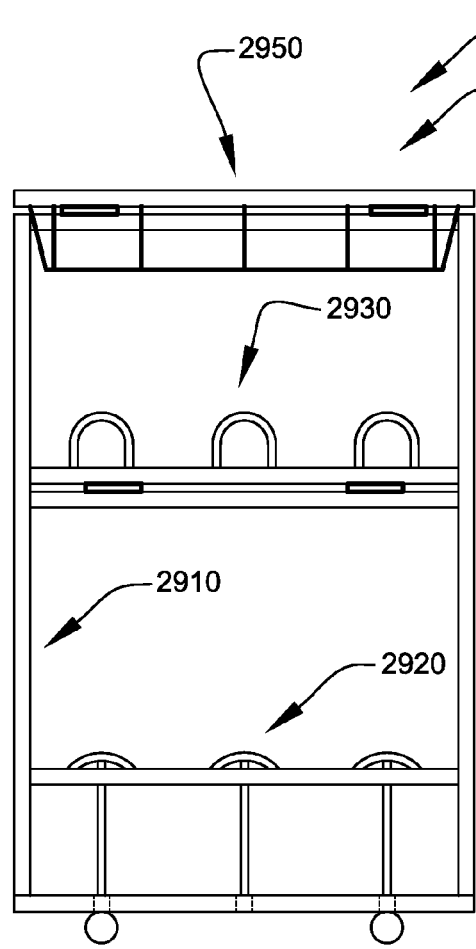
FIG. 30 shows a front view illustrating the dolly according to FIG. 29.

FIG. 30 shows a front view illustrating dolly 2900 according to FIG. 29.

Figure 31:
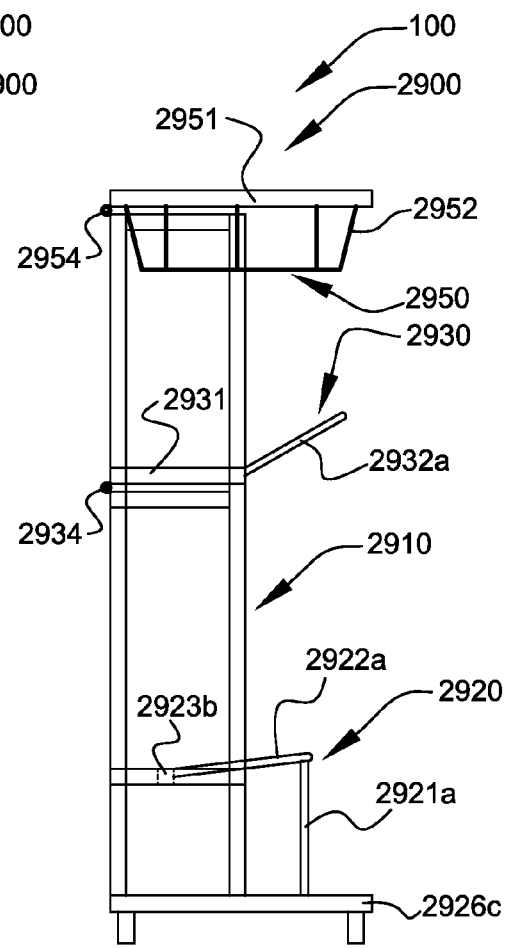
FIG. 31 shows a side view illustrating the dolly according to FIG. 29.

FIG. 31 shows a side view illustrating dolly 2900 according to FIG. 29.

FIG. 32 shows a side view illustrating dolly 2900 according to FIG. 29, with upper seat holder 2950 and upper chair holder 2930 folded outward.

FIG. 33 shows a side view illustrating dolly 2900 according to FIG. 29, with upper seat holder 2950 folded outward.

FIG. 34 shows a side view illustrating dolly 2900 according to FIG. 29 loaded with one stack of modular stackable chairs 1901 with chair seats 1910 removed. Preferably, upper chair holder 2930 is folded outward out of the way while lower chair holder 2920 is loaded with modular stackable chairs 1901, as shown. Preferably, stack supports 2922a, 2922b, and 2922c each hold one stack of six modular stackable chairs 1901, as shown. Preferably, stack supports 2922a, 2922b, and 2922c are angled upward, as shown, in order to securely hold each stack of modular stackable chairs 1901 from sliding off of the ends of stack supports 2922a, 2922b, and 2922c as dolly 2900 is moved from place to place. Upon reading the teachings of this specification, those with ordinary skill in the art will now understand that, under appropriate circumstances, considering such issues as advances in technology, user preference, intended use, etc., other arrangements, such as other numbers of chairs in a stack, other means of securing the stack of chairs on the stack support, etc., may suffice.

FIG. 35 shows a side view illustrating dolly 2900 according to FIG. 29 loaded with stacks of modular stackable chairs 1901 with chair seats 1910 removed. Preferably, upper seat holder 2950 is folded outward out of the way while upper chair holder 2930 is loaded with upside-down stacks of modular stackable chairs 1901, as shown. Preferably, stack supports 2932a, 2932b, and 2932c are angled to slide upward between chair backs 1915 and chair frames 1905, as shown, in order to securely hold each upside-down stack of modular stackable chairs 1901. Upon reading the teachings of this specification, those with ordinary skill in the art will now understand that, under appropriate circumstances, considering such issues as advances in technology, user preference, intended use, etc., other arrangements, such as other numbers of chairs in a stack, other means of securing the stack of chairs on the stack support, etc., may suffice.

Figures 36, 37:
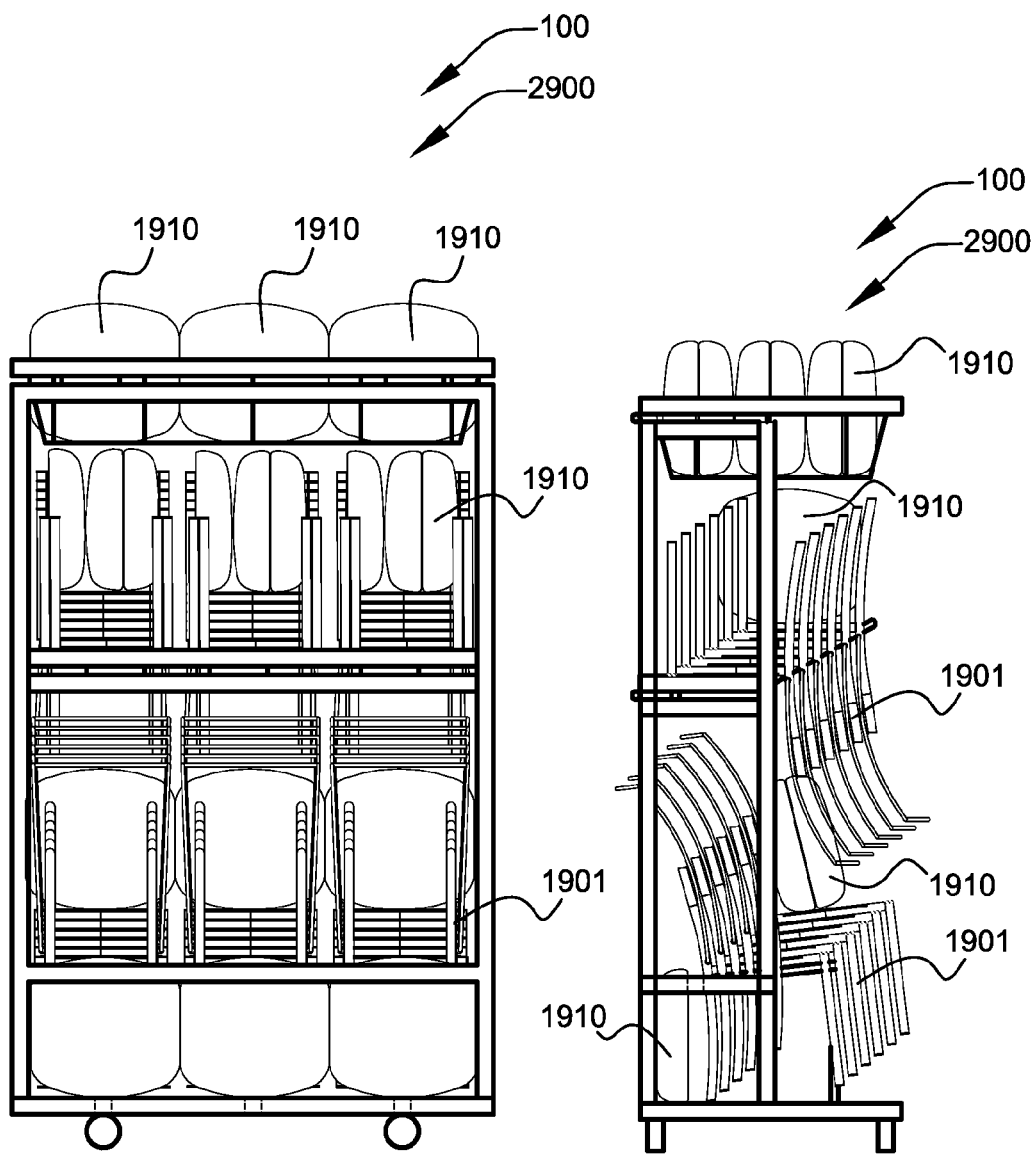
FIG. 36 shows a side view illustrating the dolly according to FIG. 29, loaded with a first stack of seatless chairs and associated chair seats.
FIG. 37 shows a side view illustrating the dolly according to FIG. 29, loaded with first and second stacks of seatless chairs and associated chair seats.

FIG. 36 shows a front view illustrating dolly 2900 according to FIG. 29 loaded with stacks of modular stackable chairs 1901 with chair seats 1910 removed.

Preferably, six stacks of six modular stackable chairs 1901 are stored and/or transported on dolly 2900, for a total of thirty-six modular stackable chairs 1901 per dolly 2900, as shown. Preferably, lower seat holder 2940 (at least embodying herein wherein said at least one transporter comprises at least one seat holder adapted to hold such at least two chair seats) holds at least three chair seats 1910, upper seat holder 2950 (at least embodying herein wherein said at least one transporter comprises at least one horizontal-support holder adapted to hold said at least two of said at least one horizontal supports) holds at least eighteen chair seats 1910, at least six chair seats 1910 are stored on the first stacks of modular stackable chairs 1901 on lower chair holder 2920 (at least embodying herein wherein said at least one transporter comprises at least one chair holder adapted to hold such at least two stacked chair frames), and at least nine chair seats 1910 are stored on the second stacks of modular stackable chairs 1901 on upper chair holder 2930 (at least embodying herein wherein said at least one transporter comprises at least one raised-support holder adapted to hold said at least two of said at least one raised-supports), for a total of thirty-six chair seats 1910 per dolly 2900, as shown. Upon reading the teachings of this specification, those with ordinary skill in the art will now understand that, under appropriate circumstances, considering such issues as advances in technology, user preference, etc., other arrangements, such as other seat placements, other numbers of seats and chairs, etc., may suffice.

FIG. 37 shows a side view illustrating dolly 2900 according to FIG. 29 loaded with stacks of modular stackable chairs 1901 with chair seats 1910 removed.

Figure 38:
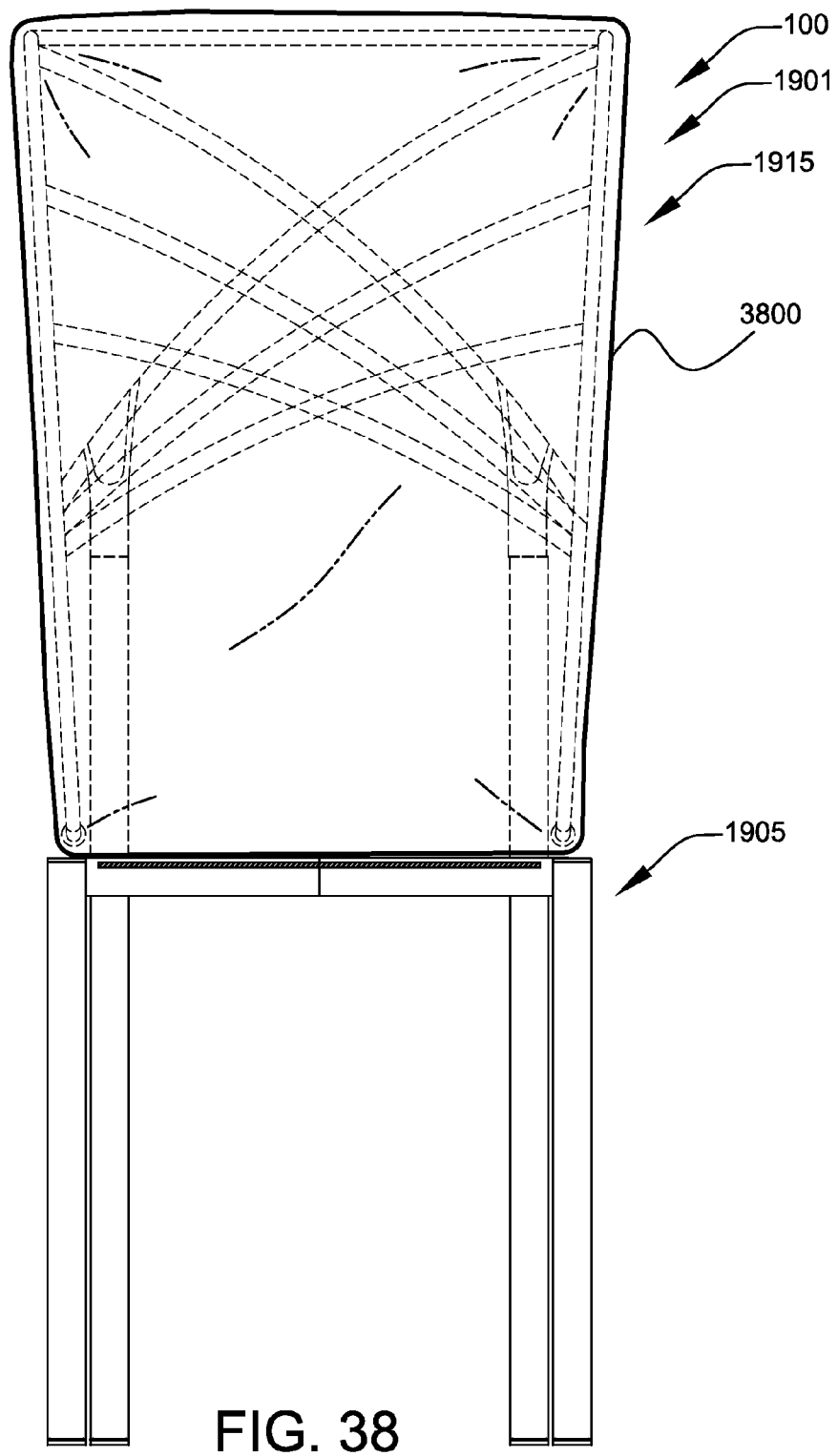
FIG. 38 shows a front view illustrating the seatless modular stackable chair according to FIG. 19, using a chair-back cover.

FIG. 38 shows a front view illustrating modular stackable chair 1901, with chair seat 1910 removed, according to FIG. 19, using chair-back cover 3800. Preferably, modular furniture system 100 comprises chair-back cover 3800, as shown. Preferably, chair-back cover 3800 is adapted to cover chair back 1915, as shown, preferably providing both user comfort and an attractive appearance. Preferably, chair-back cover 3800 (at least embodying herein at least one back-contour support cover adapted to substantially cover said at least one back-contour support) comprises cloth, as shown. Upon reading the teachings of this specification, those with ordinary skill in the art will now understand that, under appropriate circumstances, considering such issues as advances in technology, user preference, etc., other chair-back cover arrangements, such as other materials, padding, stiffeners, indicia, etc., may suffice.

Figure 39:
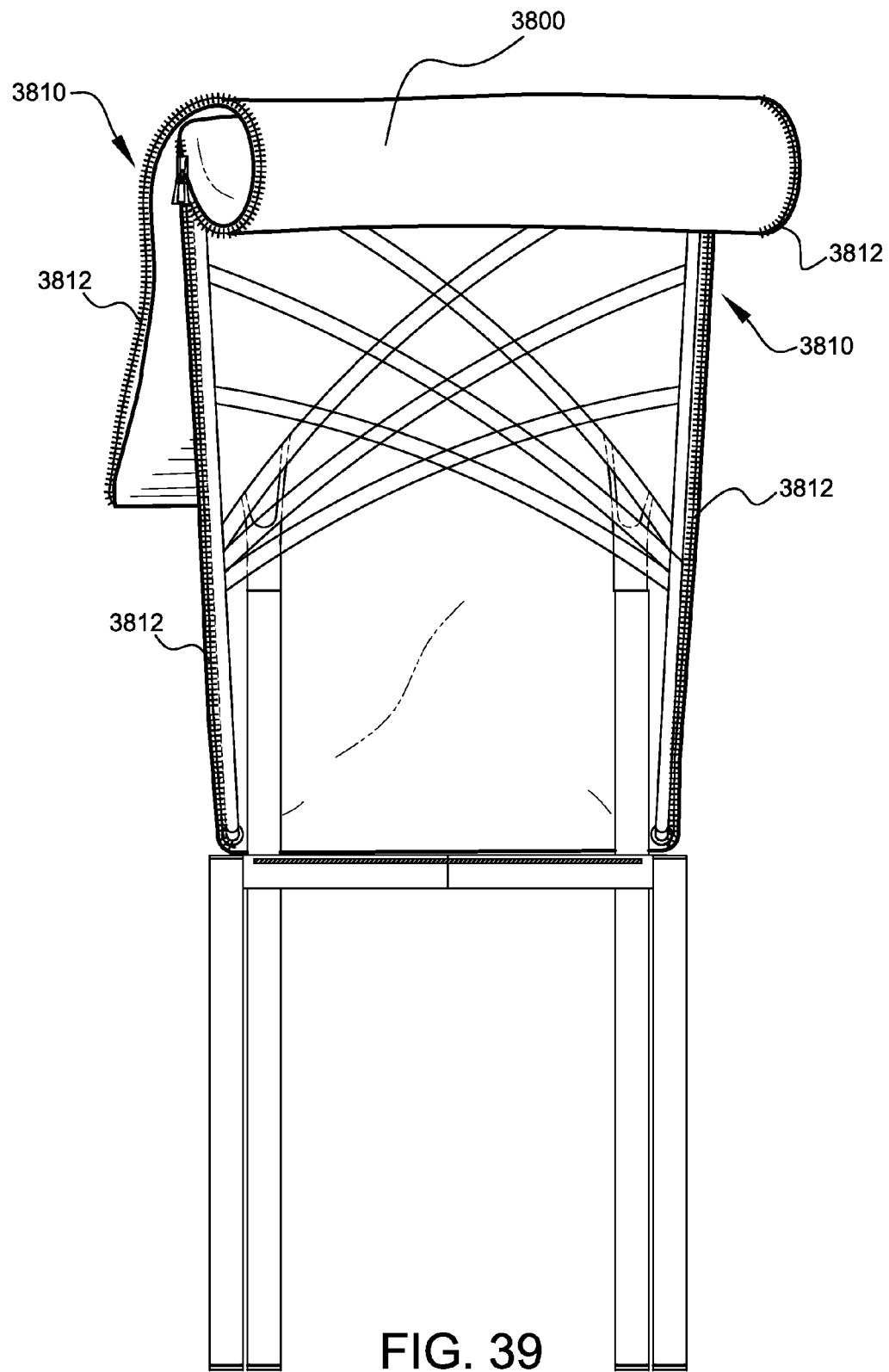
FIG. 39 shows a front view illustrating the seatless modular stackable chair according to FIG. 19, with the chair-back cover unzipped.

FIG. 39 shows a front view illustrating modular stackable chair 1901, with chair seat 1910 removed, according to FIG. 19, using chair-back cover 3800 showing chair-back cover 3800 unzipped. Preferably, especially where seat back 1915 has a complex shape, cover 3800 opens and closes with attacher 3810 (at least embodying herein at least one openable closure adapted to open and close said at least one back-contour support cover wherein said at least one back-contour support cover is installable over, and removable from, said at least one back-contour support), as shown, which preferably comprises one or more zippers 3812, as shown. Upon reading the teachings of this specification, those with ordinary skill in the art will now understand that, under appropriate circumstances, considering such issues as advances in technology, user preference, etc., other attachers, such as snaps, hook and loop fasteners, hooks and eyes, not using any attachers where the chair-back cover can slip on to the chair back, applying an attacher to the bottom opening of the chair-back cover, etc., may suffice.

Figure 40:
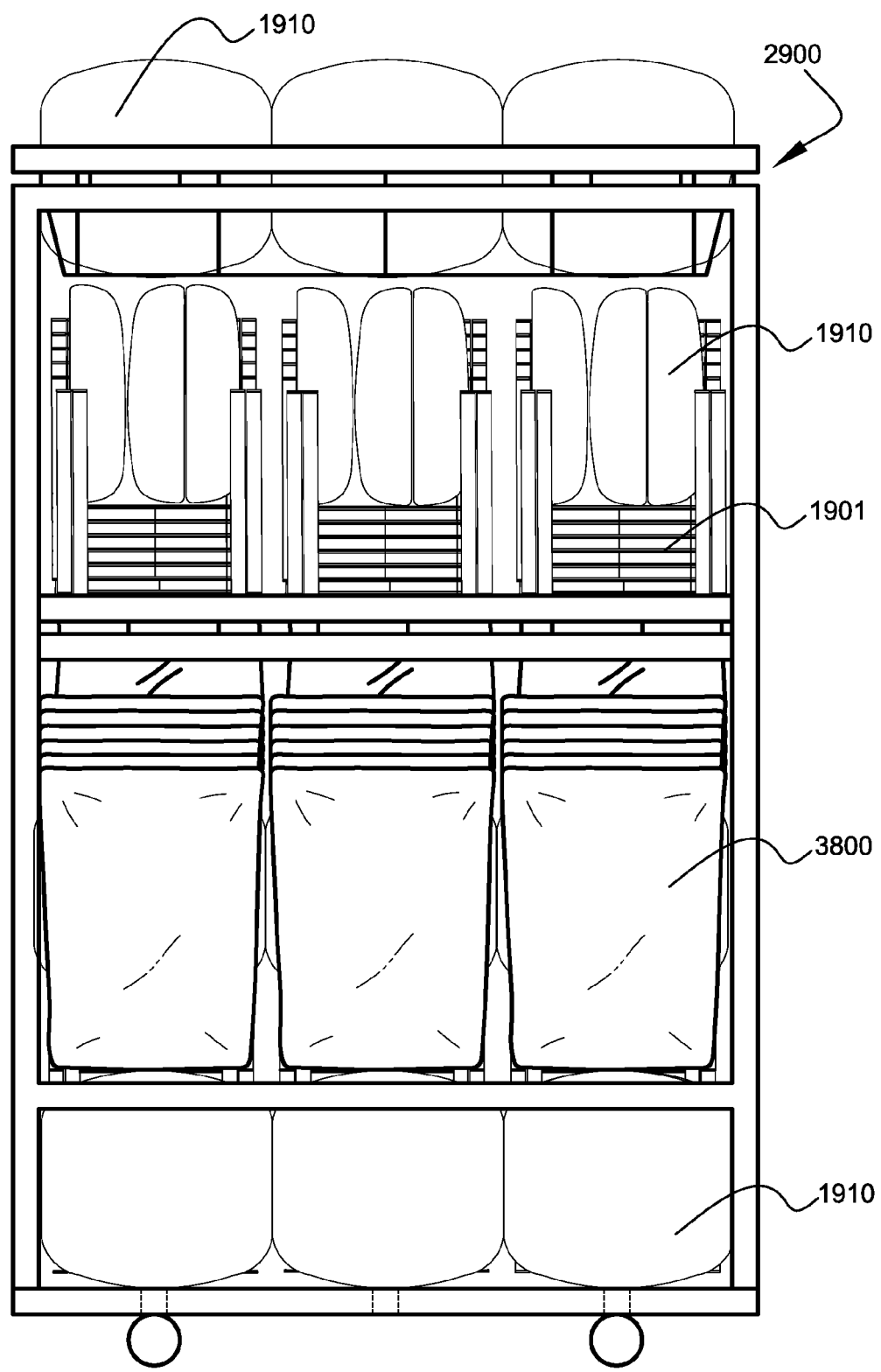
FIG. 40 shows a front view illustrating the dolly according to FIG. 29, loaded with seatless chairs using chair-back covers and associated chair seats.

FIG. 40 shows a front view illustrating dolly 2900 according to FIG. 29 loaded with modular stackable chairs 1901, using seat-back covers 3800, and associated chair seats 1910. Preferably, seat-back covers 3800 do not interfere with stacking modular stackable chairs 1901, as shown.

Figure 41:
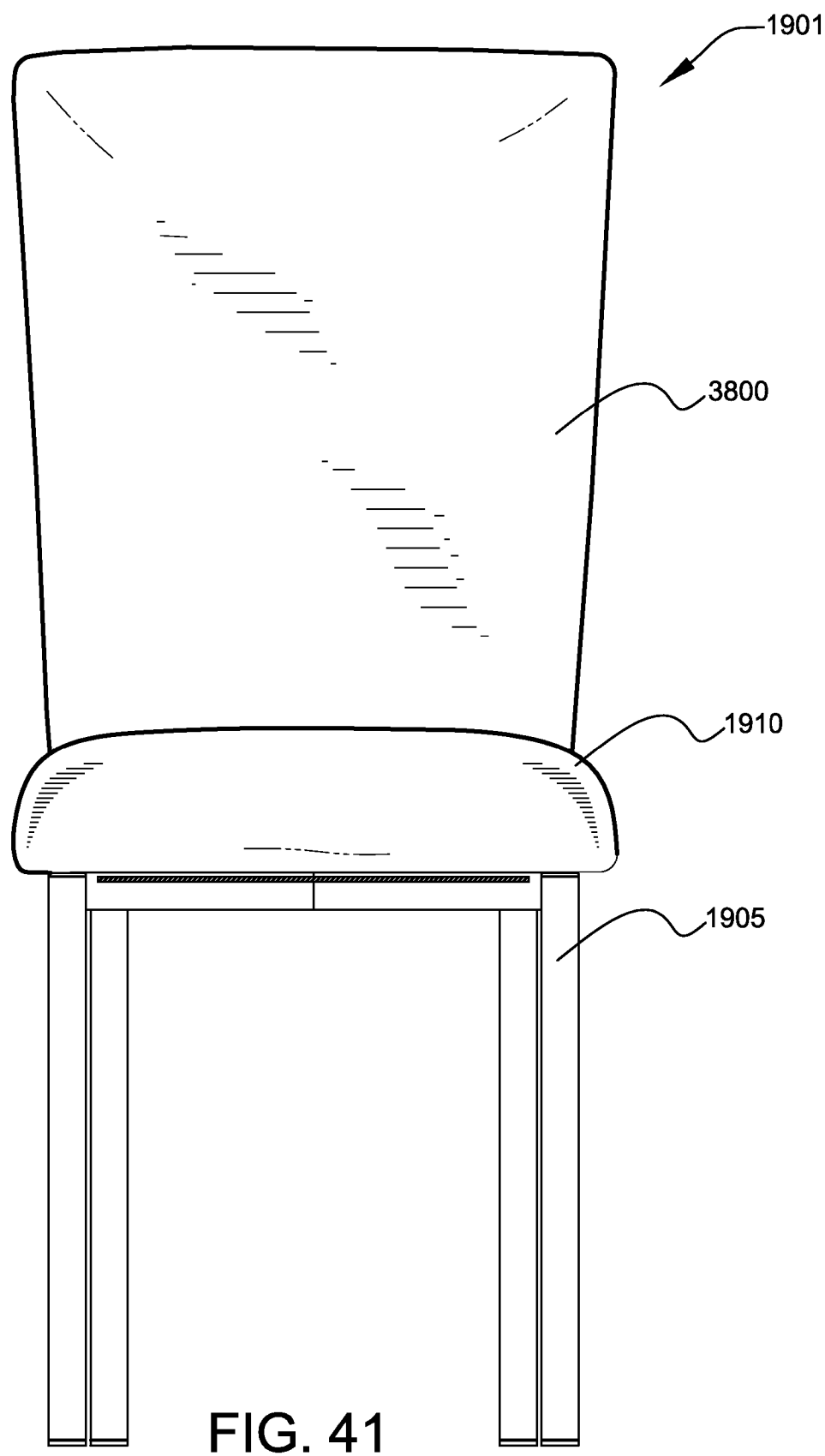
FIG. 41 shows a front view illustrating the modular stackable chair according to FIG. 19, using a chair-back cover, with a chair seat installed.

FIG. 41 shows a front view illustrating modular stackable chair 1901 according to FIG. 19 using chair-back cover 3800, with chair seat 1910 installed. Preferably, chair-back cover 3800 (at least embodying herein at least one back-support cover adapted to substantially cover said at least one back support; and at least embodying herein wherein such plurality of modular furniture components further comprises a plurality of back-contour covers having at least one aesthetic design) is selected by customer 1760 to either match or attractively contrast with the selected chair seat 1910, chair back 1915, and chair frame 1905. Preferably, modular stackable chairs 1901 are substantially assembled and loaded onto dollies 2900 (at least embodying herein at least one transporter adapted to transport at least two of said at least one raised-supports and at least two of said at least one horizontal supports; and at least embodying herein at least one transporter adapted to transport such at least two stacked chair frames and such at least two chair seats), as shown, preferably at rental-warehouse 1950, and then are quickly and easily delivered, fully assembled, and set up at customer 1760's location.

FIG. 42 shows a diagram illustrating method 4200 according to a preferred embodiment of the present invention. Preferably, modular furniture system 100 comprises method 4200. Preferably, method 4200 comprises the step of receiving 4205 (at least embodying herein the step of receiving at least one customer's order for at least two chairs having customer-selected chair frames, chair backs, and chair seats) customer 1760's order for at least two modular stackable chairs 1901 having customer-selected chair frames 1905, chair backs 1915, and chair seats 1910; assembling 4210 (at least embodying herein the step of assembling such customer-selected chair frames and such customer-selected chair backs into at least two seatless chairs) such customer-selected chair frames 1905 and such customer-selected chair backs 1915 into at least two seatless modular stackable chairs 1901 (preferably at rental-warehouse 1750); stacking 4215 (at least embodying herein the step of stacking such at least two seatless chairs together into at least one stack) such at least two seatless modular stackable chairs 1901 together into at least one stack; loading 4220 (at least embodying herein the step of loading such at least one stack onto at least one dolly) such at least one stack onto dolly 2900; loading 4221 (at least embodying herein the step of loading such customer-selected chair seats onto such at least one dolly) such customer-selected chair seats 1915 onto dolly 2900; and delivering 4225 (at least embodying herein the step of transporting such plurality of modular furniture components in exactly one dolly; and at least embodying herein the step of delivering such at least one dolly to such at least one customer) dolly 2900 to customer 1760. Preferably, method 4200 further comprises the step of receiving 4230 (at least embodying herein the step of receiving at least one customer's order for at least two chairs having customer-selected chair frames, chair backs, chair-back covers, and chair seats; and at least embodying herein the step of receiving such customer's selection of at least one back-contour cover) customer 1760's order for at least two modular stackable chairs 1901 having customer-selected chair frames 1905, chair backs 1915, chair-back covers 3800, and chair seats 1910; and installing 4235 (at least embodying herein the step of installing such chair-back covers on such seatless chairs) such chair-back covers 3800 on such seatless modular stackable chairs 1901. This arrangement reduces the number of man-hours required at the customer's location. Upon reading the teachings of this specification, those with ordinary skill in the art will now understand that, under appropriate circumstances, considering such issues as advances in technology, user preference, etc., other arrangements, such as applying this method to modular stackable chairs 101, additional steps, using other dollies, etc., may suffice.

Figure 43:
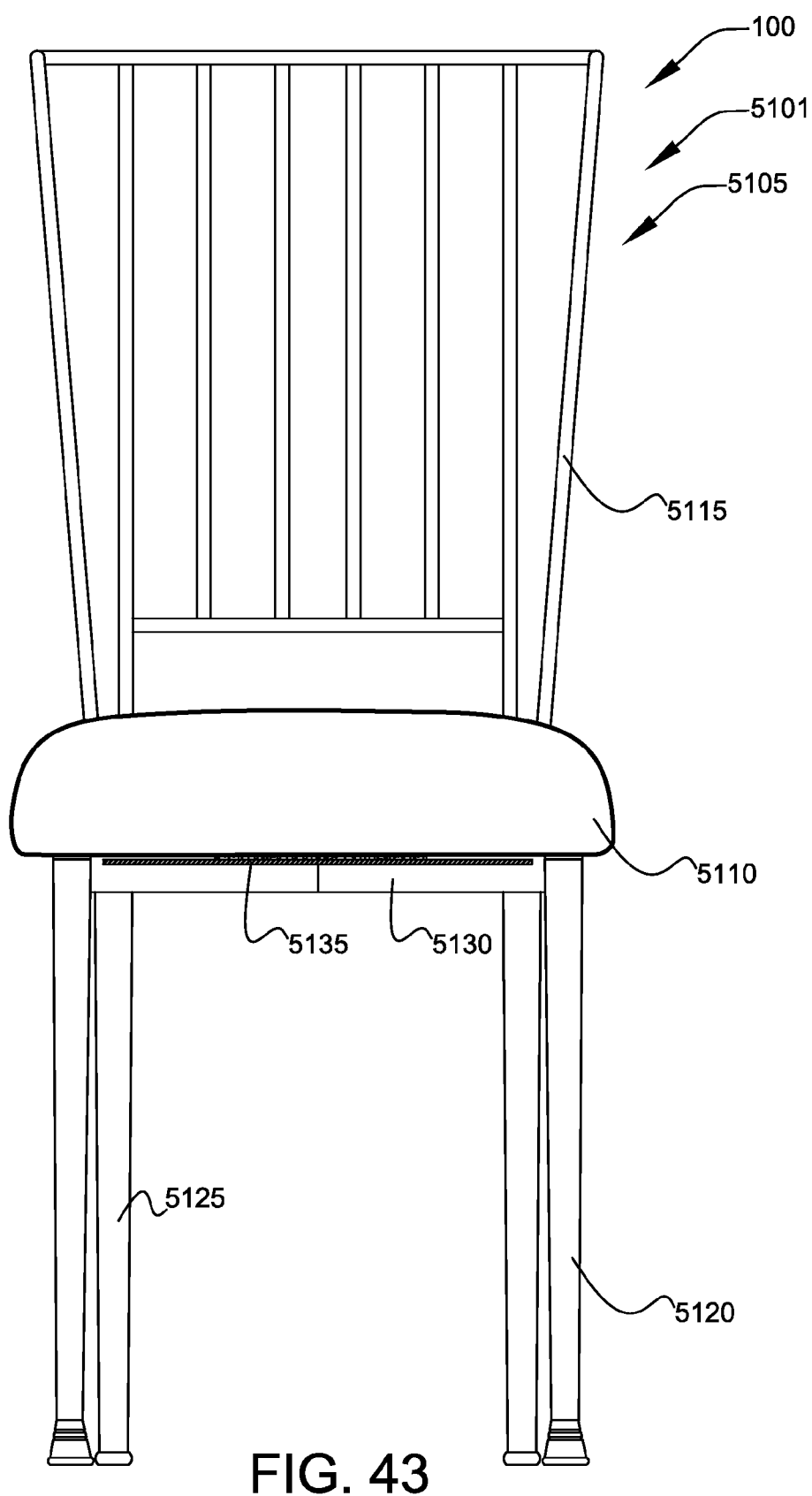
FIG. 43 shows a front view illustrating a modular stackable chair according to another preferred embodiment of the present invention.

FIG. 43 shows a front view illustrating modular stackable chair 5101 according to a preferred embodiment of the present invention. Preferably, modular furniture system 100 comprises modular stackable chair 5101, as shown. Preferably, modular stackable chair 5101 comprises chair frame 5105 and chair seat 5110, as shown. Preferably, chair frame 5105 comprises chair back 5115, front legs 5120, rear legs 5125, crossbars 5130, and crossbar plates 5135, as shown. Preferably, chair seat 5110 is easily removable from chair frame 5105. Preferably, chair seat 5110 attaches to chair frame 5105 strongly enough to remain attached during normal use, but detaches quickly and easily for transportation, storage, and design changes. Preferably, multiple styles, designs, and colors of chair seats 5110 may be attached to chair frame 5105 to create a variety of chairs having different aesthetics. Upon reading the teachings of this specification, those of ordinary skill in the art will now understand that, under appropriate circumstances, such as user preference, advances in technology, intended use, etc., other interchangeable designs of chair backs, chair seats, and chair frames, such as various chair seat designs, various chair frame designs, various chair back designs, various materials, various colors, etc., may suffice.

Preferably, chair frame 5105 comprises front legs 5120 and rear legs 5125 (at least embodying herein a plurality of thin leg-bars adapted to vertically support such at least one frame support above the ground), as shown. Upon reading the teachings of this specification, those of ordinary skill in the art will now understand that, under appropriate circumstances, such as user preference, advances in technology, intended use, etc., other chair frame components, such as additional struts, armrests, interlocks, wheels, handles, etc., may suffice.

Figure 54:
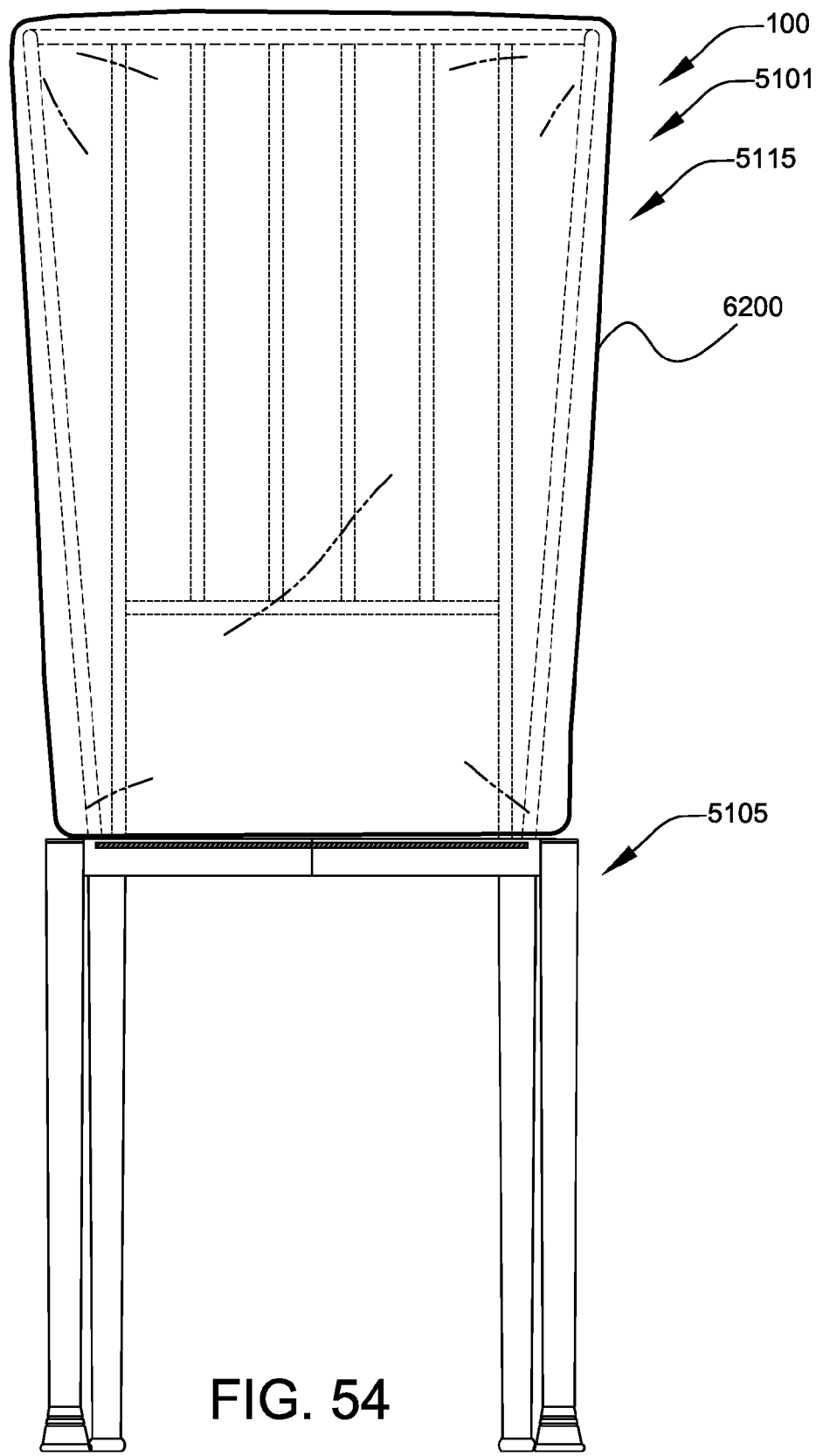
FIG. 54 shows a front view illustrating the modular stackable chair according to the preferred embodiment of FIG. 43 with the chair seat removed and using a chair-back cover.

Preferably, rental customers may choose the style, finish, color, etc., of each component of modular furniture system 100, creating modular stackable furniture meeting the customer's aesthetic requirements from a small and easily-stored rental stock of components. Preferably, furniture renters benefit by maintaining a small and varied stock of components able to meet almost any customer's needs. For example, a renter stocking one hundred pieces each of five chair frame 5105 designs, ten chair seat 5110 designs, and ten chair back cover 6200 designs (as shown in FIG. 54) can offer (not simultaneously) one hundred of each of five hundred different modular stackable chair 5101 designs for rent from a stock of two thousand five hundred pieces. Using ordinary one-piece chairs, offering one hundred chairs in each of five hundred visually distinct designs would require a stock of fifty thousand chairs (or alternatively a stock of five thousand chairs in fifty different designs, plus one thousand chair back slipcovers in ten designs). The cost of purchasing, warehousing, and maintaining two thousand five hundred modular chair pieces is significantly less than the cost of purchasing, warehousing, and maintaining six thousand chairs and slipcovers or fifty thousand chairs.

Preferably, chair frame 5105 comprises at least one strong, rigid material. More preferably, chair frame 5105 comprises at least one metal. Most preferably, chair frame 5105 comprises steel. Upon reading the teachings of this specification, those of ordinary skill in the art will now understand that, under appropriate circumstances, such as user preference, advances in technology, intended use, etc., other materials, such as other metals, plastics, wood, bamboo, composite materials, multiple materials, glass, etc., may suffice.

Preferably, in order to conserve weight and space, chair frame 5105 is constructed with thin tubes, bars, and plates, preferably connected by welds, as shown. Upon reading the teachings of this specification, those of ordinary skill in the art will now understand that, under appropriate circumstances, such as user preference, advances in technology, intended use, materials, etc., other construction methods, such as rugged construction with larger tubes and struts, assembly with nuts and bolts, solid (non-tube) pieces, casting the metal chairs, using molded plastic, using adhesive, etc., may suffice.

Preferably, where chair frame 5105 and chair back 5115 (and/or chair seat 5110) are made of metal the metal is coated for aesthetics and durability, most preferably powder coated. Preferably, the powder coat is of an attractive event-type color, such as gold vein, silver vein, black, white, purple, etc. Preferably, the event furniture renter keeps a stock of several colors and finishes of chair frame 5105 which the customer may choose from. Upon reading the teachings of this specification, those with ordinary skill in the art will now understand that, under appropriate circumstances, considering such issues as advances in technology, user preference, etc., other finishes, such as unfinished metal, paint, enamel, electroplating, etc., may suffice.

Figure 44:
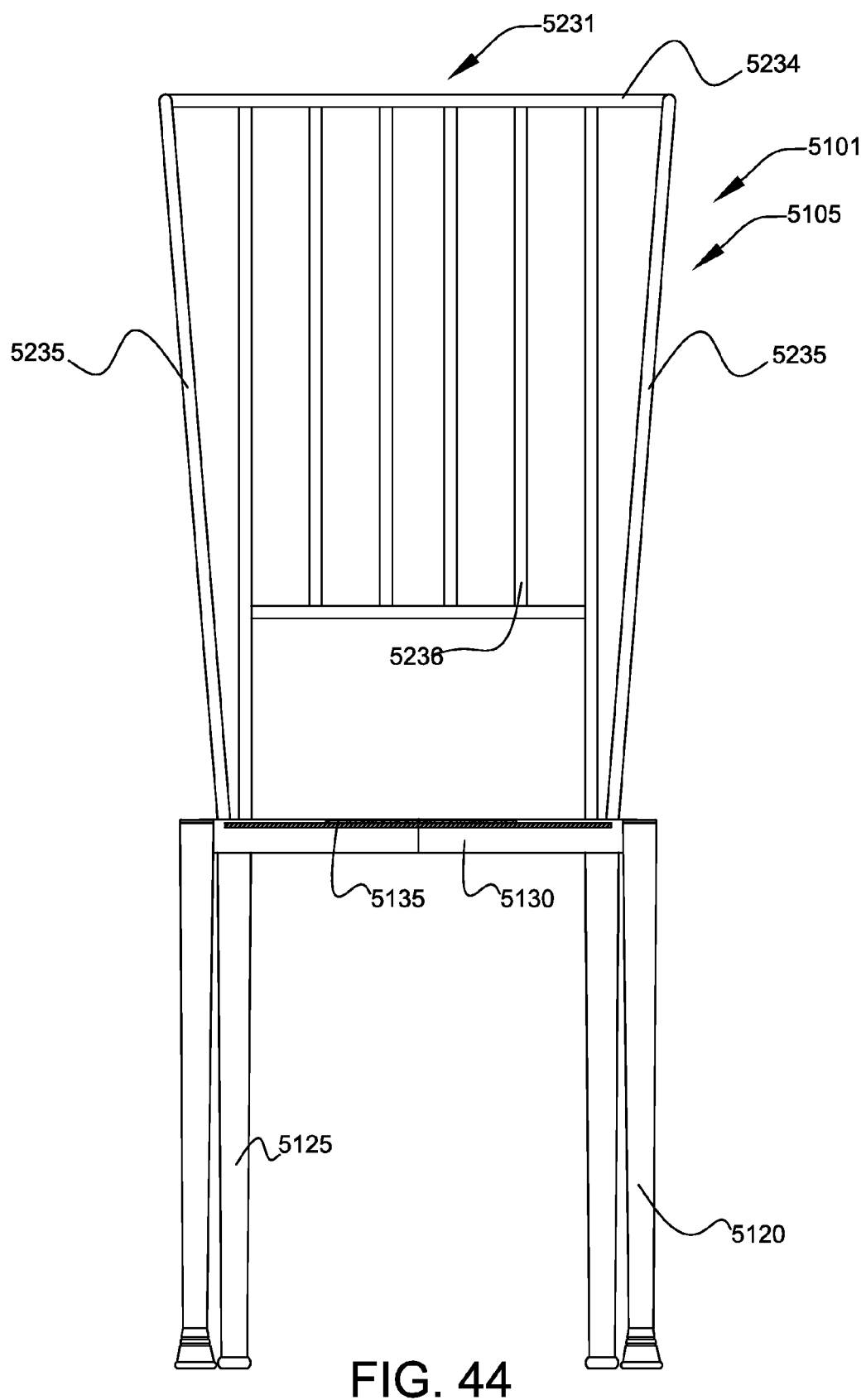
FIG. 44 shows a front view illustrating a chair frame for the modular stackable chair according to the preferred embodiment of FIG. 43.

FIG. 44 shows a front view illustrating chair frame 5105 for modular stackable chair 5101 according to the preferred embodiment of FIG. 43. Preferably, chair back 5115 comprises back frame 5231, preferably comprising top stretcher 5234, frame attachments 5235, and decorative elements 5236, as shown. Back frame 5231 is shown to illustrate one particular decorative embodiment of chair back 5115. Upon reading the teachings of this specification, those with ordinary skill in the art will now understand that, under appropriate circumstances, considering such issues as advances in technology, user preference, etc., other decorative elements, such as solid material, other patterns of struts, ornate metalwork, empty space, wicker work, etc., may suffice.

Figure 45:
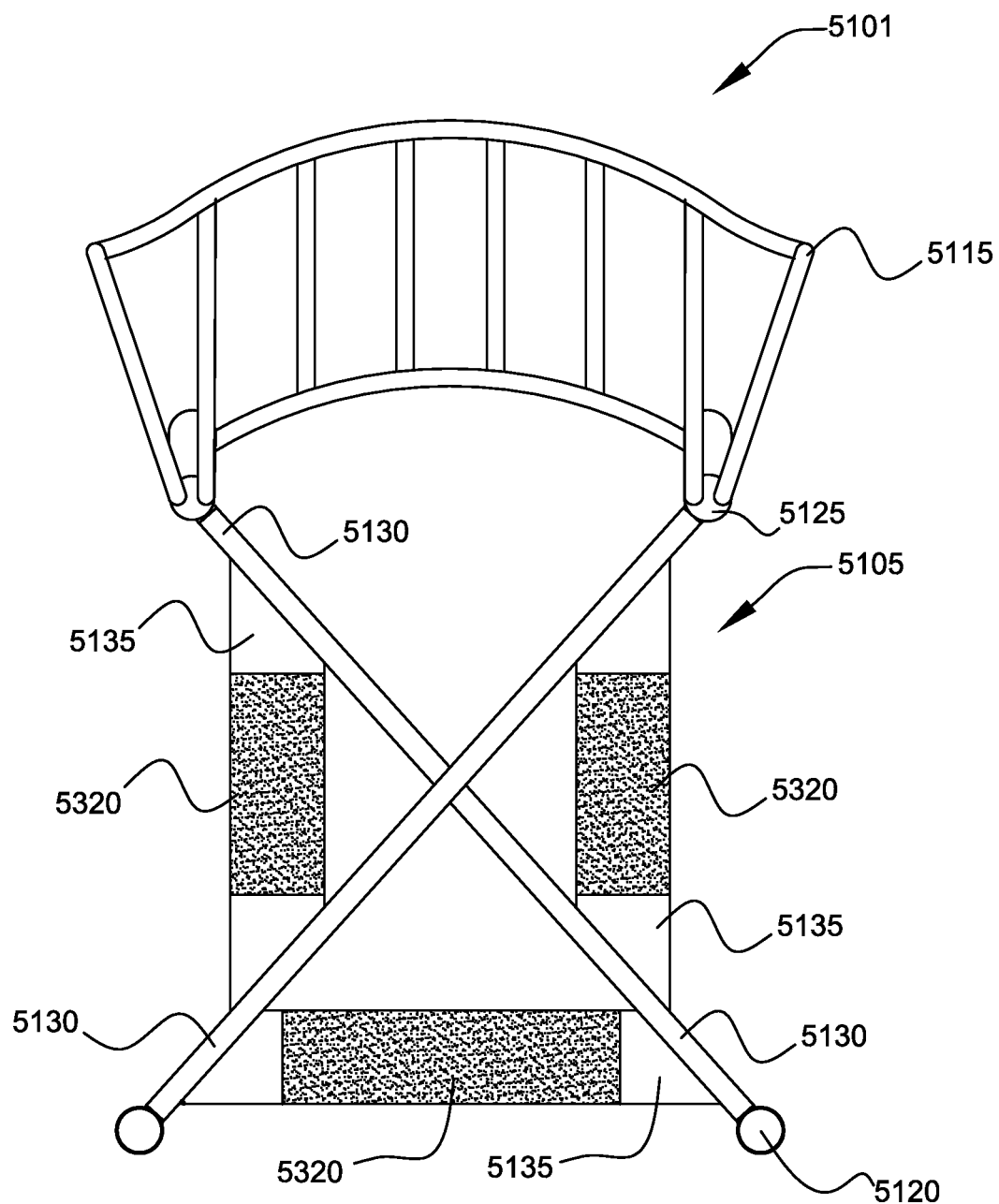
FIG. 45 shows a top view illustrating the modular stackable chair according to the preferred embodiment of FIG. 43.

FIG. 45 shows a top view illustrating modular stackable chair 5101 according to the preferred embodiment of FIG. 43. Preferably, modular stackable chair 5101 comprises seat attachers 5320, as shown, which preferably function as positional stabilizers to provide positional stability of chair seat 5110 on chair frame 5105, as shown in FIG. 43. Preferably, seat attachers 5320 comprise releasable fasteners, as shown. More preferably, seat attachers 5320 comprise releasable pressure-activated fasteners, as shown. Most preferably seat attachers 5320 comprise hook and loop fasteners 5321, as shown. Preferably, one portion of hook and loop fasteners 5321 are attached to the bottom of chair seat 5110 (as shown, especially in FIG. 49C) in a position to engage the other portion of hook and loop fasteners 5321 (which are preferably attached to chair frame 5105) when chair seat 5110 is properly positioned on chair frame 5105, as shown. Preferably, the hook portions of hook and loop fasteners 5321 are sewn and/or adhered to crossbar plates 5135, as shown. Preferably, crossbar plates 5135 also provide significant stiffening to the structure of chair frame 5105. Upon reading the teachings of this specification, those of ordinary skill in the art will now understand that, under appropriate circumstances, such as user preference, advances in technology, intended use, etc., other seat attachment placements, such as on the crossbars, on only one crossbar plate, on the back struts, etc., may suffice.

Figure 46:
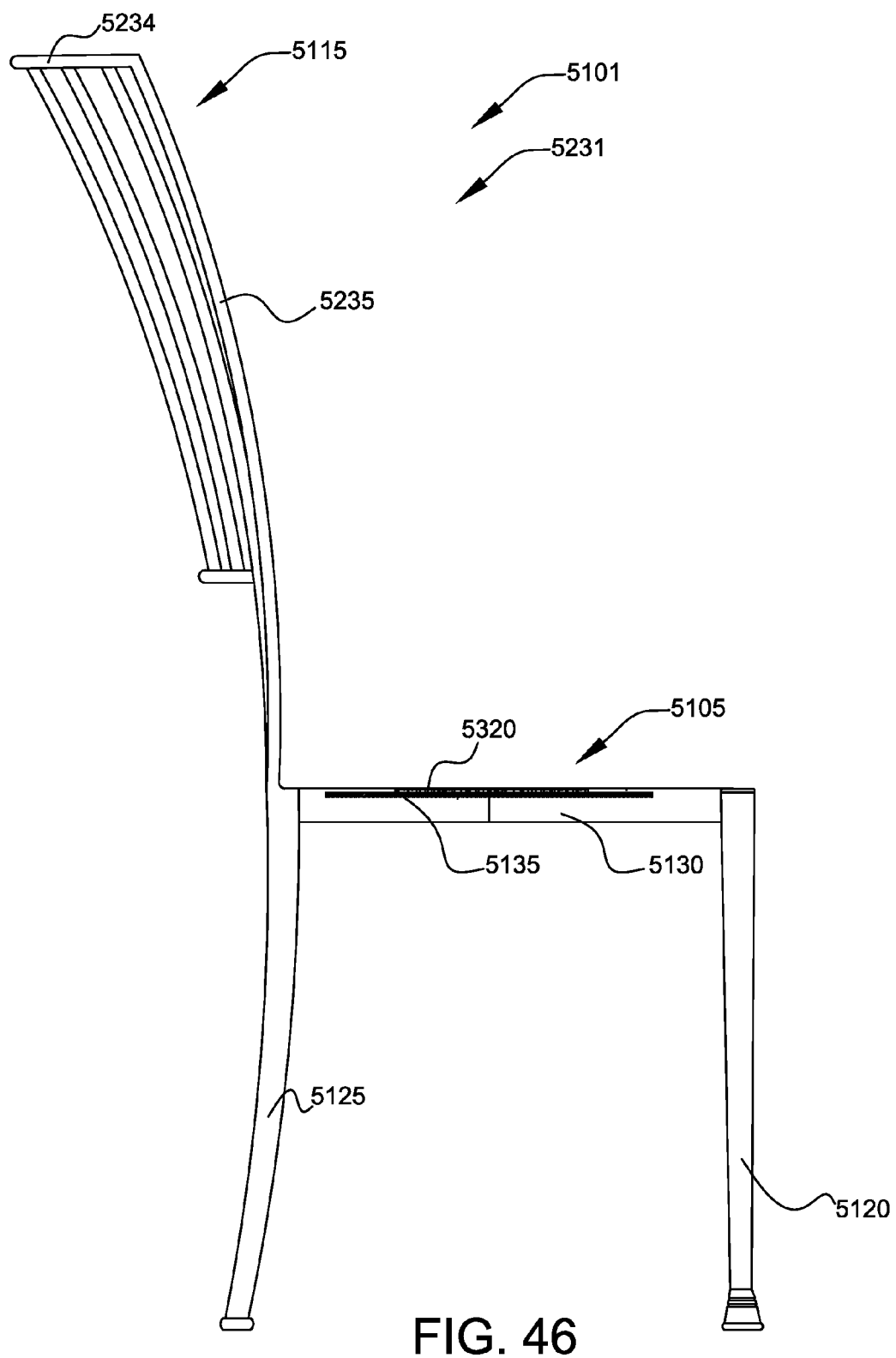
FIG. 46 shows a side view illustrating the modular stackable chair according to the preferred embodiment of FIG. 43.

FIG. 46 shows a side view illustrating modular stackable chair 5101 according to the preferred embodiment of FIG. 43. Preferably, chair frame 5105 is stackable. Preferably, front legs 5120 are substantially straight (not curved), as shown. Preferably, front legs 5120 are tapered to be narrower at the bottom ends, as shown.

Preferably, in order to meet the aesthetic demands of the ballroom chair use and/or rental trade, chair frame 5105 has an elegant gently curved shape through chair back 5115 and rear legs 5125, as shown. Preferably, chair frame 5105 is constructed using round steel tubes for front legs 5120 and rear legs 5125. Preferably, chair frame 5105 is constructed using substantially rectangular steel tubes, bars, and/or plates for chair back 5115, crossbars 5130, and crossbar plates 5135, as shown. Upon reading the teachings of this specification, those of ordinary skill in the art will now understand that, under appropriate circumstances, such as user preference, advances in technology, intended use, etc., other shapes and designs, such as other shapes of tubes and bars, baroque, art deco, angular, a rounded chair back, a straight chair back, straight rear legs, having arm rests, etc., may suffice.

FIG. 47A shows a top plan view, partially in section, illustrating chair seat 5110 according to a preferred embodiment of the present invention. Preferably, chair seat 5110 is an upholstered chair seat at least comprising top layer 5512, padding layer 5513, and base 5514, as shown. Preferably, top layer 5512 comprises an attractive and durable surface such as, for example, fabric, leather, vinyl, etc. Preferably, padding layer 5513 comprises at least one comfortable, durable padding material. Preferably, padding layer 5513 comprises at least one of fiberfill, foam (polyurethane foam, memory foam, etc.), down, and/or cotton, etc. Preferably, base 5514 comprises at least one durable, strong, rigid material. Preferably, base 5514 comprises at least one of metal, wood, particleboard, plastic, and/or composite, etc. Preferably, chair seat 5110 is of any size and shape that is attachable to chair frame 5105, such as, for example, rounded square (as shown), rectangular, round, oval, tetrahedron, novelty, etc. Upon reading the teachings of this specification, those of ordinary skill in the art will now understand that, under appropriate circumstances, such as user preference, advances in technology, intended use, aesthetic preference, etc., other materials, layers, and designs, such as only a base layer, additional layers, body contour shapes, other materials, etc., may suffice.

FIG. 47B shows a bottom plan view illustrating chair seat 5110 according to the preferred embodiment of FIG. 47A. Preferably, one portion of hook and loop fasteners 5321 are attached to bottom 5112 of chair seat 5110 in a position to engage the other portion of hook and loop fasteners 5321 (which are preferably attached to chair frame 5105) when chair seat 5110 is properly positioned on chair frame 5105, as shown in FIG. 48. Preferably, the loop portions of hook and loop fasteners 5321 are attached (preferably sewn and/or adhered) to bottom 5112 of chair seat 5110, as shown. Upon reading the teachings of this specification, those of ordinary skill in the art will now understand that, under appropriate circumstances, such as user preference, advances in technology, intended use, etc., other seat attachers, such as hooks, latches, snaps, straps, magnets, releasable adhesive, a single seat attacher, multiple types of seat attachers, etc., may suffice.

FIG. 47C shows a front plan view illustrating chair seat 5110 according to the preferred embodiment of FIG. 47A. Preferably, chair seat 5110 has comfortable rounded edges 5550, as shown. Upon reading the teachings of this specification, those of ordinary skill in the art will now understand that, under appropriate circumstances, such as user preference, advances in technology, intended use, etc., other chair seat shapes, such as flat, edges extending below the bottom of the seat, curved edges, scalloped edges, etc., may suffice.

FIG. 48 shows a bottom plan view illustrating chair seat 5110 (according to the preferred embodiment of FIG. 47A) attached to modular stackable chair frame 5105 according to a preferred embodiment of the present invention. Preferably, chair frame 5105 comprises front legs 5120, back legs 5125, crossbars 5130, and crossbar plates 5135, as shown. Preferably, each crossbar 5130 connects one front leg 5120 and one back leg 5125 together, as shown. Preferably, crossbars 5130 cross, and are joined together by at least one hub portion, approximately in the middle of crossbars 5130, as shown. Preferably, crossbar plates 5135 comprise strong, thin strips of material that connect crossbars 5130 to each other, as shown. Preferably, crossbar plates 5135 comprise metal. Preferably, crossbar plates 5135 support seat attachers 5320, as shown. Preferably, crossbar plates 5135 are placed slightly below the top of crossbars 5130, as shown, in order to accommodate the thickness of seat attachers 5320 when seat 5110 is placed upon crossbars 5130, as shown in FIG. 43. Upon reading the teachings of this specification, those of ordinary skill in the art will now understand that, under appropriate circumstances, such as user preference, advances in technology, intended use, etc., other chair frame components, such as no crossbar plates, additional crossbar plates, other shapes of crossbar plates, thick crossbar plates, curved crossbars, etc., may suffice.

Preferably, chair seat 5110 is installed on chair frame 5105 by placing bottom 5112 of chair seat 5110 against crossbar plates 5135, as shown, so that seat attachers 5320 (at least embodying herein at least one releasable attacher adapted to releasably attach such at least one modular chair seat to such at least one chair frame) are pressed together and attach to each other. Preferably, using preferred hook-and-loop-type fasteners 5321, chair seat 5110 is removed from chair frame 5105 by lifting up on chair seat 5110 with sufficient force to release seat attachers 5320 (at least embodying herein wherein such at least one releasable attacher comprises at least one hook and loop fastener). Then, chair frames 5105 may be nesting-stacked and chair seats 5110 may be stacked separately or otherwise stored.

Figure 59:
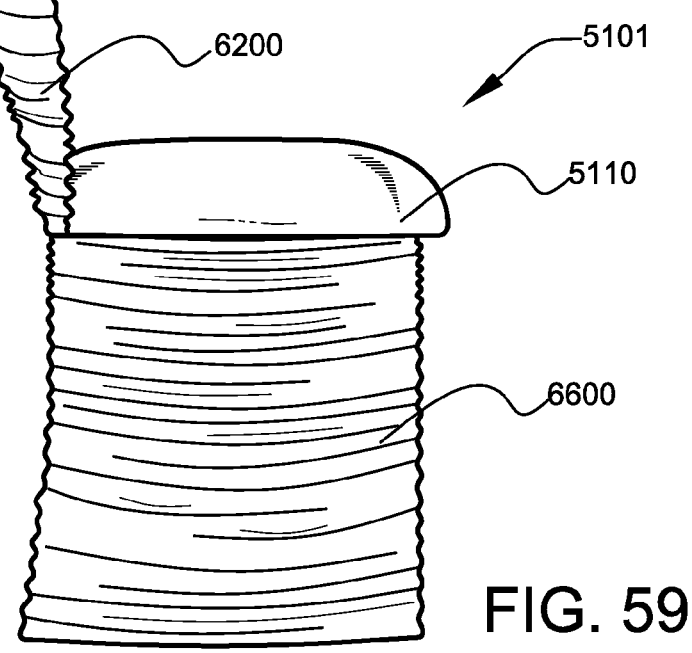
FIG. 59 shows a side view illustrating the modular stackable chair according to the preferred embodiment of FIG. 58 using a chair-back cover and using a chair-leg cover with the chair seat installed.

Preferably, crossbars 5130 and/or the tops of front legs 5120 create at least one horizontal plane of support 5600 (at least embodying herein at least one frame support adapted to support such at least one modular chair seat) for chair seat 5110, as shown. Preferably, chair seat 5110 at least covers crossbars 5130, crossbar plates 5135, and the tops of front legs 5120 in use, as shown. Preferably, rear legs 5125 connect to chair back 5115. Preferably, the rear edge of chair seat 5110 abuts chair back 5115 (at least embodying herein wherein such at least one chair frame comprises at least one back support adapted to support the back of at least one seated user), as shown in FIG. 59. Upon reading the teachings of this specification, those of ordinary skill in the art will now understand that, under appropriate circumstances, such as user preference, advances in technology, intended use, etc., other chair seat support contours, such as recessed, curved, etc., may suffice, as long as the chair seat is properly supported in use.

Figure 49:
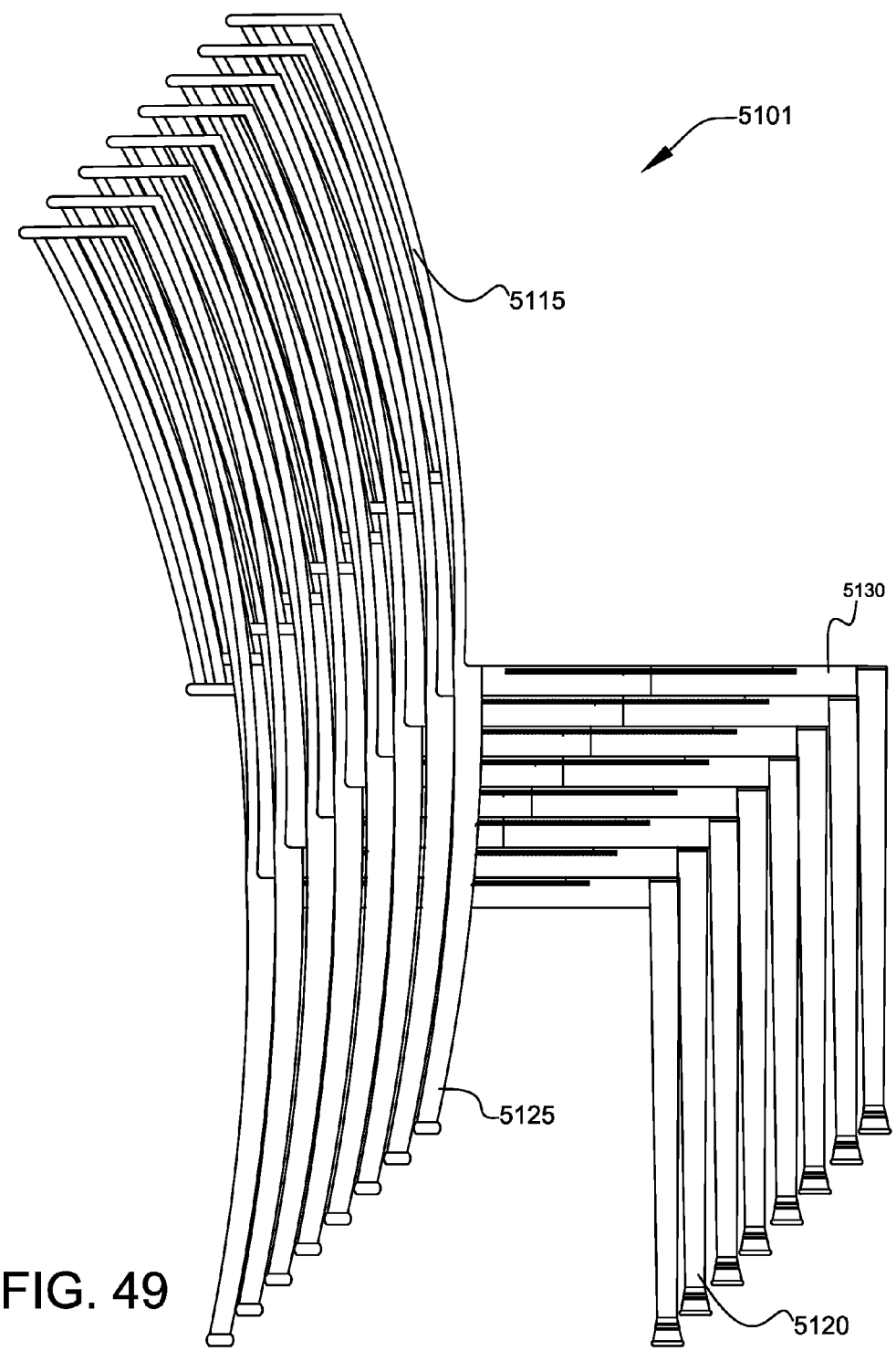
FIG. 49 shows a side view illustrating one stack of modular stackable chairs according to the preferred embodiment of FIG. 43.

FIG. 49 shows a side view illustrating one stack of modular stackable chairs 5101 according to the preferred embodiment of FIG. 43. Preferably, chair frames 5105 are nesting-stacked by placing the front legs 5120 and back legs 5125 of an upper chair frame 5105 in front of the front legs 5120 and back legs 5125 of a lower chair frame 5105 and resting the crossbars 5130 of the upper chair frame 5105 on top of the crossbars 5130 of the lower chair frame 5105, in a repeating fashion, as shown. Preferably, the open structure created by the X configuration of crossbars 5130 (at least embodying herein wherein such at least one frame support comprises at least one horizontal-plane aperture adapted to receive such at least one plurality of thin leg-bars of at least one other substantially identical chair frame during stacking of multiple units of such chair frames) provides apertures for front legs 5120 and back legs 5125 of nested chair frames 5105 (at least embodying herein wherein such at least one chair frame is adapted to allow nesting-stacking), as shown. Upon reading the teachings of this specification, those of ordinary skill in the art will now understand that, under appropriate circumstances, such as user preference, advances in technology, intended use, etc., other nesting-stackable chair frames may suffice.

As seen in FIG. 48, when chair seat 5110 is attached to chair frame 5105, chair seat 5110 preferably occludes at least the openings for back legs 5125 of nested chair frames 5105. By occluding these openings, chair seat 5110 preferably prevents stacking of nested chair frames 5105 while attached to chair frame 5105.

Figure 50:
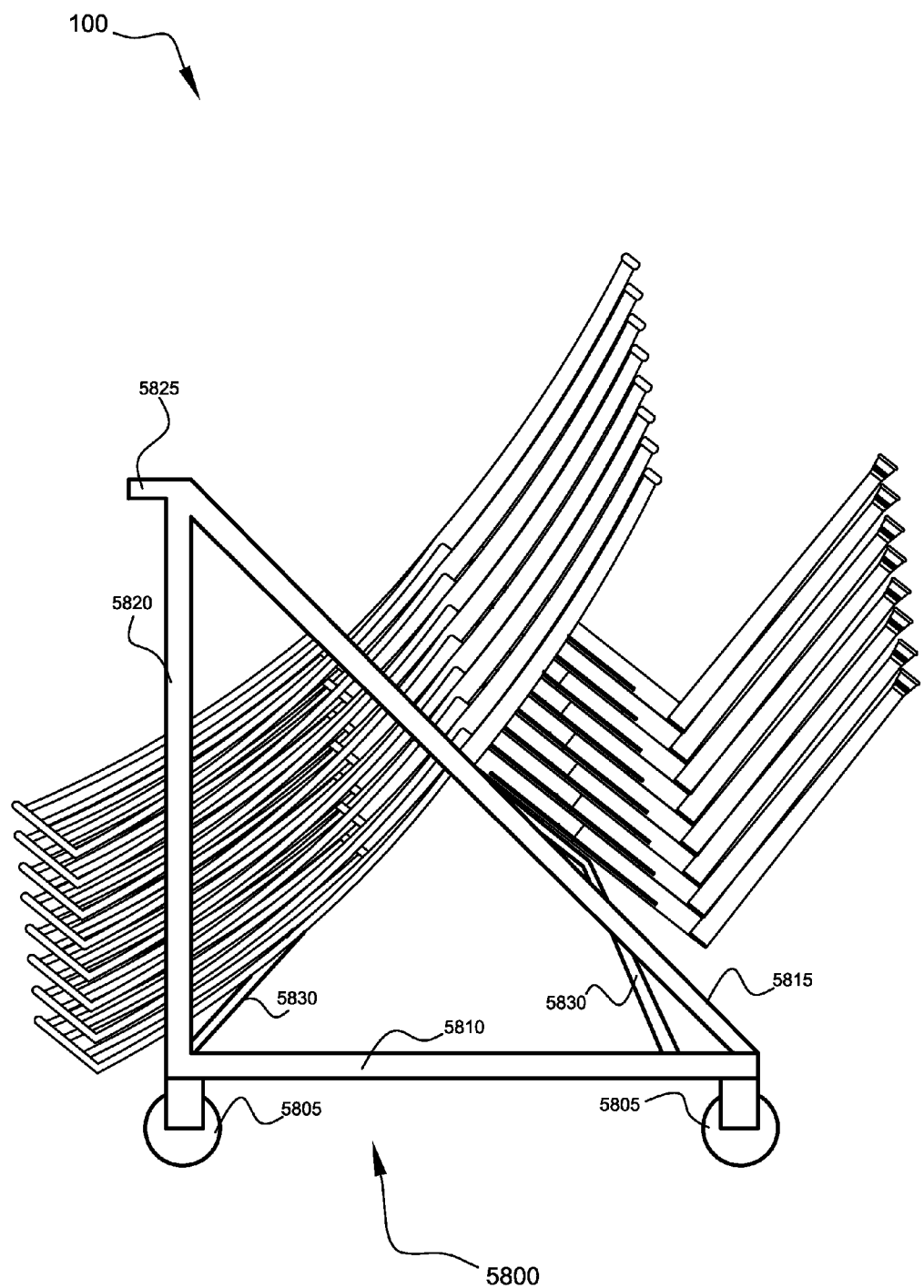
FIG. 50 shows a side view illustrating stacked chair frames on a dolly according to the preferred embodiment of FIG. 43.

FIG. 50 shows a side plan view illustrating stacked chair frames 5105 on dolly 5800 according to a preferred embodiment of the present invention. Preferably, modular furniture system 100 comprises dolly 5800, as shown. Preferably, dolly 5800 is adapted to transport many chair frames 5105 in at least one nesting-stacked configuration, as shown. Preferably, dolly 5800 comprises wheels 5805, platform 5810, side rail 5815, back rail 5820, handle 5825, and chair support structure 5830, as shown. Preferably, chair support structure 5830 is shaped and angled to permit chair frames 5105 to be inverted and stacked approximately vertically, as shown. Preferably, chair support structure 5830 is raised above platform 5810 to accommodate the length of chair backs 5115, as shown. Preferably, for commercial purposes, up to about forty chair frames 5105 may be stacked on dolly 5800 in the manner shown. Upon reading the teachings of this specification, those of ordinary skill in the art will now understand that, under appropriate circumstances, such as user preference, advances in technology, intended use, etc., other dolly arrangements, such as no platform, addition of brakes, adjustable angle of the chair support structure, etc., may suffice.

The height of any nested stack of chair frames 5105 is primarily a function of the thickness of crossbars 5130, chair back 5115, front legs 5120, and back legs 5125, as shown. The angle of rise of any nested stack of forty chair frames 5105 is also primarily a function of the thickness of crossbars 5130, chair back 5115, front legs 5120, and back legs 5125, as shown. Therefore, the angle of chair support structure 5830 must be set to support any nested stack of chair frames 5105 having certain dimensions in an approximately vertical position; i.e., when chair frames 5105 are redesigned with different dimensions, the chair support structure 5830 will also be changed. In the present example, the angle of chair support structure 5830 is approximately 32 degrees from vertical, as shown. Upon reading the teachings of this specification, those of ordinary skill in the art will now understand that, under appropriate circumstances, such as user preference, advances in technology, intended use, etc., other arrangements, such as adjustable angle chair support structures, etc., may suffice.

Figure 51:
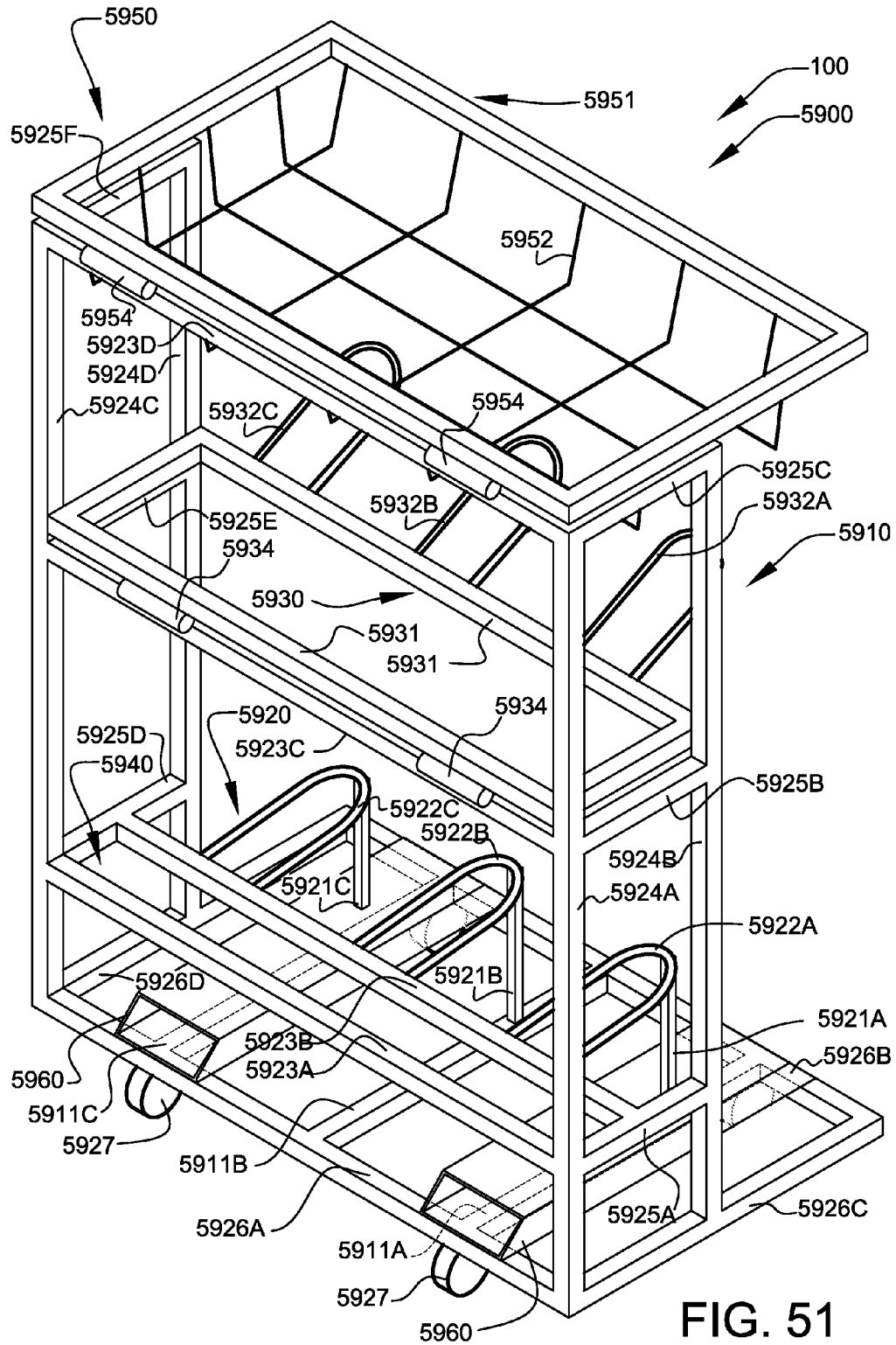
FIG. 51 shows a perspective view illustrating another dolly according to the preferred embodiment of the present invention.

FIG. 51 shows a perspective view illustrating dolly 5900 according to a preferred embodiment of the present invention. Preferably, modular furniture system 100 comprises dolly 5900, as shown. Preferably, dolly 5900 is adapted to carry modular stackable chairs 5101, as shown. Preferably, dolly 5900 is adapted to carry at least about twenty-four modular stackable chairs 5101, as shown in FIG. 10. Preferably, dolly 5900 (at least embodying herein at least one transporter adapted to transport such plurality of such at least one chair frames in at least one nested-stacked configuration) is adapted to carry at least about thirty-six modular stackable chairs 5101, as shown in FIG. 10. Preferably, dolly 5900 comprises frame 5910, lower chair holder 5920, upper chair holder 5930, lower seat holder 5940, and upper seat holder 5950, as shown.

Preferably, frame 5910 comprises: lower struts 5911A, 5911B, and 5911C; horizontal struts 5923A, 5923B, 5923C, and 5923D; vertical struts 5924A, 5924B, 5924C, and 5924D; side struts 5925A, 5925B, 5925C, 5925D, 5925E, and 5925F; lower struts 5926A, 5926B, 5926C, and 5926D; and wheels 5927 (at least embodying herein wherein such at least one transporter comprises at least three wheels), as shown.

Preferably, lower chair holder 5920 comprises stack support 5922A, stack support 5922B, and stack support 5922C, as shown. Preferably, lower chair holder 5920 is supported by stack support struts 5921A, 5921B, and 5921C, and by horizontal strut 5923B, as shown.

Preferably, upper chair holder 5930 comprises frame 5931, stack support 5932A, stack support 5932B, stack support 5932C, and hinges 5934, as shown. Preferably, hinges 5934 connect frame 5931 to horizontal strut 5923C, as shown. Preferably, hinges 5934 permit upper chair holder 5930 to be moved out of the way while lower chair holder 5920 is being loaded. Preferably, stack supports 5932A, 5932B, and 5932C are connected to frame 5931 substantially above lower chair holder 5920, as shown.

Preferably, lower seat holder 5940 comprises horizontal struts 5923A and 5923B, lower struts 5911A, 5911B, and 5911C, and side struts 5925A and 5925D, as shown.

Preferably, upper seat holder 5950 comprises frame 5951, basket 5952, and hinges 5954, as shown. Preferably, hinges 5954 connect frame 5951 to horizontal strut 5923D, as shown. Preferably, basket 5952 is connected to frame 5951 substantially above upper chair holder 5930, as shown. Preferably, hinges 5954 permit upper seat holder 5950 to be moved out of the way while upper chair holder 5930 is being loaded. Preferably, dolly 5900 is loaded from the bottom up.

Preferably, dolly 5900 comprises forklift guides 5960, as shown. Preferably, forklift guides 5950 permit dolly 5900 to be lifted and transported by a forklift. Preferably, forklift tubes 5960 comprise metal tubes, preferably rectangular steel tubes. Preferably, forklift guides 5960 (at least embodying herein wherein such at least one transporter comprises at least one forklift guide) are welded to frame 5910, as shown. Upon reading the teachings of this specification, those with ordinary skill in the art will now understand that, under appropriate circumstances, considering such issues as advances in technology, user preference, materials strength, intended use, etc., other forklift adaptations, such as brackets instead of tubes, other forklift guide placement, etc., may suffice.

Preferably, dolly 5900 is substantially constructed of metal. Most preferably, dolly 5900 is substantially constructed of welded steel tubing, as shown. Upon reading the teachings of this specification, those with ordinary skill in the art will now understand that, under appropriate circumstances, considering such issues as advances in technology, user preference, intended use, intended number of chairs to carry, etc., other arrangements, such as other struts configurations, other numbers of upper seat holders, other numbers of lower seat holders, other numbers of upper chair holders, other numbers of lower chair holders, one or more levels of chair holders, one or more levels of seat holders, other materials, exterior walls and/or doors, dust covers, handles, other numbers of wheels, etc., may suffice.

Figures 52, 53:
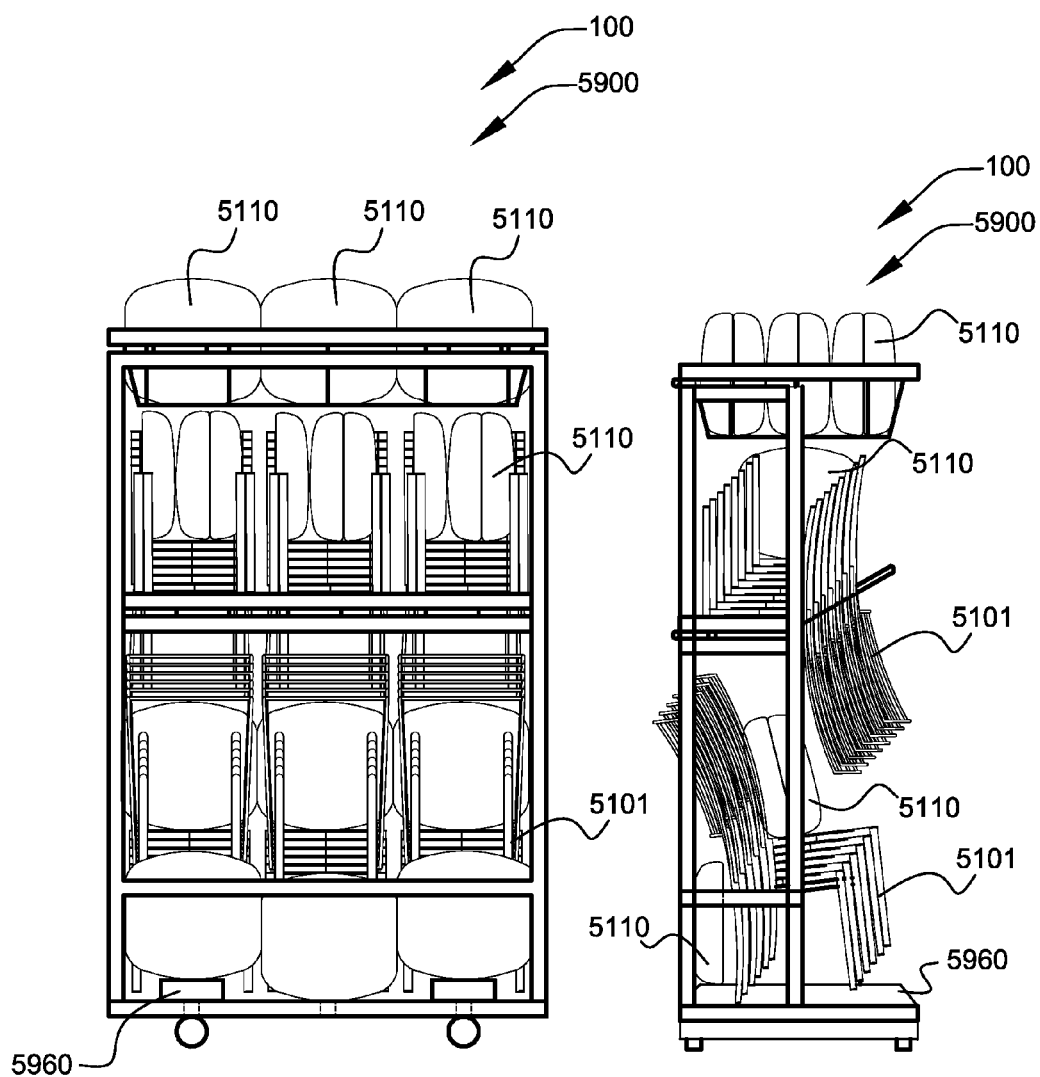
FIG. 52 shows a front view illustrating the dolly according to the preferred embodiment of FIG. 51 loaded with stacks of modular stackable chairs with the chair seats removed.
FIG. 53 shows a side view illustrating the dolly according to the preferred embodiment of FIG. 51 loaded with stacks of modular stackable chairs with the chair seats removed.

FIG. 52 shows a front view illustrating dolly 5900 according to the preferred embodiment of FIG. 51 loaded with stacks of modular stackable chairs 5101 with chair seats 5110 removed.

Preferably, six stacks of six modular stackable chairs 5101 are storable and/or transportable on dolly 5900, for a total of thirty-six modular stackable chairs 5101 per dolly 5900 (at least embodying herein wherein such at least one transporter is adapted to transport at least about twenty-four nesting-stacked chair frames and at least about twenty-four modular chair seats simultaneously; and at least embodying herein wherein such at least one transporter is adapted to transport at least about thirty-six nesting-stacked chair frames and at least about thirty-six modular chair seats simultaneously), as shown. Preferably, each of stack supports 5932A, 5932B, and 5932C, and each of stack supports 5922A, 5922B, and 5922C (at least embodying herein at least one chair frame holder adapted to hold at least two of such at least one chair frames which are nesting-stacked together), each hold six stacked chair frames 5105, for a total of thirty-six chair frames 5105 per dolly 5900, as shown. Preferably, lower seat holder 5940 holds at least three chair seats 5110, upper seat holder 5950 (at least embodying herein at least one modular chair seat holder adapted to hold at least two of such at least one modular chair seats) holds at least eighteen chair seats 5110, at least six chair seats 5110 are stored on the first stacks of modular stackable chairs 5101 on lower chair holder 5920, and at least nine chair seats 5110 are stored on the second stacks of modular stackable chairs 5101 on upper chair holder 5930, for a total of thirty-six chair seats 5110 per dolly 5900, as shown. Preferably, dolly 5900 fits through a standard thirty-six inch wide by eighty inch tall doorway when fully loaded. Upon reading the teachings of this specification, those with ordinary skill in the art will now understand that, under appropriate circumstances, considering such issues as advances in technology, user preference, etc., other arrangements, such as other seat placements, other numbers of seats and chairs, additional seat holders, a taller dolly that holds more chair frames per stack, etc., may suffice.

FIG. 53 shows a side view illustrating dolly 5900 according to the preferred embodiment of FIG. 52 loaded with stacks of modular stackable chairs 5101 with chair seats 5110 removed.

FIG. 54 shows a front view illustrating modular stackable chair 5101 with chair seat 5110 removed, according to FIG. 53, using chair-back cover 6200. Preferably, modular furniture system 100 comprises chair-back cover 6200, as shown. Preferably, chair-back cover 6200 is adapted to cover chair back 5115, as shown, preferably providing both user comfort and an attractive appearance. Preferably, chair-back cover 6200 (at least embodying herein wherein such at least one back-support cover comprises at least one fabric) comprises fabric, as shown. Preferably, chair-back cover 6200 (at least embodying herein at least one back-support cover adapted to substantially cover such at least one back support) is selected to either match or attractively contrast with the selected chair seat 5110 (at least embodying herein at least one modular chair seat adapted to be removed from and placed on such at least one chair frame) and/or chair frame 5105 (at least embodying herein at least one chair frame adapted to frame at least one chair). Upon reading the teachings of this specification, those with ordinary skill in the art will now understand that, under appropriate circumstances, considering such issues as advances in technology, user preference, etc., other chair-back cover arrangements, such as other materials, padding, stiffeners, liners, indicia, shape-altering inserts, etc., may suffice.

Figure 55:
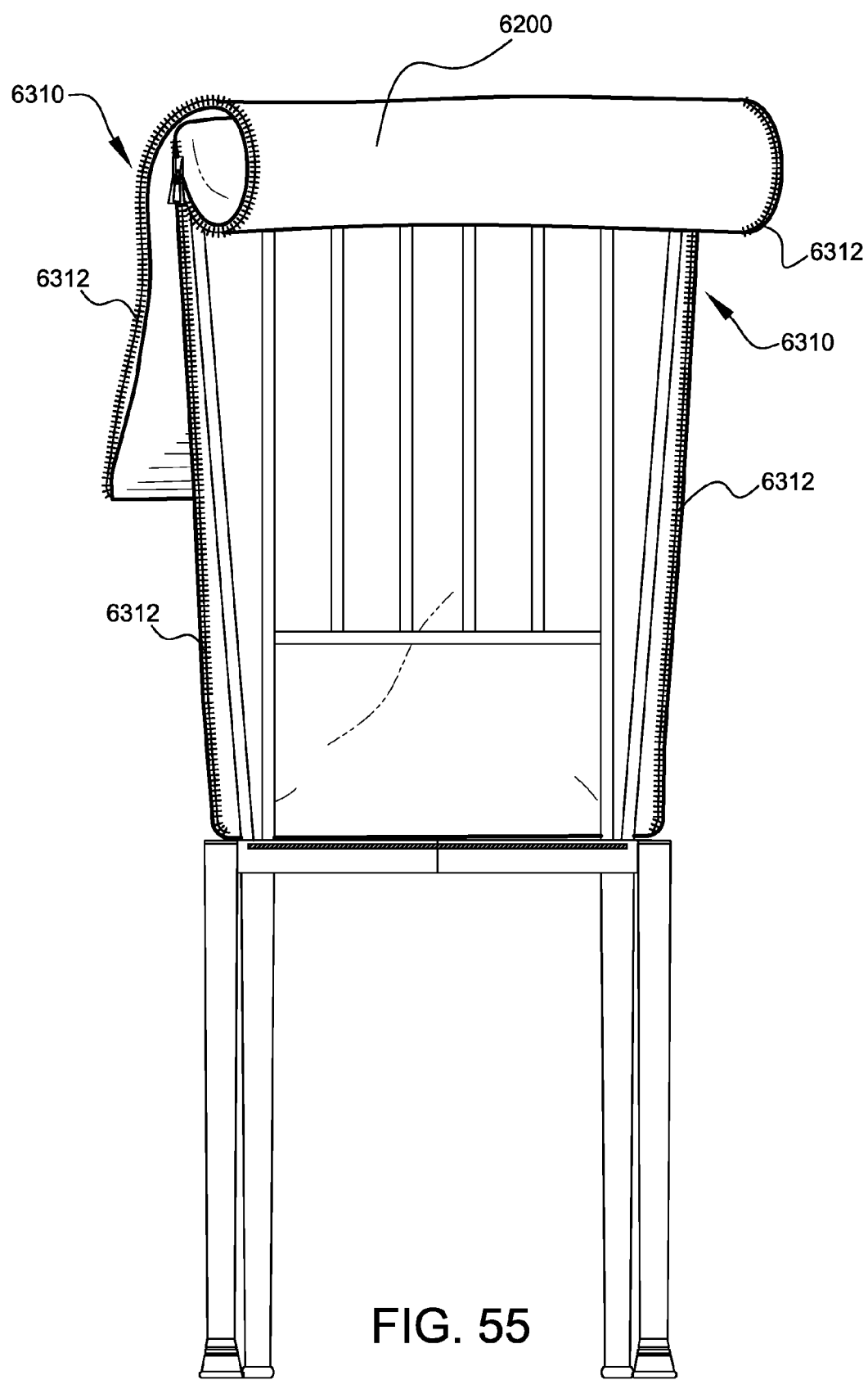
FIG. 55 shows a front view illustrating the modular stackable chair according to the preferred embodiment of FIG. 43 with the chair seat removed, using the chair-back cover, and showing the chair-back cover unzipped.

FIG. 55 shows a front view illustrating modular stackable chair 5101 with chair seat 5110 removed, according to the preferred embodiment of FIG. 54, using chair-back cover 6200 and showing chair-back cover 6200 unzipped. Preferably, especially where seat back 5115 is wider at the top that at the bottom, cover 6200 opens and closes with attacher 6310, as shown. Preferably, attacher 6310 comprises one or more zippers 6312, as shown. Upon reading the teachings of this specification, those with ordinary skill in the art will now understand that, under appropriate circumstances, considering such issues as advances in technology, user preference, design requirements, etc., other attachers, such as snaps, hook and loop fasteners, hooks and eyes, elastic portions of the chair-back cover, not using any attachers where the chair-back cover can slip on to the chair back, applying an attacher to the bottom opening of the chair-back cover, etc., may suffice.

Figure 56:
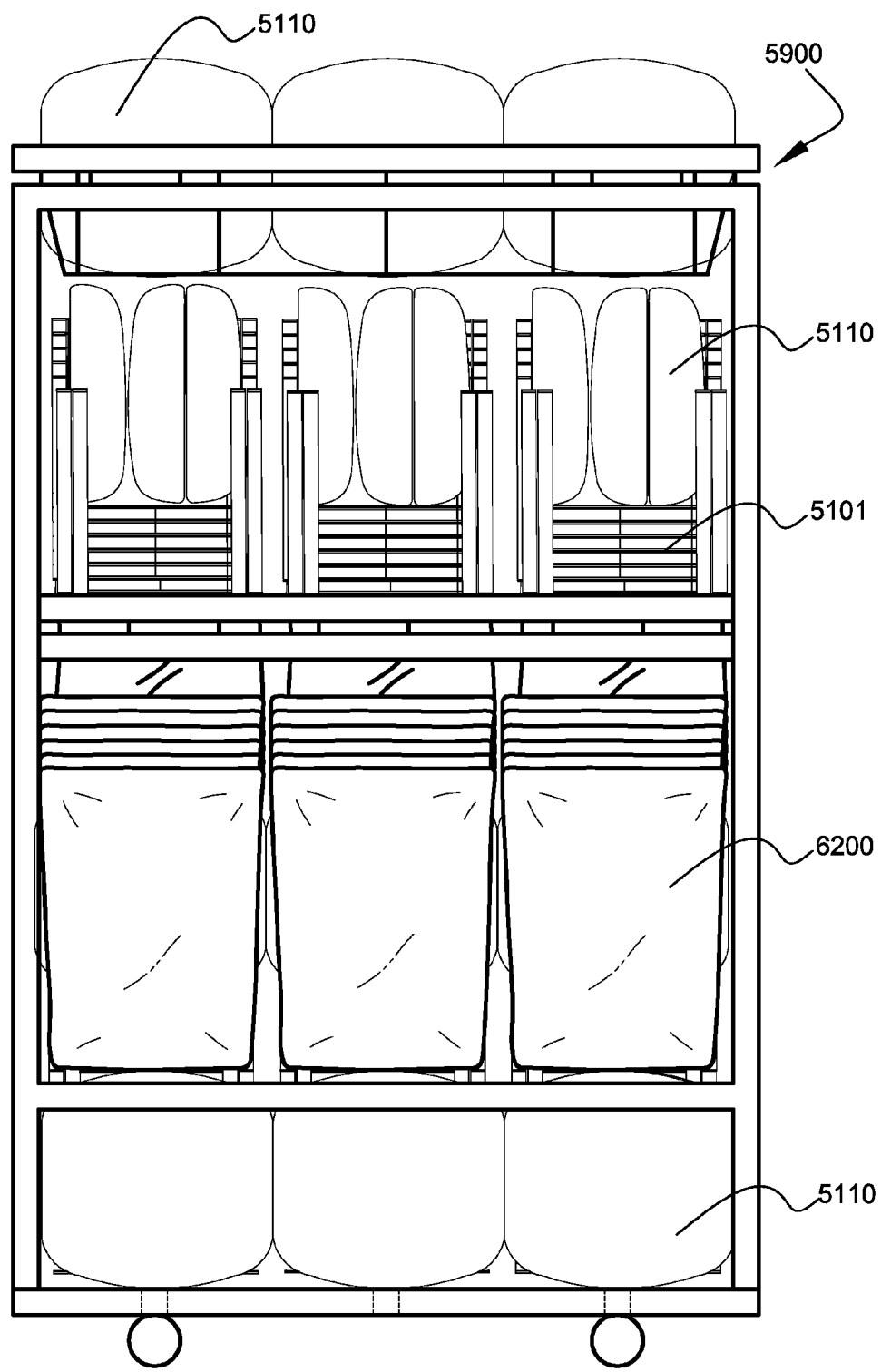
FIG. 56 shows a front view illustrating the dolly according to the preferred embodiment of FIG. 51 loaded with modular stackable chairs, using seat-back covers, and associated chair seats.

FIG. 56 shows a front view illustrating dolly 5900 according to the preferred embodiment of FIG. 51 loaded with modular stackable chairs 5101 (using seat-back covers 6200) and associated chair seats 5110. Preferably, seat-back covers 6200 do not interfere with stacking modular stackable chairs 5101, as shown.

Figure 57:
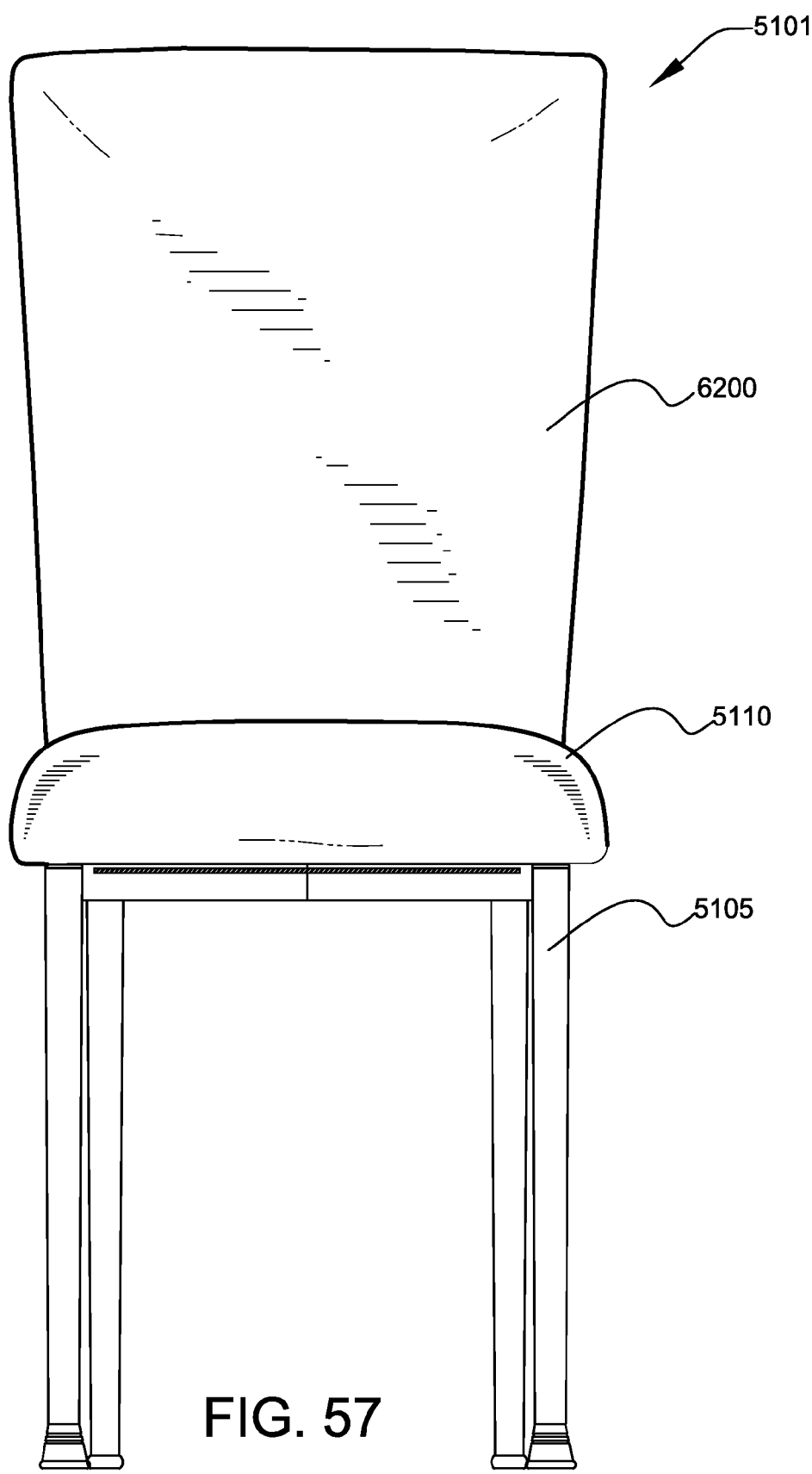
FIG. 57 shows a front view illustrating the modular stackable chair according to the preferred embodiment of FIG. 43 using the chair-back cover and with the chair seat installed.

FIG. 57 shows a front view illustrating modular stackable chair 5101 according to the preferred embodiment of FIG. 43 using chair-back cover 6200 and with chair seat 5110 installed. Preferably, chair-back cover 6200 is selected to either match or attractively contrast with the selected chair seat 5110 and/or chair frame 5105.

Figure 58:
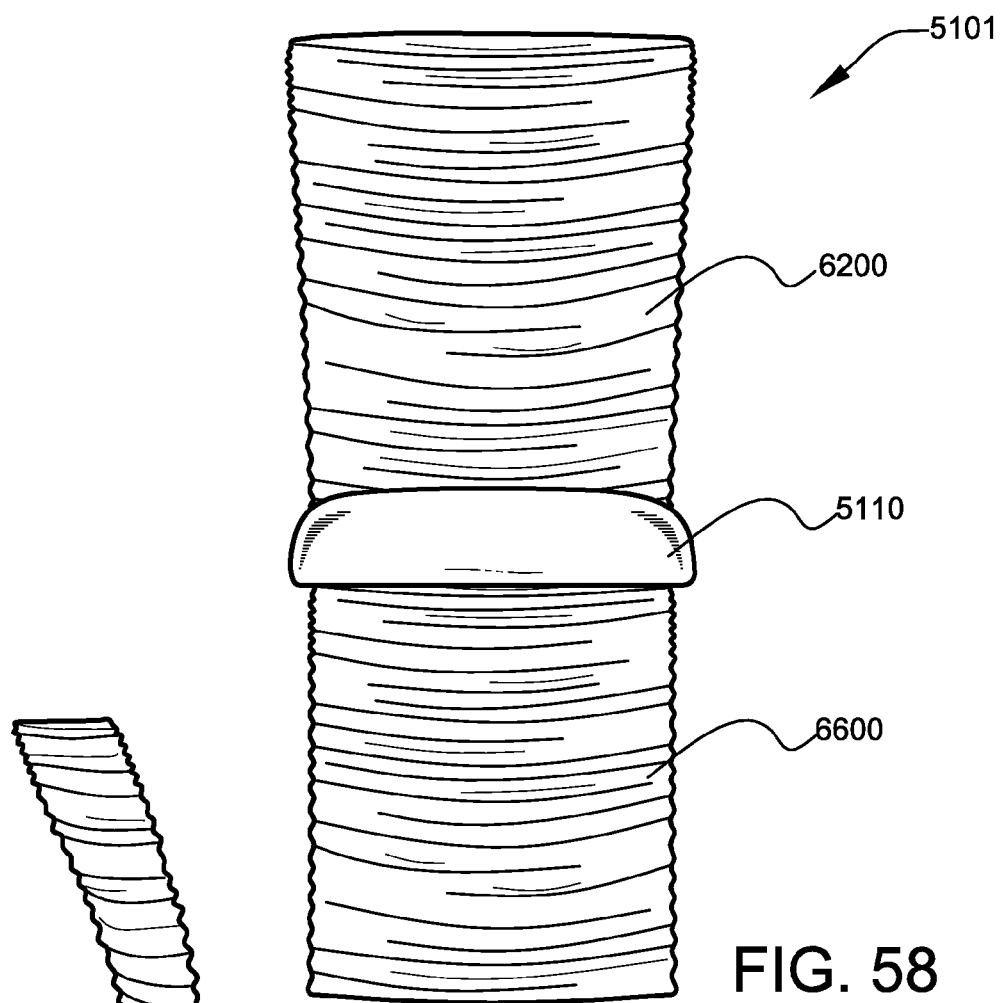
FIG. 58 shows a front view illustrating the modular stackable chair according to the preferred embodiment of FIG. 43 using a chair-back cover and a chair-leg cover with the chair seat installed.

FIG. 58 shows a front view illustrating modular stackable chair 5101 according to the preferred embodiment of FIG. 43 using chair-back cover 6200 and chair-leg cover 6600 with chair seat 5110 installed. Preferably, modular furniture system 100 comprises chair-leg cover 6600, as shown. Preferably, chair-leg cover 6600 is adapted to cover front legs 5120 and back legs 5125, as shown, preferably providing an attractive appearance. Preferably, chair-leg cover 6600 comprises fabric, as shown. Preferably, chair-leg cover 6600 attaches adjacent at least the top ends and the bottom ends of front legs 5120 and back legs 5125. Preferably, chair-leg cover 6600 is selected to either match or attractively contrast with the selected chair-back cover 6200, chair seat 5110, and/or chair frame 5105. In the present preferred embodiment, chair-leg cover 6600 and chair-back cover 6200 are made to have an attractive draped and wrinkled appearance, as shown. Preferably, chair-leg cover 6600 does not cover chair seat 5110 (at least embodying herein at least one chair-leg cover adapted to cover at least one of such plurality of thin leg-bars and to not cover such at least one modular chair seat; and at least embodying herein wherein such at least one chair-leg cover is adapted to cover exactly four of such plurality of thin leg-bars and to not cover such at least one modular chair seat), as shown. Preferably, chair-leg cover 6600 does not substantially cover chair back 5115, as shown. Upon reading the teachings of this specification, those with ordinary skill in the art will now understand that, under appropriate circumstances, considering such issues as advances in technology, user preference, etc., other chair-leg cover arrangements, such as other materials, padding, stiffeners, liners, indicia, only covering two chair legs, only covering a portion of the length of the legs, a non-draped appearance, a unitary back and legs cover, etc., may suffice.

FIG. 59 shows a side view illustrating modular stackable chair 5101 according to the preferred embodiment of FIG. 58 using chair-back cover 6200 and chair-leg cover 6600 with chair seat 5110 installed.

Figure 60:
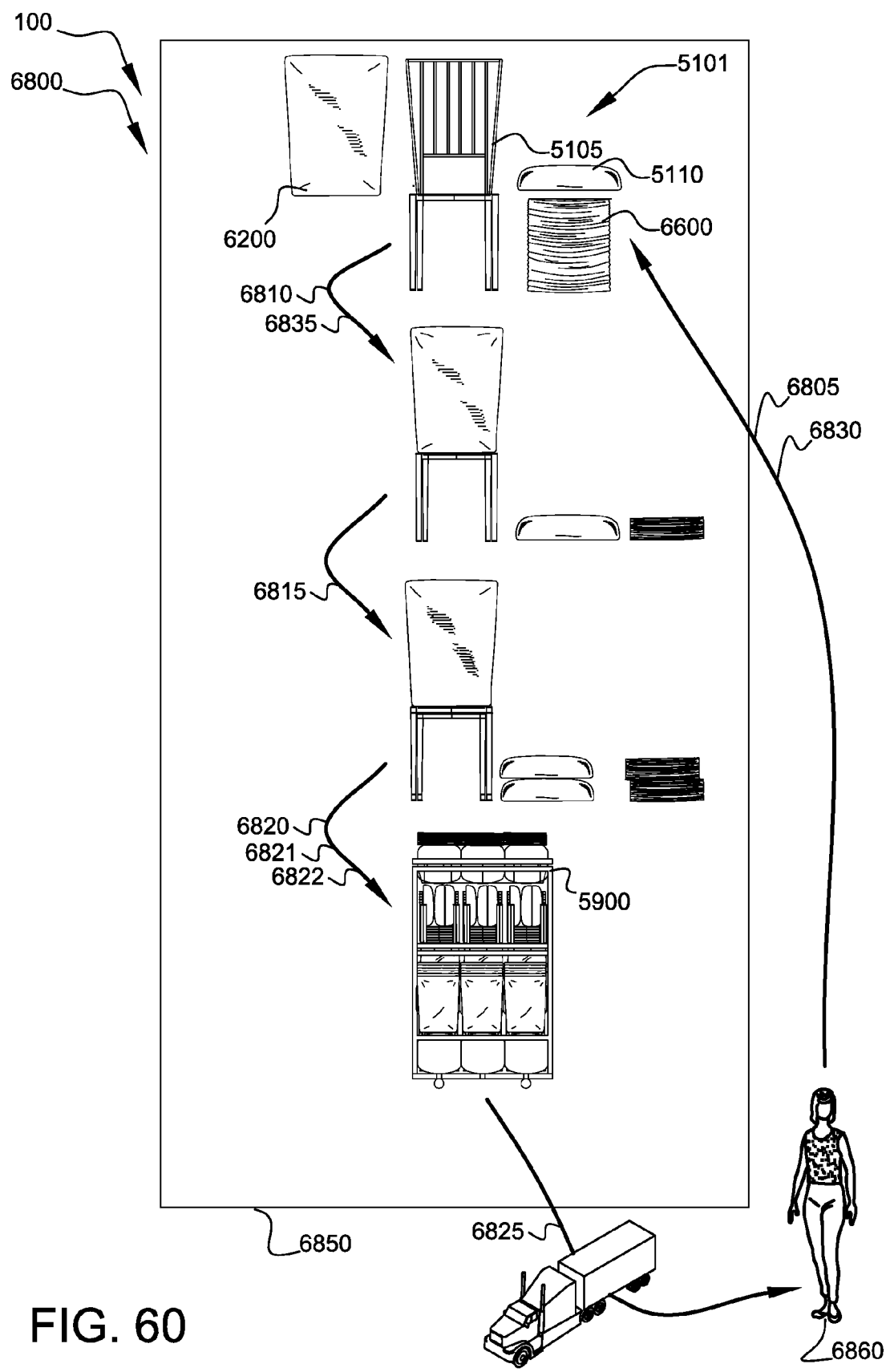
FIG. 60 shows a diagram illustrating a method according to the preferred embodiment of the present invention.

FIG. 60 shows a diagram illustrating method 6800 according to a preferred embodiment of the present invention. Preferably, modular furniture system 100 comprises method 6800. Preferably, method 6800 comprises the step of receiving 6805 at least one order from customer 6860 for at least two modular stackable chairs 5101 having customer-selected chair frames 5105, chair backs 5118, chair-leg covers 6600, and chair seats 5110; assembling 6810 such customer-selected chair frames 5105 and such customer-selected chair backs 5118 into at least two seatless modular stackable chairs 5101 (preferably at rental-warehouse 6850); stacking 6818 such at least two seatless modular stackable chairs 5101 together into at least one stack; loading 6820 such at least one stack onto dolly 5900; loading 6821 such customer-selected chair seats 5118 onto dolly 5900; loading 6822 such customer-selected chair-leg covers 6600 onto dolly 5900; and delivering 6825 dolly 5900 to customer 6860, as shown. Preferably, method 6800 further comprises the step of receiving 6830 at least one order from customer 6860 for at least two modular stackable chairs 5101 having customer-selected chair frames 5105, chair backs 5118, chair-leg covers 6600, chair-back covers 6200, and chair seats 5110; and installing 6835 such chair-back covers 6200 on such seatless modular stackable chairs 5101, as shown. This arrangement reduces the number of man-hours required for setup at the customer's location. Upon reading the teachings of this specification, those with ordinary skill in the art will now understand that, under appropriate circumstances, considering such issues as advances in technology, user preference, etc., other arrangements, such as, additional steps, using other dollies, separately transporting some components, etc., may suffice.

Figure 61:
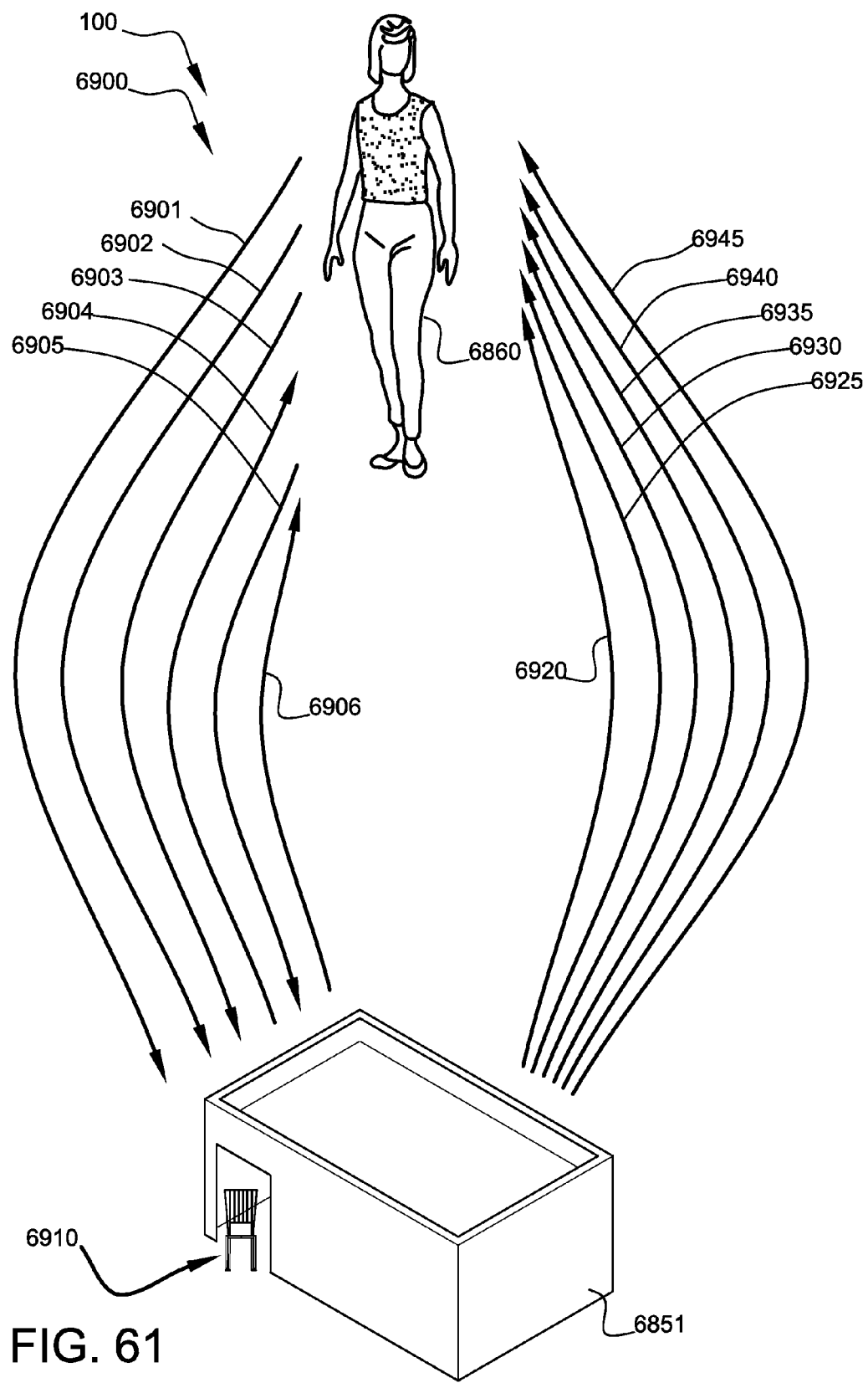
FIG. 61 shows a diagram of another method according to the preferred embodiment of the present invention.

FIG. 61 shows a diagram of method 6900 according to a preferred embodiment of the present invention. Preferably, modular furniture system 100 comprises method 6900, as shown. Preferably, method 6900 is performed by source 6951, preferably at rental-warehouse 6850, and preferably comprises the steps of: receiving 6901 at least one selection of at least one nesting-stackable chair frame 5105 (at least embodying herein the step of receiving from customer at least one customer's selection of at least one chair frame); receiving 6902 from such customer 6860, at least one selection of at least one modular chair seat 5110 (at least embodying herein the step of receiving such customer's selection of at least one chair seat); receiving 6903 from such customer 6860, such selection of at least one removable back cover 6600 (at least embodying herein the step of receiving such customer's selection of at least one back cover); and providing 6904 furniture comprising chair frame 5105, modular chair seat 5110, and removable back cover 6600 to such customer 6860, as shown (at least embodying herein the step of providing furniture comprising such at least one nesting-stackable chair frame, such at least one modular chair seat, and such at least one removable back cover to such at least one customer).

Preferably, method 6900 further comprises the step of receiving 6905 at least one selection of at least one chair-leg cover 6600 from such customer 6860, as shown (at least embodying herein the step of receiving such customer's selection of at least one removable chair-leg cover).

Preferably, method 6900 further comprises the step of manufacturing 6910 (at least embodying herein the step of manufacturing such at least one chair frame) such at least one chair frame 5105, as shown.

Preferably, such step of providing 6904 furniture comprises the step of renting 6906 furniture comprising the selected components (at least embodying herein the step of renting furniture comprising such at least one nesting-stackable chair frame, such at least one modular chair seat, and such at least one removable back cover to such at least one customer), as shown.

Preferably, such step of providing 6904 furniture comprises the step of selling 6915 to such customer 6860 furniture comprising the selected components (at least embodying herein the step of selling furniture comprising such at least one nesting-stackable chair frame, such at least one modular chair seat, and such at least one removable back cover to such at least one customer), as shown.

Preferably, such step of selling 6915 furniture comprises the step of providing 6920 (at least embodying herein wherein such step of providing furniture comprises the step of providing at least one franchise to such customer) at least one franchise to such customer 6860, as shown. Preferably, said step of providing 6920 at least one franchise to such customer 6860 comprises the step of providing 6925 (at least embodying herein wherein such step of providing at least one franchise to such customer comprises the step of providing at least one chair rental territory to such at least one customer) at least one chair rental territory to such at least one customer 6860, as shown. Preferably, source 6951 provides modular chair rental franchises to customer 6860, as shown. Preferably, such franchises allow source 6951 to define the rental territory served by customer 6860, as shown. Preferably, such franchises allow source 6951 to implement quality-control conditions on the rental of modular stackable chair 5101 that have been purchased (leased, stocked, rented, etc.) by customer 6860.

Preferably, said step of providing 6920 at least one franchise to such customer 6860 comprises the step of offering 6930 at (at least embodying herein wherein such step of providing at least one franchise to such customer comprises the step of offering at least one modular chair seat having at least one new aesthetic design to such at least one customer) least one chair seat 5110 having at least one new aesthetic design to such at least one customer 6860, as shown. Preferably, such step of providing 6920 at least one franchise to such customer 6860 comprises the step of offering 6935 (at least embodying herein wherein such step of providing at least one franchise to such customer comprises the step of offering at least one removable back cover having at least one new aesthetic design to such at least one customer) at least one back cover 6600 having at least one new aesthetic design to such customer 6860, as shown. Preferably, such step of providing 6920 at least one franchise to such customer 6860 comprises the step of offering 6940 (at least embodying herein wherein such step of providing at least one franchise to such customer comprises the step of offering at least one nesting-stackable chair frame having at least one new aesthetic design to such at least one customer) at least one chair frame 5105 having at least one new aesthetic design to such at least one customer 6860, as shown. Preferably, such step of providing 6920 at least one franchise to such customer 6860 comprises the step of offering 6945 (at least embodying herein wherein such step of providing at least one franchise to such customer comprises the step of offering at least one removable chair-leg cover having at least one new aesthetic design to such at least one customer) at least one chair-leg cover 6600 having at least one new aesthetic design to such at least one customer 6860, as shown. Preferably, source 6951 offers new modular stackable chair 5101 components to franchising customers 6860 in order to allow franchising customers 6860 to stock modular stackable chair 5101 components having new colors and/or designs as fashions change. Upon reading the teachings of this specification, those of ordinary skill in the art will now understand that, under appropriate circumstances, such as user preference, advances in technology, intended use, etc., other steps, such as maintaining an e-commerce web site, shipping modular furniture components, assembling modular furniture components at the customer's site, manufacturing other modular furniture components, etc., may suffice.

FIG. 62A shows a front view illustrating a reinforced front chair foot 7001 installed in front leg 5120 according to the preferred embodiment of FIG. 43. FIG. 62B shows a front view illustrating reinforced front chair foot 7001 according to the preferred embodiment of FIG. 62A. FIG. 62C shows section 20C-20C of FIG. 62A illustrating tapered strengthened chair front leg 5120 according to the preferred embodiment of FIG. 62A. FIG. 62D shows a front view illustrating floor cap 7030 according to the preferred embodiment of FIG. 62A. FIG. 62E shows a top view illustrating floor cap 7030 according to the preferred embodiment of FIG. 62D. FIG. 62F shows section 62C-62C of FIG. 62A illustrating tapered strengthened chair front leg 5120 with front foot 7001 installed according to the preferred embodiment of FIG. 62A.

Preferably, front leg 5120 is tapered from top end 7050 (adjacent crossbars 5130) to bottom end 7052 (adjacent the ground), as shown. Preferably, front leg 5120 comprises top inner diameter 7055, top outer diameter 7056, and top wall thickness 7057 (at least embodying herein at least one metal tube comprising at least one bottom end adapted to be adjacent the ground in use, at least one top end adapted to be connected to such at least one frame support, at least one inside aperture diameter, at least one outside diameter, and at least one wall thickness), as shown. Preferably, front leg 5120 comprises bottom inner diameter 7065, bottom outer diameter 7066, and bottom wall thickness 7067, as shown. Preferably, front leg 5120 is swaged to shape from a straight-sided tube. Preferably, the swaging process works and hardens the metal of front leg 5120 (at least embodying herein wherein such at least one portion comprises at least one work-hardened metal microstructure relative to such at least one other portion of such at least one metal tube). Preferably, bottom outer diameter 7066 is about three-fourths of top outer diameter 7056, as shown. Preferably, bottom wall thickness 7067 is greater than top wall thickness 7057 (at least embodying herein wherein at least one portion of such at least one metal tube, at least including such at least one bottom end, comprises at least one reduced outside diameter and at least one increased wall thickness relative to at least one other portion of such at least one metal tube), as shown. This results in greater lower-leg strength without increasing the overall weight of chair 5101. Upon reading the teachings of this specification, those with ordinary skill in the art will now understand that, under appropriate circumstances, considering such issues as advances in technology, user preference, materials strength, etc., other arrangements, such as other methods of tapering the legs (casting the legs in a tapered shape, cutting the legs to shape on a lathe, forging the legs in a tapered shape), other taper diameters, other final wall thicknesses, using untapered legs, etc., may suffice.

Preferably, modular stackable chair 5101 comprises reinforced foot 7001, as shown. Preferably, reinforced foot 7001 strengthens at least part of front leg 5120 against breakage during rough use (especially tipping modular stackable chair 5101 forward in use). Preferably, reinforced foot 7001 comprises a single piece of material, as shown. Preferably, reinforced foot 7001 comprises metal. Most preferably, reinforced foot 7001 (at least embodying herein wherein such at least one chair-foot comprises steel) comprises steel. Preferably, reinforced foot 7001 (at least embodying herein wherein such at least one chair-foot is adapted to lower the center of gravity of such at least one chair frame; and at least embodying herein wherein such at least one chair-foot is adapted to provide weight sufficient to increase the tipping stability of such at least one chair frame) has sufficient weight to assist in counterbalancing chair frame 5105 against the weight of chair back 5115 in order to enhance the ground stability of chair frame 5105. Preferably, reinforced foot 7001 (at least embodying herein at least one chair-foot adapted to increase the strength of such at least one chair frame) comprises shank 7005 and base 7010, as shown.

Preferably, shank 7005 comprises indents 7007, as shown. Preferably, shank 7005 is inserted into the bottom of front leg 5120, as shown. Preferably, shank 7005 is about three inches long. Preferably, shank 7005 is secured within front leg 5120 using adhesive 7020, as shown. Preferably, adhesive 7020 comprises epoxy. Preferably, indents 7007 assist in securing shank 7005 in adhesive 7020, as shown (similar-looking indents on base 7010 are decorative). Upon reading the teachings of this specification, those with ordinary skill in the art will now understand that, under appropriate circumstances, considering such issues as advances in technology, user preference, materials strength, etc., other reinforced feet, such as press-fit feet, other shank diameters, other shank lengths, multi-part reinforced feet, lack of indents, etc., may suffice.

Preferably, base 7010 comprises top edge 7012, bottom edge 7014, and cap extension 7015, as shown. Preferably, top edge 7012 has substantially the same diameter as bottom outer diameter 7066 for aesthetic reasons, as shown. Preferably, bottom edge 7014 (at least embodying herein wherein such at least one chair-foot is adapted to increase the tipping stability of such at least one chair frame) has substantially the same diameter as top outer diameter 7056, as shown, thereby restoring the footprint lost by tapering front leg 5120, in order to enhance the ground stability of chair frame 5105. Upon reading the teachings of this specification, those with ordinary skill in the art will now understand that, under appropriate circumstances, considering such issues as advances in technology, user preference, materials strength, etc., other chair feet, such as other base sizes, other base diameters, decorative feet, smooth metal feet, felt-tipped feet, caps that slip over the ends of the legs, wheels, runners, pontoons, etc., may suffice.

Preferably, floor cap 7030 attaches to base 7010, as shown, so that chair 5101 easily slides across floors for the convenience of the user. More preferably, floor cap 7030 attaches to cap extension 7015, as shown. Preferably, cap extension 7015 inserts into recess 7031 in floor cap 7030, as shown. Preferably, floor cap 7030 frictionally attaches to cap extension 7015. Preferably, floor cap 7030 comprises at least one strong, smooth material adapted to protect floors from damage. Preferably, floor cap 7030 is substantially disc-shaped. Preferably, floor cap 7030 comprises plastic. Most preferably, floor cap 7030 comprises nylon. Preferably, floor cap 7030 has a greater diameter than the diameter of bottom edge 7014, as shown, in order to further enhance the ground stability of chair frame 5105.

FIG. 63A shows a front view illustrating rear chair foot 7101 installed in rear leg 5125 according to the preferred embodiment of FIG. 43. FIG. 63B shows a front view illustrating rear chair foot 7101 according to the preferred embodiment of FIG. 63A. FIG. 63C shows a top view illustrating rear chair foot 7101 according to the preferred embodiment of FIG. 63A. FIG. 63D shows section 63D-63D of FIG. 63A illustrating tapered strengthened chair rear leg 5125 according to the preferred embodiment of FIG. 63A. FIG. 63E shows section 63D-63D of FIG. 63A illustrating tapered strengthened chair rear leg 5125 with rear chair foot 7101 installed according to the preferred embodiment of FIG. 63A.

Preferably, rear leg 5125 is tapered from top end 7150 (adjacent crossbars 5130) to bottom end 7152 (adjacent the ground), as shown. Preferably, rear leg 5125 comprises top inner diameter 7155, top outer diameter 7156, and top wall thickness 7157, as shown. Preferably, rear leg 5125 comprises bottom inner diameter 7165, bottom outer diameter 7166, and bottom wall thickness 7167, as shown. Preferably, rear leg 5125 is swaged to shape from a straight-sided tube. Preferably, the swaging process works and hardens the metal of at least part of rear leg 5125. Preferably, bottom outer diameter 7166 is about three-fourths of top outer diameter 7156, as shown. Preferably, bottom wall thickness 7167 is greater than top wall thickness 7157, as shown. This results in greater lower-leg strength without increasing the overall weight of chair 5101.

Preferably, modular stackable chair 5101 comprises foot 7101, as shown. Preferably, foot 7101 supports rear leg 5125, as shown, so that bottom end 7152 does not damage floors and so that chair 5101 easily slides across floors for the convenience of the user. Preferably, foot 7101 comprises a single piece of material, as shown. Preferably, foot 7101 comprises plastic. Most preferably, foot 7101 comprises nylon. Preferably, foot 7101 comprises shank 7105 and base 7110, as shown.

Preferably, shank 7105 comprises indents 7107, as shown. Preferably, shank 7105 is inserted into the bottom of rear leg 5125, as shown. Preferably, shank 7105 is about two inches long. Preferably, shank 7105 is secured within rear leg 5125 using adhesive 7020, as shown. Preferably, adhesive 7020 comprises epoxy. Preferably, indents 7107 assist in securing shank 7105 in adhesive 7020, as shown. Preferably, base 7110 has substantially the same diameter as top outer diameter 7056, as shown, thereby restoring the footprint lost by tapering rear leg 5125, in order to enhance the ground stability of chair frame 5105. Upon reading the teachings of this specification, those with ordinary skill in the art will now understand that, under appropriate circumstances, considering such issues as advances in technology, user preference, materials strength, etc., other chair feet, such as decorative feet, smooth metal feet, felt-tipped feet, caps that slip over the ends of the legs, wheels, runners, pontoons, etc., may suffice.

Figure 64:
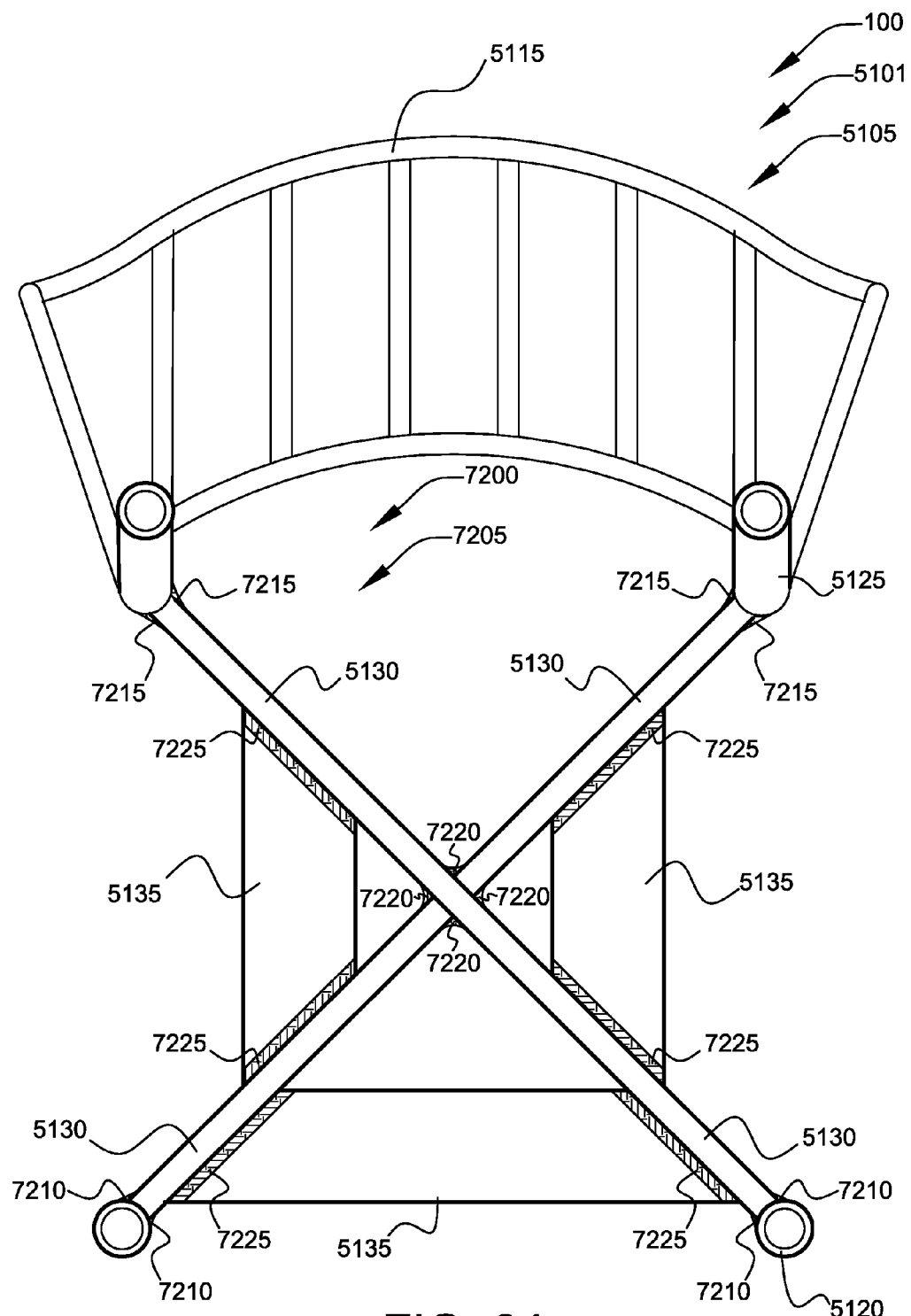
FIG. 64 shows a bottom view illustrating the modular stackable chair according to FIG. 43 and detailing structural reinforcements.

FIG. 64 shows a bottom view illustrating modular stackable chair 5101 according to the preferred embodiment of FIG. 43 detailing structural reinforcements. Preferably, chair frame 5105 comprises reinforcements 7200, as shown. Preferably, reinforcements 7200 stiffen and strengthen chair frame 5105 in order to permit rugged rental use without compromising nesting-stackability. Preferably, reinforcements 7200 (at least embodying herein at least one frame support strengthener adapted to strengthen such at least one frame support whereby such at least one frame support comprises the substantially exclusive structural connection between such plurality of thin leg-bars) stiffen and strengthen chair frame 5105 sufficiently that stretchers between the legs are not required for functionality, as shown. Preferably, reinforcements 7200 comprise built-up welds 7205, as shown. Preferably, built-up welds 7205 comprise front-leg welds 7210 between each front leg 5120 and each crossbar 5130, as shown. Preferably, built-up welds 7205 comprise rear-leg welds 7215 between each rear leg 5125 and each crossbar 5130, as shown. Preferably, built-up welds 7205 comprise crossbar welds 7220 between crossbars 5130, as shown. Preferably, built-up welds 7205 comprise crossbar-plate welds 7225 between crossbars 5130 and crossbar plates 5135, as shown. Upon reading the teachings of this specification, those with ordinary skill in the art will now understand that, under appropriate circumstances, considering such issues as advances in technology, user preference, aesthetic design, materials strength, etc., other reinforcements, such as additional crossbar plates, larger crossbar plates, a crossbar plate between the crossbars adjacent the seat back, using the seat back structure as reinforcement, etc., may suffice.

In use, modular furniture system 100 disclosed herein preferably permits rapid assembly and deployment as well as preferably permits rapid disassembly and retrieval. In the rental industry, set-up and tear-down times become critical. With only a few chairs, if these times were measurable in minutes, assembly and disassembly would not be taxing. However, in the rental industry, a single venue may need hundreds or thousands of chairs and in deployment and retrieval of these chairs trimming even a few seconds off each handling of a chair is advantageous. Modular furniture system 100 preferably utilizes various features (as disclosed herein, i.e. tool-free attachers, nested stacking, transporter system, etc.) to minimize the amount of time needed to deploy a chair from a stacked and disassembled state to a useable state as well as the amount of time needed to retrieve a deployed chair to a stacked and disassembled state. Additionally, modular furniture system 100 preferably still satisfies the needs of aesthetics, compact storage, durability, repairability, replacability, and changability, as the rental industry demands.

Although applicant has described applicant's preferred embodiments of this invention, it will be understood that the broadest scope of this invention includes such modifications as diverse shapes and sizes and materials. Such scope is limited only by the below claims as read in connection with the above specification. Further, many other advantages of applicant's invention will be apparent to those skilled in the art from the above descriptions and the below claims.

What is claimed is:

1. A stackable modular seating system, relating to assisting separation of at least one chair seat from at least one seating frame to enable separate stacking and to enable rapid deployment of a plurality of assembled seating frames and chair seats and to enable rapid retrieval and disassembly of a deployed plurality of assembled seating frames and chair seats, comprising:
   a) at least one seating frame comprising
      i) at least one back support element, and
      ii) at least one rigid unitary seat support element,
      iii) wherein said at least one rigid unitary seat support element comprises
         (1) at least four support bars extending from at least one hub, and
         (2) at least one inter-bar support connecting at least two of said at least four support bars
      iv) at least four legs comprising at least two front legs and at least two rear legs; and
   b) at least one seat-attacher structured and arranged to assist tool-free attachment and tool-free detachment of the at least one chair seat to and from said at least one rigid unitary seat support of said at least one seating frame;
      wherein said at least one seating frame is structured and arranged to nest in a stack with at least one other substantially identical seating frame, when the at least one chair seat is detached from each said at least one rigid unitary seat support;
   d) wherein the at least one chair seat, when attached to said at least one seating frame, obstructs multiple units of said at least one seating frames from nesting in a stack;
   e) wherein a plurality of said at least one seating frames assembled with the at least one chair seats are rapidly assemble-able and deployable from at least one nested-stacked configuration;
   f) wherein such deployed plurality of assembled seating frames and chair seats are rapidly disassemble-able and retrievable to such at least one nested-stacked configuration
   g) wherein said at least at least four support bars extending from said at least one hub are permanently welded together at said at least one hub; and
   h) wherein said at least one inter-bar support are permanently welded to said at least two of said at least four support bars.

2. The stackable modular seating system, according to claim 1, further comprising the at least one chair seat.

3. The stackable modular seating system, according to claim 2, wherein detachment of said at least one chair seat from said at least one rigid unitary seat support is effected by lifting said at least one chair seat away from said at least one rigid unitary seat support, separating said at least one chair seat from said at least one rigid unitary seat support.

4. The stackable modular seating system, according to claim 2, wherein said at least one seat-attacher comprises at least one first portion associated with said at least one chair seat and at least one second portion associated with said at least one inter-bar support.

5. The stackable modular seating system, according to claim 2, wherein said at least one rigid unitary seat support comprises openings structured and arranged to receive said at least two rear legs of such at least one other substantially identical seating frame permitting multiple units of said at least one seating frames to nest in such stack.

6. The stackable modular seating system, according to claim 5, wherein said at least one chair seat, when attached to said at least one seating frame, obstructs said openings in said at least one rigid unitary seat support from use by said at least two rear legs.

7. The stackable modular seating system, according to claim 1, further comprising at least one back-support cover.

8. The stackable modular seating system, according to claim 7, wherein said at least one back-support cover comprises at least one closure mechanism to secure said at least one back-support cover to said at least one back support.

9. The stackable modular seating system, according to claim 7, wherein said at least one back-support cover comprises at least one fabric.

10. The stackable modular seating system, according to claim 1, further comprising at least one chair-leg cover.

11. The stackable modular seating system, according to claim 10, further comprising at least one back-support cover.

12. The stackable modular seating system, according to claim 1, wherein said at least one rigid unitary seat support comprises at least two of said at least one inter-bar support.

13. The stackable modular seating system, according to claim 12, wherein said at least one rigid unitary seat support comprises at least three of said at least one inter-bar support.

14. The stackable modular seating system, according to claim 13, wherein each of said at least four support bars are attached to at least one inter-bar support of said at least three inter-bar supports.

15. The stackable modular seating system, according to claim 14, wherein two adjacent support bars of said at least one rigid unitary seat support are not connected to a common at least one inter-bar support of said at least three inter-bar supports.

16. The stackable modular seating system, according to claim 1, wherein said at least one back support extends upward from said at least one rigid unitary seat support and said at least four legs extend downward from said at least one rigid unitary seat support.

17. The stackable modular seating system, according to claim 1, wherein said at least one rigid unitary seat support provides the substantially exclusive structural connection between said at least four legs.

18. The stackable modular seating system, according to claim 1, further comprising at least one chair-foot connected with each of said at least four legs.

19. The stackable modular seating system, according to claim 18, wherein said at least one chair-foot is structured and arranged to increase stability of said at least one seating frame.

20. The stackable modular seating system, according to claim 18, wherein said at least one chair-foot is weighted.

21. The stackable modular seating system, according to claim 18, wherein said at least one chair-foot is weighted to counterbalance said at least one seating frame against weight of said at least one back support to enhance ground stability of said at least one chair frame.

22. The stackable modular seating system, according to claim 1, further comprising at least one transporter structured and arranged to transport a plurality of said at least one seating frame in such at least one nested-stacked configuration.

23. The stackable modular seating system, according to claim 22, wherein said at least one transporter is wheeled.

24. The stackable modular seating system, according to claim 23, wherein said at least one transporter comprises at least one forklift guide structured and arranged to guide fork-alignment with said at least one transporter by at least one forklift.

25. The stackable modular seating system, according to claim 22, wherein said at least one transporter comprises:
 a) at least one seating frame holder structured and arranged to hold at least two of said at least one seating frame which are stacked in such at least one nested-stacked configuration;
 b) at least one chair seat holder structured and arranged to hold at least two of said at least one chair seat detached from each said at least one seating frame; and
 c) at least three wheels.

26. The stackable modular seating system, according to claim 22, wherein said at least one transporter comprises:
 a) at least one transporter frame comprising at least one upper portion and at least one lower portion;
 b) at least one first seating frame holder connected with said at least one transporter frame; and
 c) at least one second seating frame holder connected with said at least one transporter frame;
 d) wherein said at least one first seating frame holder and said at least one second seating frame holder are positioned between said at least one upper portion of said at least one transporter frame and said at least one lower portion of said at least one transporter frame; and
 e) at least one basket connected with an upper portion of said at least one transporter frame;
 f) at least two forklift guides associated with a lower portion of said at least one transporter frame; and
 g) wheels.

27. A stackable modular seating system, relating to assisting separation of at least one chair seat from at least one seating frame to enable separate stacking and to enable rapid deployment of a plurality of assembled seating frames and chair seats and to enable rapid retrieval and disassembly of a deployed plurality of assembled seating frames and chair seats, comprising:
 a) at least one seating frame comprising
  i) at least one back support element,
  ii) at least one rigid unitary seat support element,
  iii) wherein said at least one rigid unitary seat support element comprises
   (1) at least four support bars extending from at least one hub, and
   (2) at least one inter-bar support connecting at least two of said at least four support bars,
  iv) at least four legs comprising at least two front legs and at least two rear legs; and
 b) at least one chair seat; and
 c) at least one seat-attacher structured and arranged to assist tool-free attachment and tool-free detachment of said at least one chair seat to and from said at least one rigid unitary seat support of said at least one seating frame;
 d) wherein said at least one seating frame is structured and arranged to nest in a stack with at least one other substantially identical seating frame, when said at least one chair seat is detached from each said at least one rigid unitary seat support;
 e) wherein said at least one chair seat, when attached to said at least one seating frame, obstructs multiple units of said at least one seating frames from nesting in a stack;
 f) wherein said at least one rigid unitary seat support provides the substantially exclusive structural connection between said at least four legs;
 g) wherein a plurality of said at least one seating frames and said at least one chair seats are rapidly assemble-able and deployable from at least one nested-stacked configuration;

h) wherein such deployed plurality of assembled seating frames and chair seats are rapidly disassemble-able and retrievable to such at least one nested-stacked configuration;
i) wherein said at least at least four support bars extending from said at least one hub are permanently welded together at said at least one hub; and
j) wherein said at least one inter-bar support are permanently welded to said at least two of said at least four support bars.

28. The stackable modular seating system, according to claim 27, further comprising:
a) at least one chair-foot connected with each of said at least four legs;
b) wherein said at least one chair-foot is weighted; and
c) wherein said at least one chair-foot substantially counterbalances weight of said at least one back support against tipping of said at least one seating frame.

29. The stackable modular seating system, according to claim 27, further comprising at least one transporter structured and arranged to transport a plurality of said at least one seating frame in such at least one nested-stacked configuration.

30. The stackable modular seating system, according to claim 29, wherein said at least one transporter comprises:
a) at least one seating frame holder structured and arranged to hold at least two of said at least one seating frame which are stacked in such at least one nested-stacked configuration;
b) at least one chair seat holder structured and arranged to hold at least two of said at least one chair seat detached from each said at least one seating frame; and
a) at least three wheels.

* * * * *